US012240202B2

(12) United States Patent
Rietz et al.

(10) Patent No.: US 12,240,202 B2
(45) Date of Patent: Mar. 4, 2025

(54) LAMINATED GLASS RETENTION SYSTEM

(71) Applicant: Andersen Corporation, Bayport, MN (US)

(72) Inventors: Adam Richard Rietz, Lake St. Croix Beach, MN (US); Craig Michael Johnson, North Oaks, MN (US); Katherine April Stephan Graham, Inver Grove Heights, MN (US); Scott Edward Thom, White Bear Township, MN (US); Eric Matthew Mueller, Cottage Grove, MN (US); Drew Adam Pavlacky, Lakeland Shores, MN (US); Jared Shanholtzer, Saint Paul Park, MN (US)

(73) Assignee: Andersen Corporation, Bayport, MN (US)

( * ) Notice: Subject to any disclaimer, the term of this patent is extended or adjusted under 35 U.S.C. 154(b) by 277 days.

(21) Appl. No.: 16/988,197

(22) Filed: Aug. 7, 2020

(65) Prior Publication Data
US 2021/0123292 A1 Apr. 29, 2021

Related U.S. Application Data

(60) Provisional application No. 62/895,370, filed on Sep. 3, 2019, provisional application No. 62/884,036, filed on Aug. 7, 2019.

(51) Int. Cl.
B32B 17/10 (2006.01)
E06B 3/56 (2006.01)
(Continued)

(52) U.S. Cl.
CPC .. B32B 17/10036 (2013.01); B32B 17/10761 (2013.01); E06B 3/56 (2013.01);
(Continued)

(58) Field of Classification Search
CPC ........ B32B 17/10036; B32B 17/10761; B32B 3/06; B32B 17/10293; B32B 17/10366;
(Continued)

(56) References Cited

U.S. PATENT DOCUMENTS 1,815,719 A 7/1931 Lane
2,054,856 A 9/1936 Fox et al.
(Continued)

FOREIGN PATENT DOCUMENTS

CH 662154 W 9/1987
DE 2440779 W 3/1976
(Continued)

OTHER PUBLICATIONS

"Non-Final Office Action," for U.S. Appl. No. 17/370,779 mailed Dec. 22, 2023 (19 pages).
(Continued)

Primary Examiner — Nathan L Van Sell
(74) Attorney, Agent, or Firm — Pauly, DeVries Smith & Deffner LLC

(57) ABSTRACT

Embodiments herein relate to a system and method for retaining an insulated glass subassembly including a laminated layer of glass within a frame of a fenestration unit providing protection against wind borne debris. A fenestration unit can include a frame member defining a channel with a lower end and an attachment surface thereon along with a glass subassembly including a proximal end received and seated within the channel and an outside facing surface of the exterior pane proximate the lower end of the channel. A retention member can engage the interior laminate pane, and a glazing material can be on the attachment surface at the lower end of the channel. The outside facing surface of the glass subassembly can be attached to the channel of the frame member with the glazing material. In various embodi-
(Continued)

ments, methods of making a retention member are included herein. Other embodiments are also included herein.

22 Claims, 39 Drawing Sheets

(51) Int. Cl.
  *E06B 3/66* (2006.01)
  *E06B 3/663* (2006.01)
  *E06B 3/673* (2006.01)
(52) U.S. Cl.
  CPC ........ *E06B 3/6621* (2013.01); *E06B 3/66309* (2013.01); *E06B 3/67356* (2013.01)
(58) Field of Classification Search
  CPC ... B32B 17/10055; E06B 3/56; E06B 3/6621; E06B 3/66309; E06B 3/67356
  See application file for complete search history.

(56) References Cited

U.S. PATENT DOCUMENTS

| | | |
|---|---|---|
| 2,094,435 A | 9/1937 | Toney |
| 2,235,680 A | 3/1941 | Haven et al. |
| 2,288,456 A | 6/1942 | Hiff |
| 2,548,556 A | 4/1951 | Ogden |
| 2,617,159 A | 11/1952 | Leighton |
| 2,723,427 A | 11/1955 | Bobel |
| 2,854,709 A | 10/1958 | Hirtz et al. |
| 2,905,983 A | 9/1959 | Ritz |
| 2,979,788 A | 4/1961 | Richardson |
| 3,105,274 A | 10/1963 | Paul |
| 3,241,281 A | 3/1966 | Leslie |
| 3,347,008 A | 10/1967 | Strengholt |
| 3,363,385 A | 1/1968 | Evans et al. |
| 3,363,390 A | 1/1968 | Jameson et al. |
| 3,759,004 A | 9/1973 | Kent |
| 3,775,914 A | 12/1973 | Patil |
| 3,783,084 A | 1/1974 | Quenett |
| 3,851,432 A | 12/1974 | Griffin |
| 3,872,198 A | 3/1975 | Britton |
| 3,919,023 A | 11/1975 | Bowser et al. |
| 3,928,953 A | 12/1975 | Mazzoni et al. |
| 3,971,178 A | 7/1976 | Mazzoni et al. |
| 3,992,843 A | 11/1976 | Difazio |
| 3,998,680 A | 12/1976 | Flint |
| 4,015,394 A | 4/1977 | Kessler |
| 4,055,031 A | 10/1977 | Okawa et al. |
| 4,109,431 A | 8/1978 | Mazzoni et al. |
| 4,266,383 A | 5/1981 | Krueger et al. |
| 4,321,777 A | 3/1982 | Sauret et al. |
| 4,358,917 A | 11/1982 | Oda et al. |
| 4,364,209 A | 12/1982 | Gebhard |
| 4,372,094 A | 2/1983 | Boschetti |
| 4,496,201 A | 1/1985 | Allgeyer |
| 4,615,159 A | 10/1986 | Kessler |
| 4,632,853 A | 12/1986 | De Vrij |
| 4,693,043 A | 9/1987 | Knapp |
| 4,803,820 A | 2/1989 | Metrick |
| 4,984,402 A | 1/1991 | Davies |
| 5,104,173 A | 4/1992 | Tamura et al. |
| 5,118,157 A | 6/1992 | Tamura |
| 5,138,811 A | 8/1992 | Parrott |
| 5,193,875 A | 3/1993 | Tamura |
| 5,227,206 A | 7/1993 | Bachli |
| 5,544,465 A | 8/1996 | Hood et al. |
| 5,553,422 A | 9/1996 | Gazaway |
| 5,560,149 A | 10/1996 | Lafevre |
| 5,593,784 A | 1/1997 | Chinzi |
| 5,622,017 A | 4/1997 | Lynn et al. |
| 5,636,484 A | 6/1997 | Deblock |
| 5,637,363 A | 6/1997 | Leray et al. |
| 5,713,159 A | 2/1998 | Schmidt |
| 5,853,828 A | 12/1998 | Schimmelpenningh et al. |
| 5,950,379 A | 9/1999 | Moore et al. |
| 6,055,783 A | 5/2000 | Guhl et al. |
| 6,151,849 A | 11/2000 | Twigg et al. |
| 6,167,662 B1 | 1/2001 | Gruber |
| 6,182,406 B1 | 2/2001 | Hunt |
| 6,263,623 B1 | 7/2001 | Weiss et al. |
| 6,298,609 B1 | 10/2001 | Bifano et al. |
| 6,333,085 B1 | 12/2001 | Emek |
| 6,360,499 B1 | 3/2002 | Sugiura |
| 6,367,210 B1 | 4/2002 | Trundle |
| 6,581,342 B1 | 6/2003 | Tavivian |
| 6,931,799 B2 | 8/2005 | Webb |
| 7,204,901 B2 | 4/2007 | Bayha et al. |
| 7,293,391 B2 | 11/2007 | Guhl et al. |
| 7,578,104 B2 | 8/2009 | Rinehart et al. |
| 7,775,003 B2 | 8/2010 | Sabac et al. |
| 7,877,939 B2 | 2/2011 | Knapp |
| 7,950,192 B2 | 5/2011 | Glover et al. |
| 8,151,540 B2 | 4/2012 | Paz |
| 8,316,596 B2 | 11/2012 | Anderson et al. |
| 8,353,138 B2 | 1/2013 | Sigmund et al. |
| 8,683,775 B1 | 4/2014 | Jones |
| 8,701,363 B2 | 4/2014 | Schield |
| 8,967,219 B2 | 3/2015 | Nieminen et al. |
| 9,163,449 B2 | 10/2015 | Weiss et al. |
| 9,440,662 B2 | 9/2016 | Kamaka et al. |
| 9,683,403 B2 | 6/2017 | Wang |
| 10,081,978 B2 | 9/2018 | Weiss et al. |
| 10,329,831 B2 | 6/2019 | Weiss et al. |
| 2005/0028460 A1 | 2/2005 | Steffek et al. |
| 2005/0034386 A1 | 2/2005 | Crandell et al. |
| 2006/0090834 A1 | 5/2006 | Huang et al. |
| 2007/0209302 A1 | 9/2007 | Paz |
| 2008/0280078 A1 | 11/2008 | Krisko et al. |
| 2009/0301637 A1 | 12/2009 | Reichert |
| 2010/0139193 A1 | 6/2010 | Goldberg et al. |
| 2010/0212959 A1 | 8/2010 | Flick |
| 2011/0267833 A1 | 11/2011 | Verrat-Debailleul et al. |
| 2011/0308381 A1* | 12/2011 | Hartley ................. F41H 5/0407 89/917 |
| 2013/0180142 A1 | 7/2013 | Kressin et al. |
| 2014/0072735 A1 | 3/2014 | Jones |
| 2014/0318050 A1 | 10/2014 | Lathief |
| 2016/0060945 A1* | 3/2016 | Weiss .................... E06B 3/5814 29/428 |
| 2016/0258205 A1* | 9/2016 | Oquendo ............ E06B 3/66304 |
| 2017/0028686 A1* | 2/2017 | Wilson ..................... B32B 7/05 |
| 2018/0073292 A1 | 3/2018 | Graham |
| 2022/0010611 A1 | 1/2022 | Rietz et al. |

FOREIGN PATENT DOCUMENTS

| | | |
|---|---|---|
| DE | 2631440 W | 9/1977 |
| DE | 2809682 W | 9/1979 |
| EP | 0007324 W | 2/1980 |
| EP | 2476852 | 7/2012 |
| GB | 1189518 | 4/1970 |
| GB | 2049010 | 12/1980 |
| GB | 2148371 | 5/1985 |
| WO | 2011062946 | 5/2011 |

OTHER PUBLICATIONS

"Response to Non-Final Rejection," mailed on Dec. 22, 2023, for U.S. Appl. No. 17/370,779, submitted via EFS-Web on Mar. 21, 2024, 11 pages.
"Final Office Action," for U.S. Appl. No. 17/370,779 mailed Jun. 6, 2024 (16 pages).
"Notice of Allowance," for U.S. Appl. No. 17/370,779 mailed Sep. 26, 2024 (11 pages).
"Response to Final Office Action," for U.S. Appl. No. 17/370,779 filed Sep. 6, 2024 (12 pages).
"Response to Non-Final Office Action," for U.S. Appl. No. 16/988,197 filed Aug. 20, 2024 (14 pages).

* cited by examiner

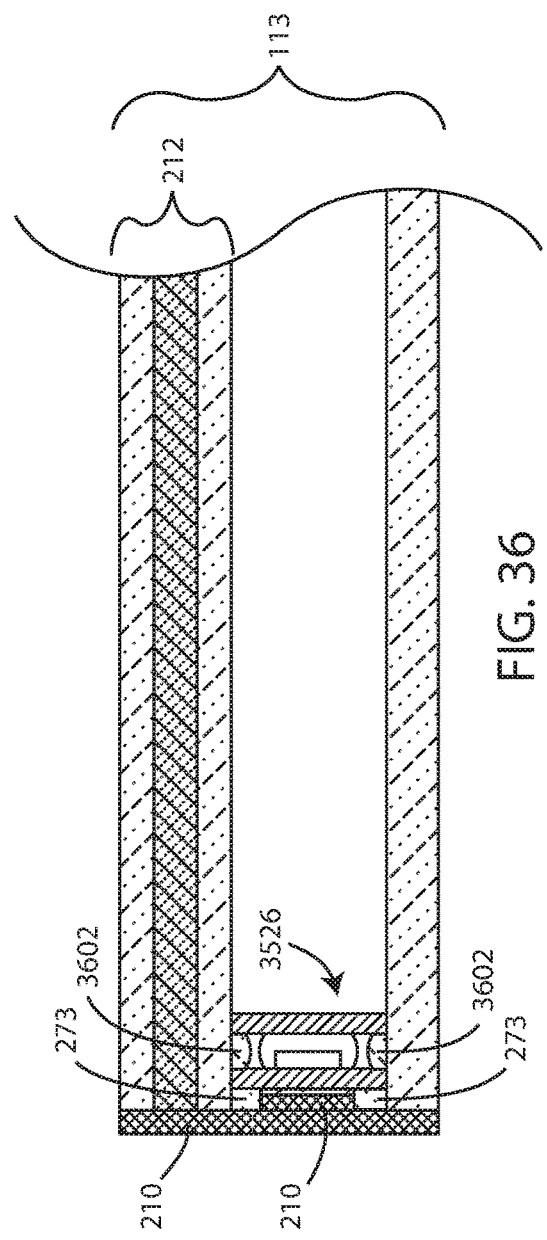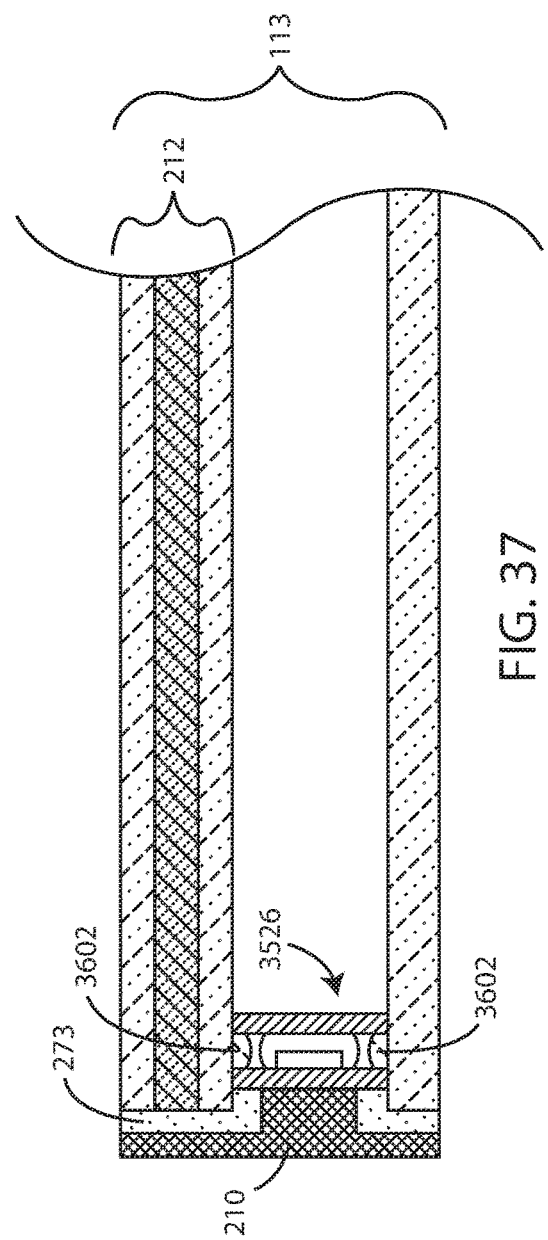

LAMINATED GLASS RETENTION SYSTEM

This application claims the benefit of U.S. Provisional Application No. 62/884,036, filed Aug. 7, 2019, and U.S. Provisional Application No. 62/895,370, filed Sep. 3, 2019, the content of both of which are herein incorporated by reference in its entirety.

FIELD

The present invention generally relates to a system and method for retaining one or more layers of glass within a frame of a fenestration unit, and in particular to a system and method for retaining an insulated glass subassembly including a laminated layer of glass providing protection against wind borne debris within a window or door.

BACKGROUND

Given often harsher environmental conditions encountered in coastal areas, there have been increasingly stringent standards, rules and regulations being passed about fenestration units such as windows and doors and the ability of such windows and doors to withstand extreme environmental conditions. For example, in many coastal areas, such as in Florida and along the eastern seaboard, hurricanes and tropical storms having gale force winds and the incidence of wind-borne debris are a yearly occurrence and threat. In addition, it is important for the glass subassemblies of such coastal impact windows and doors to be supported and retained within their window sash or frame assemblies or door panel or frame assemblies after impact, and/or after the glass has been broken to provide blast mitigation protection. Still further, these windows and doors generally must provide enhanced insulation capabilities when exposed to temperature extremes, especially in summer months when temperatures in some coastal areas can reach well over 100° F., while in the winter months, temperatures can be well below freezing.

Currently, for the manufacture of coastal impact products, in order to form such products with the desired levels of strength and stability to retain the insulated glass assembly after contact with windborne debris, additional time generally must be spent during the manufacturing process. A common method in the industry to achieve this retention is to add additional glazing material to the gap between the edge of the insulated glass assembly and the sash or frame to increase the bond area between the glass assembly and the sash or frame, in a process commonly referred to as back glazing. Such glazing material must be applied all around the glass edge in a complete and as full an application as possible. This generally requires significant craftsmanship/skill on the part of the workers, and considerable additional manufacturing time to ensure that the back-glazing is sufficient to meet required missile impact and pressure cycling (due to windborne debris) test standards for such coastal impact products. Additionally, this method requires all the work to be done in-line during the assembly of the sash/frame, causing a potential drop in efficiency and capacity of the manufacturing assembly line.

SUMMARY

Embodiments herein relate to a system and method for retaining an insulated glass subassembly including a laminated layer of glass within a frame of a fenestration unit providing protection against wind borne debris within a window or door.

In an embodiment, a window or door assembly can include a frame member defining a channel, the frame member defining a lower end of the channel and an attachment surface thereon. The assembly can further include a glass subassembly, the glass subassembly can include an interior laminate pane, an exterior pane, a proximal end received and seated within the channel, an inside facing surface on the interior laminate pane, and an outside facing surface on the exterior pane, the outside facing surface proximate the lower end of the channel. The assembly can further include a retention member engaging at least a portion of the interior laminate pane, and a glazing material disposed on the attachment surface at the lower end of the channel. The outside facing surface of the glass subassembly being attached to the channel of the frame member with the glazing material.

In an embodiment, a method of making a glass subassembly for a window or door assembly is included, the method positioning a sealing spacer between an interior laminate pane of glass and an exterior pane of glass forming an insulating glazing unit, applying a retention member to span perimeter edges of the interior laminate pane of glass and the exterior pane of glass, depositing a bed glazing into a channel defined within a frame, and seating the insulating glazing unit into the channel and into contact with the bed glazing.

In an embodiment, a method of making a retention member is included, the method including supplying a flowable polymeric composition into a coating chamber, feeding a fibrous substrate through the coating chamber, the coating chamber defining a substrate ingress port and a substrate egress port; and passing the flowable polymeric composition into gaps defined by adjacent fibers in the fibrous substrate.

In an embodiment, a method of making a fenestration unit is included, the method including obtaining a retention member, applying the retention member to an insulating glazing unit (IGU), wherein the retention member is formed by supplying a flowable polymeric composition into a coating chamber, feeding a fibrous substrate through the coating chamber, the coating chamber defining a substrate ingress port and a substrate egress port, and passing the flowable polymeric composition into gaps defined by adjacent fibers in the fibrous substrate.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which:

FIG. 36 is a cross-sectional view of a portion of a glass subassembly with a retention member in accordance with various embodiments herein.

FIG. 37 is a cross-sectional view of a portion of a glass subassembly with a retention member in accordance with various embodiments herein.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

As referenced above, environmental conditions encountered in coastal areas is generally harsh. Fenestration products for such environments must meet strict testing criteria structural integrity and impact resilience.

Generally, fenestration units for such environments include at least one laminate pane that is designed to retain structural integrity even after substantial impacts from debris. In many cases, the laminate pane can be an interior laminate pane with an exterior pane being a non-laminate. However, in some cases, interior and exterior panes can be laminate. In some cases, the exterior pane can be a laminate while the interior pane is not.

Laminate panes typically include a first glass layer, a second glass layer, and a polymeric material disposed between the first glass layer and the second glass layer. Embodiments herein include specialized components referred to as retention members that help to retain the laminate pane within the frame of the fenestration unit.

Figure 1:
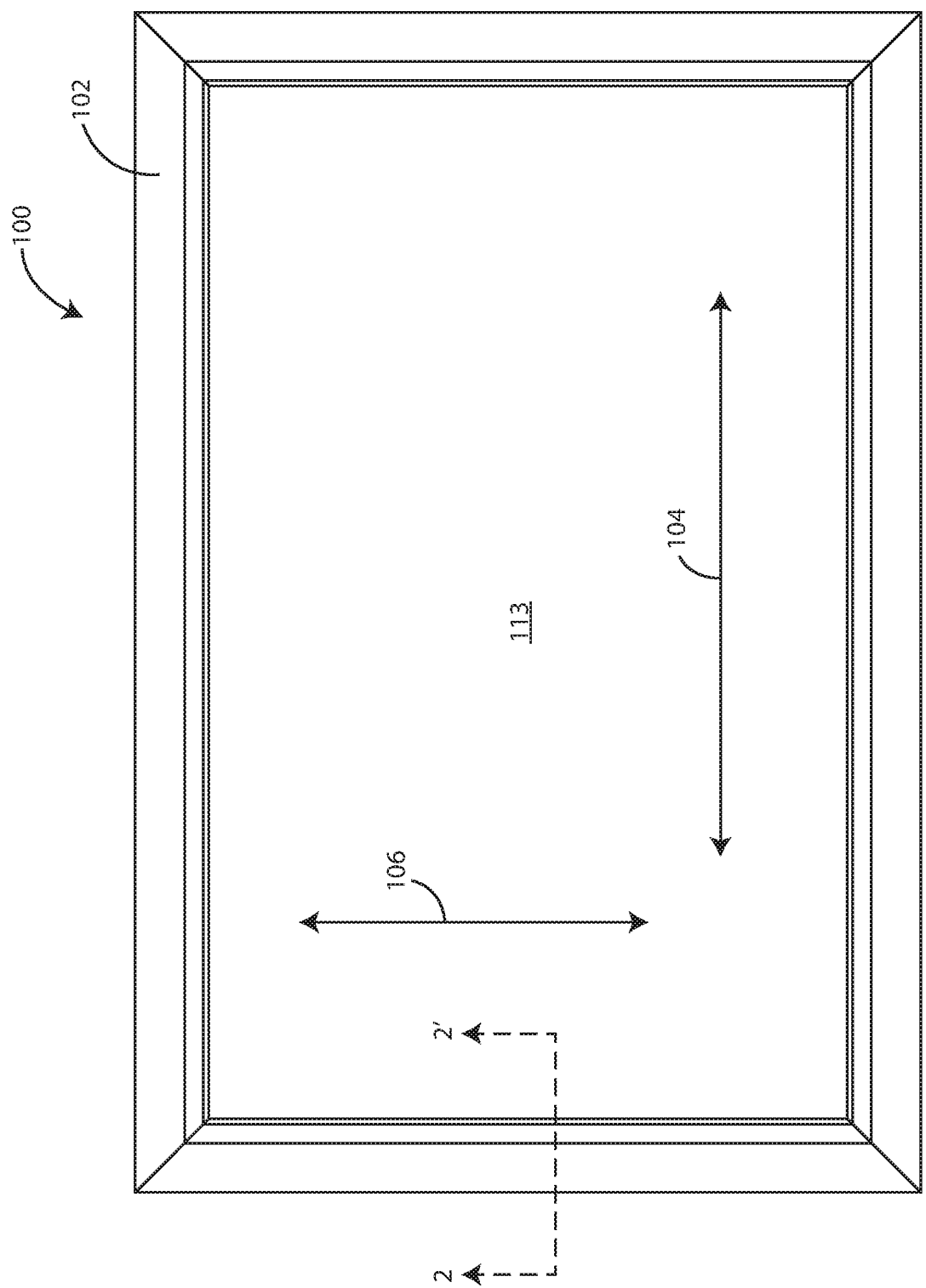
FIG. 1 is a schematic view of an insulated glass fenestration unit having a laminated glass structure in accordance with various embodiments herein.

Referring now to FIG. 1, a schematic view of an insulated glass fenestration unit having a laminated glass structure is shown in accordance with various embodiments herein. FIG. 1 specifically illustrates a portion of a window or door assembly 100. The window or door assembly 100 includes a frame member 102. The window or door assembly 100 also includes a glass subassembly 113. The glass subassembly 113 has a width 104 and a height 106.

Figure 2:
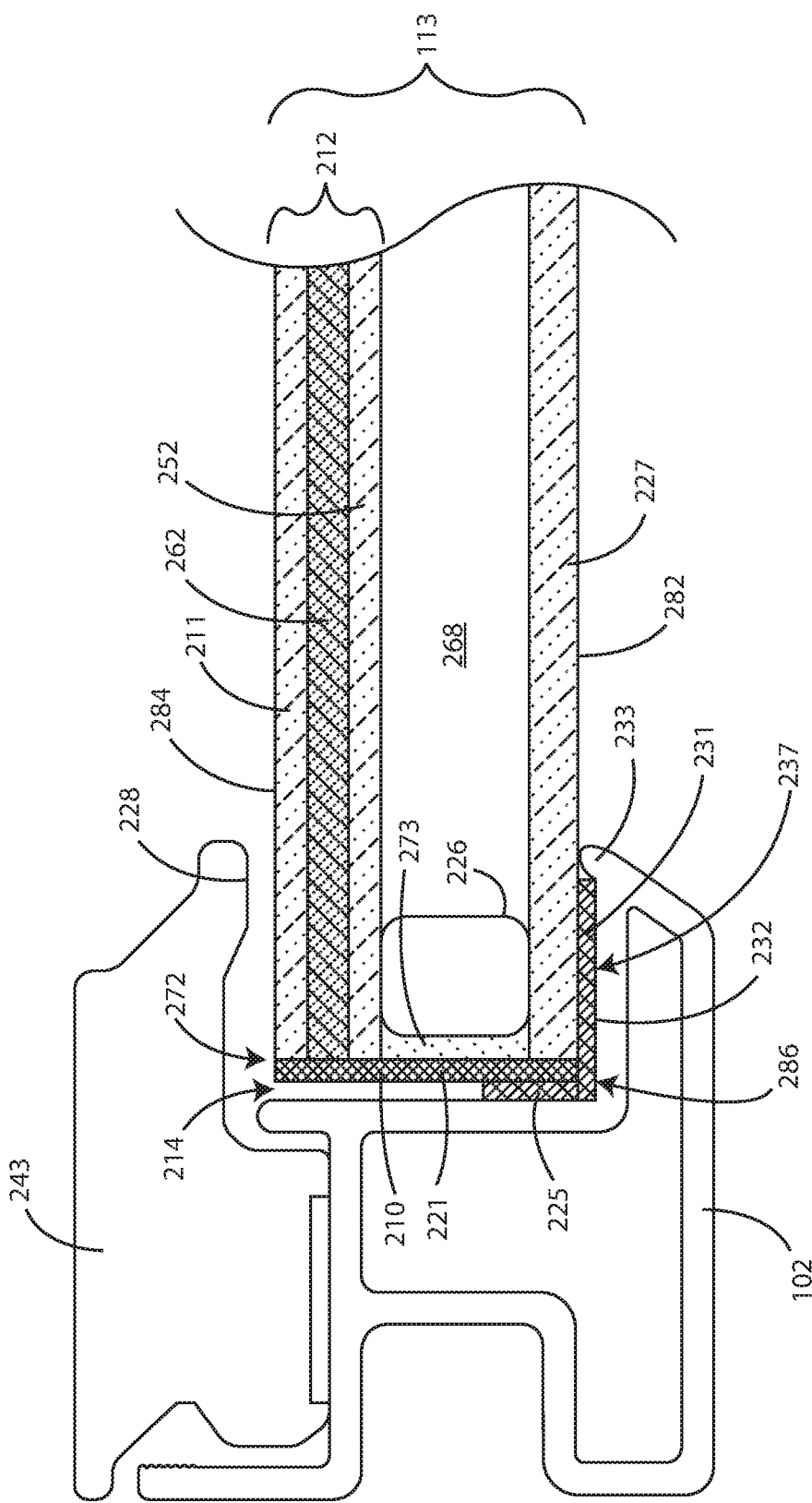
FIG. 2 is a cross-sectional view of a portion of an insulated glass fenestration unit as taken along line 2-2' of FIG. 1 in accordance with various embodiments herein.

Referring now to FIG. 2, a cross-sectional view of a portion of an insulated glass fenestration unit is shown as taken along line 2-2' of FIG. 1 in accordance with various embodiments herein. The window or door assembly includes a frame member 102. The frame member 102 includes an attachment surface 232. The frame member 102 also includes an edge 233.

The window or door assembly can include a channel 214, which can be defined at least in part by the frame member 102. The channel 214 can include a lower end 286. In various embodiments, at attachment surface 232 can be disposed on the lower end 286 of the channel 214.

The window or door assembly can include a glass subassembly 113. The glass subassembly 113 can include an interior laminate pane 212. The glass subassembly 113 can also include an exterior pane 227.

The glass subassembly 113 can include a proximal end 272. The glass subassembly 113 can also include an inside facing surface 284 and an outside facing surface 282. The glass subassembly 113 also includes a sealing spacer 226. The sealing spacer 226 can serve to maintain a spacing distance between the interior laminate pane 212 and the exterior pane 227. The sealing spacer 226 can also serve to attach the interior laminate pane 212 to the exterior pane 227. The glass subassembly 113 also includes a space 268 between the interior laminate pane 212 and the exterior pane 227. The glass subassembly 113 also includes a secondary sealant 273. In various embodiments, the secondary sealant 273 can be disposed between the interior laminate pane 212 and the exterior pane 227, but on the opposite side of the sealing spacer 226 from the space 268.

The interior laminate pane 212 typically includes a first glass layer 211, a second glass layer 252, and a polymeric material 262 disposed between the first glass layer 211 and the second glass layer 252.

In various embodiments, the polymeric material 262 of the interior laminate pane 212 can include various polymers. In various embodiments, the polymeric material 262 disposed between the first glass layer 211 and the second glass layer 252 can include at least one of an ionoplast, a cast-in-place polymer, a thermoplastic, and a thermoset. In some embodiments, the polymeric material 262 can be elastomeric. In some embodiments, the polymeric material 262 can be non-elastomeric. In various embodiments, the polymeric material 262 disposed between the first glass layer 211 and the second glass layer 252 can include at least one of polyvinyl butyral (PVB), SGP (SENTRYGLAS PLUS), polyethylene terephthalate (PET), polyurethane (PUR), and ethylene-co-vinyl acetate (EVA), and hydrids/alloys/laminates/copolymers/composites thereof.

The polymeric material 262 disposed between the first glass layer 211 and the second glass layer 252 can have a thickness of various dimensions. In some embodiments, the thickness can be greater than or equal to 10, 20, 30, 45, 60, 75, or 90 mils. In some embodiments, the thickness can be less than or equal to 150, 135, 120, 105, or 90 mils. In some embodiments, the thickness can fall within a range of 30 to 150 mils, or 45 to 135 mils, or 60 to 120 mils, or 75 to 105 mils, or can be about 90 mils.

The glass layers can have thicknesses of various dimensions. In some embodiments, the thickness of the glass layers can be greater than or equal to 60, 75, 90, 120, or 150 mils. In some embodiments, the thickness can be less than or equal to 300, 200, or 150 mils. In some embodiments, the thickness can fall within a range of 60 to 300 mils, or 90 to 200 mils.

In various embodiments, the first glass layer 211 and the second glass layer 252 are the same thickness. In other embodiments, wherein the first glass layer 211 and the second glass layer 252 have different thicknesses.

In various embodiments, the polymeric material 262 may not be limited to being just between the glass layers of the interior laminate pane 212. By way of example, the polymeric material 262 can be disposed over at least a portion of a proximal end 272 of the interior laminate pane 212.

In various embodiments, the polymeric material 262 that is disposed over at least a portion of the proximal end 272 of the interior laminate pane 212 is the same as the polymeric material 262 disposed between the first glass layer 211 and the second glass layer 252. In various embodiments, the polymeric material 262 that is disposed over at least a portion of the proximal end 272 of the interior laminate pane 212 is integral with the polymeric material 262 disposed between the first glass layer 211 and the second glass layer 252. In various embodiments, the polymeric material 262 that is disposed over at least a portion of the proximal end 272 of the interior laminate pane 212 is joined to the polymeric material 262 disposed between the first glass layer 211 and the second glass layer 252 via thermal, mechanical, or chemical bonds, or other means.

In various embodiments, the proximal end 272 of the glass subassembly 113 can be received and seated within the channel 214.

An inside facing surface 284 can be on the interior laminate pane 212. An outside facing surface 282 can be on the exterior pane 227. In various embodiments, the outside facing surface 282 can be proximate the lower end 286 of the channel 214. In various embodiments, the outside facing surface 282 of the glass subassembly 113 is attached to the channel 214 of the frame member 102 with a glazing material 237. In various embodiments, a sealing spacer 226 can be disposed between the interior laminate pane 212 and the exterior pane 227.

Window or door assemblies herein can include a retention member 210. In various embodiments, the retention member 210 can engage at least a portion of the interior laminate pane 212. In various embodiments, the retention member 210 having an elongation and tensile strength sufficient to provide the glass subassembly 113 with shock absorption and force dissipation protection that meets or exceeds one or more of ASTM E1886 (pressure cycling), ASTM E1996 (large and small missile impact), TAS 201 (impact), and/or TAS 203 (pressure cycling) standards.

The retention member 210 can include a base portion 221. In various embodiments, the base portion 221 can extend along and engage at least a portion of the proximal end 272 of the glass subassembly 113. In various embodiments, the base portion 221 can be of a length sufficient to project into and engage a heel bead 225 within the channel 214 to couple the retention member 210 to the frame member 102. In various embodiments, the base portion 221 can extend along and engage at least a portion of the proximal end 272 of the glass subassembly 113. In various embodiments, the base portion 221 can be of a width sufficient to project into and engage the bed glazing 231 to couple the retention member 210 to the frame member 102.

A window or door assembly (not shown in this view) includes a glazing material 237. In various embodiments, the glazing material 237 can be disposed on the attachment surface 232 at the lower end 286 of the channel 214. The glazing material 237 can include a bed glazing 231. Optionally, the bed glazing 231 can include a heel bead 225 portion.

The window or door assembly can also include a glass stop 243. In some embodiments, the glass stop 243 can specifically be an interior glass stop, but the glass stop 243 can also be an exterior glass stop. The glass stop 243 includes a lower surface 228. In various embodiments, the glass stop 243 can have a body including a lower surface 228 that extends along the inside facing surface 284 of the glass subassembly 113. In some embodiments, the retention member 210 can be engaged between the lower surface 228 of the glass stop 243 and the inside facing surface 284 of the glass subassembly 113.

The frame member 102 and/or glass stop 243 can be formed of various materials. In some embodiment the frame member 102 and/or glass stop 243 can be formed of a solid or a hollow material. In some embodiment the frame member 102 and/or glass stop 243 can be formed of wood, a wood product, a composite including wood such as wood fibers, a polymer (such as PVC, polylactic acid, and the like), a composite including a polymer, a metal (including, but not limited to aluminum and stainless steel), a composite including glass fibers, fiberglass, a composite including ceramic materials, a composite including particulate materials, FIBREX, and the like. In various embodiments, the frame member 102 and/or glass stop 243 can be formed of an extruded profile. In various embodiments, the frame member 102 and/or glass stop 243 can be formed of a pultruded material.

In various embodiments, wherein the interior laminate pane 212 comprises a first glass layer, a second glass layer, and a polymeric material 262 disposed between the first glass layer 211 and the second glass layer.

In various embodiments, the retention member 210 includes a series of strips of a fibrous fabric or tape reinforcing material 404 applied in succession about the inside facing surface 284 and a proximal end 272 portion of the glass subassembly 113 received within the channel 214 of the frame. In various embodiments, the retention member 210 includes a body having a series of openings formed therethrough to facilitate passage of an adhesive material through the retention member. Further details of exemplary retention members 210 are described in greater detail below.

Figure 3:
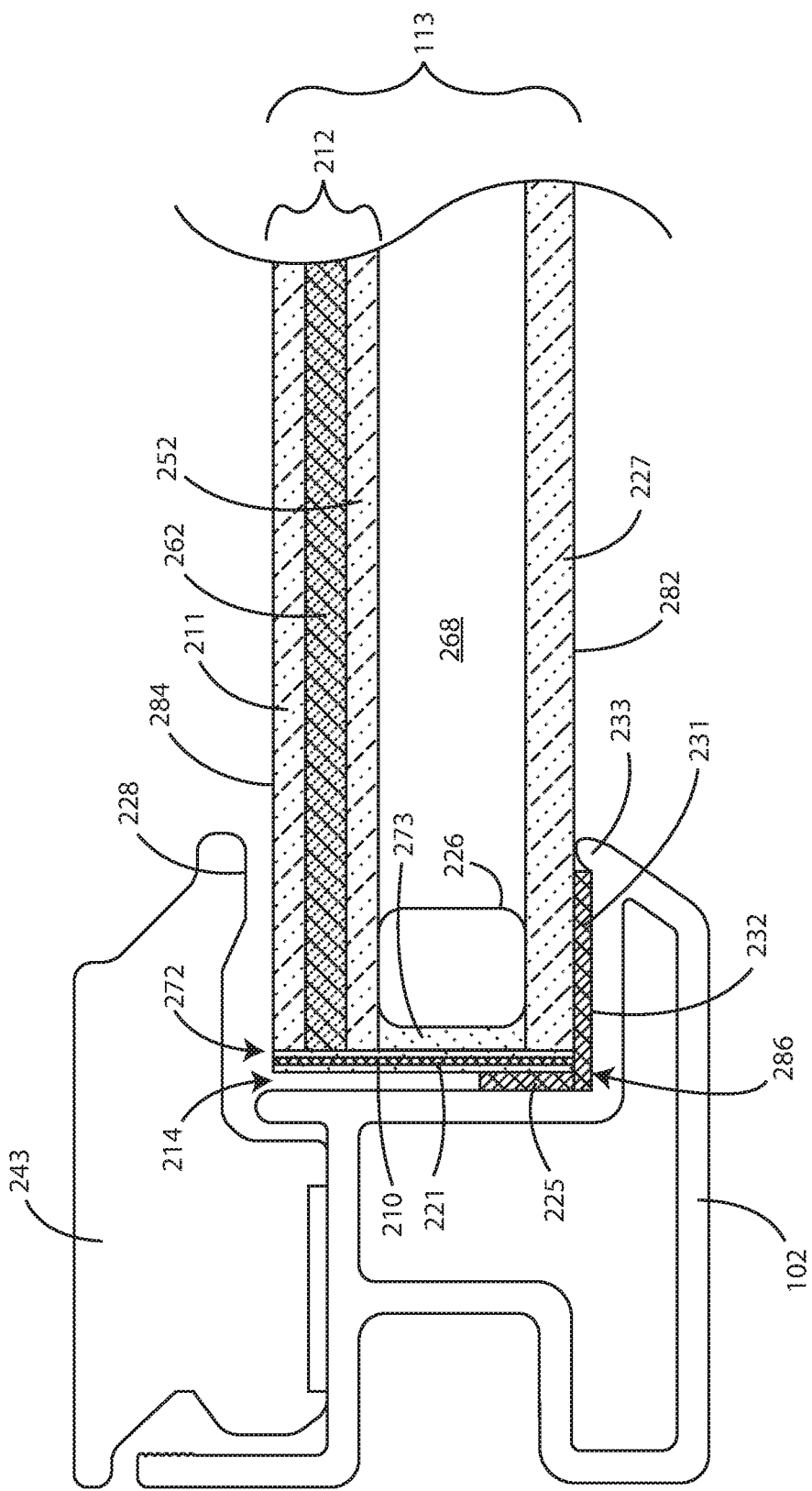
FIG. 3 is a cross-sectional view of a portion of an insulated glass fenestration unit in accordance with various embodiments herein.

It will be appreciated that retention members used herein can include a single layer of material or can include a plurality of layers of materials. Referring now to FIG. 3, a cross-sectional view of a portion of an insulated glass fenestration unit is shown in accordance with various embodiments herein. This view shows the frame member 102 with the attachment surface 232 and the edge 233. This view also shows the glass stop 243 including lower surface 228. This view also shows the channel 214 and the lower end 286. This view also shows the glass subassembly 113 including an interior laminate pane 212, an exterior pane 227, the glass subassembly 113 including a proximal end 272. The glass subassembly 113 also includes an inside facing surface 284, outside facing surface 282, and sealing spacer 226 and encloses space 268. The glass subassembly 113 also includes secondary sealant 273. A glazing material includes a bed glazing 231 and, in some embodiments, the bed glazing 231 includes a heel bead 225. The interior laminate pane 212 includes a first glass layer 211, second glass layer 252, and polymeric material 262 disposed there between. This view also shows a retention member 210 including a plurality of layers. The retention member 210 includes a base portion 221.

Many different constructions for retention members are contemplated herein. In some embodiments, retention members herein can include a single layer of material that can provide structural integrity as well as desired adhesion. However, in various embodiments, the retention member 210 can include multiple layers of materials with each layer serving a specific function. The following provides some non-limiting examples.

Figure 4:
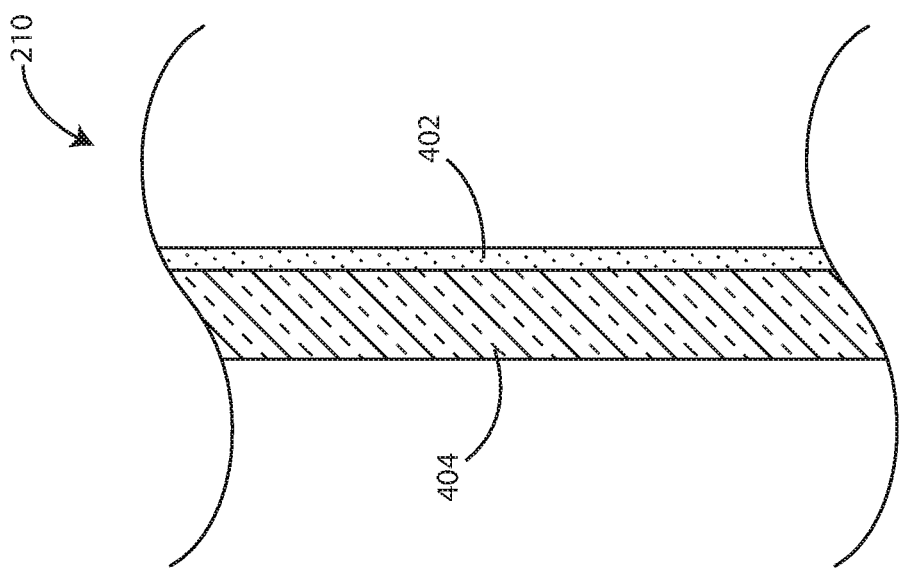
FIG. 4 is a cross-sectional view of a portion of a retention member in accordance with various embodiments herein.

Referring now to FIG. 4, a cross-sectional view of a portion of a retention member 210 is shown in accordance with various embodiments herein. The retention member 210 can include a reinforcing material 404. The retention member 210 can also include a polymeric layer 402. In some embodiments, the polymeric layer 402 can be and/or can function as an adhesive. In some embodiments, the reinforcing material 404 can be embedded within the polymeric layer 402. However, in other embodiments, the reinforcing material 404 and the polymeric layer 402 can be separate discrete components. In various embodiments, the reinforcing material 404 can be attached to a surface of the polymeric layer. In various embodiments, the reinforcing material 404 can be adhered to a surface of the polymeric layer.

The choice of adhesive for attachment of the retention member to the insulating glass subassembly (and for other adhesives herein) is not particularly limited, provided the adhesive bonds with sufficient strength to at least portions of the associated surfaces of the insulating glass subassembly and to the retention member, and provided that the bonding is long-term, without significant bond deterioration over the life of the window.

Adhesives herein can include pressure-sensitive adhesives (PSAs), hot melt adhesives, structural adhesives, and the like. One useful adhesive includes VHB transfer adhesive, available from 3M Company, of Maplewood, Minn. The VHB adhesive, which can be laminated to the retention member and is provided with a removable liner to protect the adhesive until the retention member is ready for application to the glazing unit, at which time the liner typically will be removed just prior to application.

Adhesives herein can also include silicone materials such as silicone RTV (room temperature vulcanizing) sealants are useful for attaching and sealing glass members to frames or sashes. Hot melt silicone materials have also been found useful. Both types of silicone materials are available in various grades from Dow Corning Corporation, Midland, Mich. Adhesives and sealants based on polyurethane, polyamide, polyvinyl acetate, other known polymers, and copolymers and other combinations thereof, may also be useful.

In some cases, it also can be useful to apply a primer to the interior side of the glass subassembly and/or other surfaces to which the adhesive materials for attachment of the retention member to the insulating glass subassembly, prior to application of retention member in order to further improve adhesion of retention member to the glass. Suitable primers are available from 3M, as well as from other sources. Suitable methods for applying liquids, in particular, the primer, to solid surfaces in well-defined strips are also well-known, and include the use of sponges, rollers, and combinations thereof, as well as other like fluid application devices. In other embodiments, retention member may be attached to subassembly by a flowable adhesive such as a silicone material of the type used in bed glazing.

Figure 5:
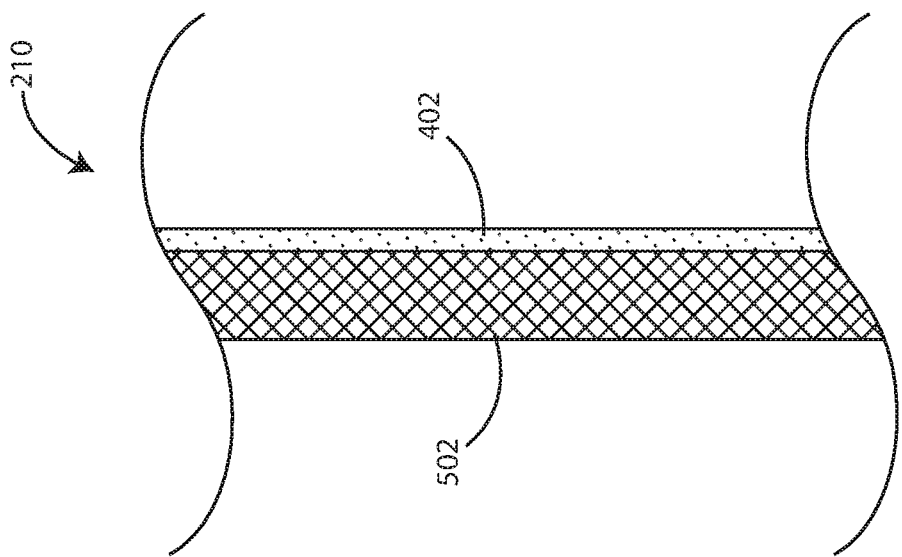
FIG. 5 is a cross-sectional view of a portion of a retention member in accordance with various embodiments herein.

In various embodiments herein, reinforcing material 404 can specifically include fibrous and/or non-fibrous materials. Referring now to FIG. 5, a cross-sectional view of a portion of a retention member 210 is shown in accordance with various embodiments herein. In this embodiment, the retention member 210 includes a fibrous reinforcing material 502. In some embodiments, a non-fibrous energy-absorbing material can be included, such as an elastomer, a rubber, or another flexible and/or compressible material. A polymeric layer 402, which could be an adhesive layer, or another type of polymeric layer can also be included. In various embodiments, wherein the fibrous reinforcing material 502 is adhered to a surface of the polymeric layer 402. In various embodiments, the fibrous reinforcing material 502 is integrated into the polymeric layer 402.

Figure 7:
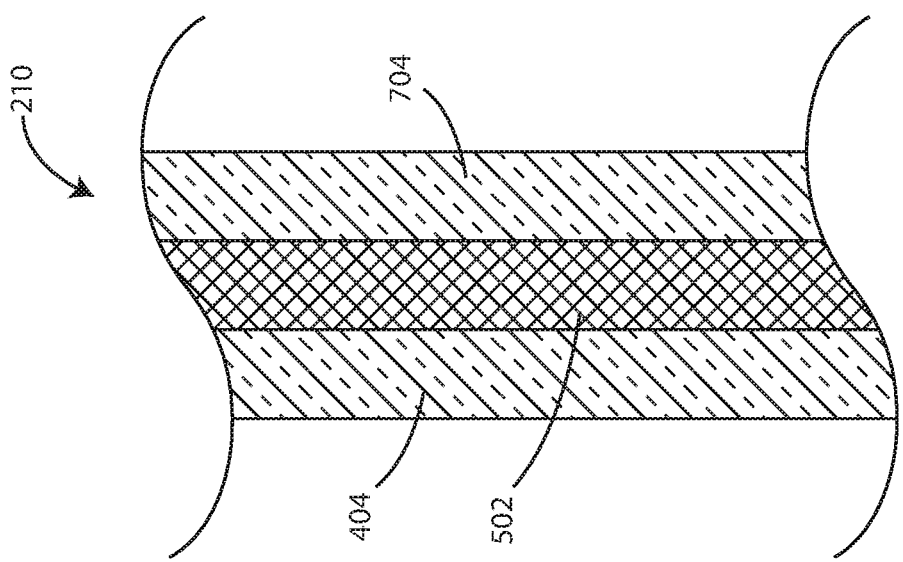
FIG. 7 is a cross-sectional view of a portion of a retention member in accordance with various embodiments herein.
Figure 6:
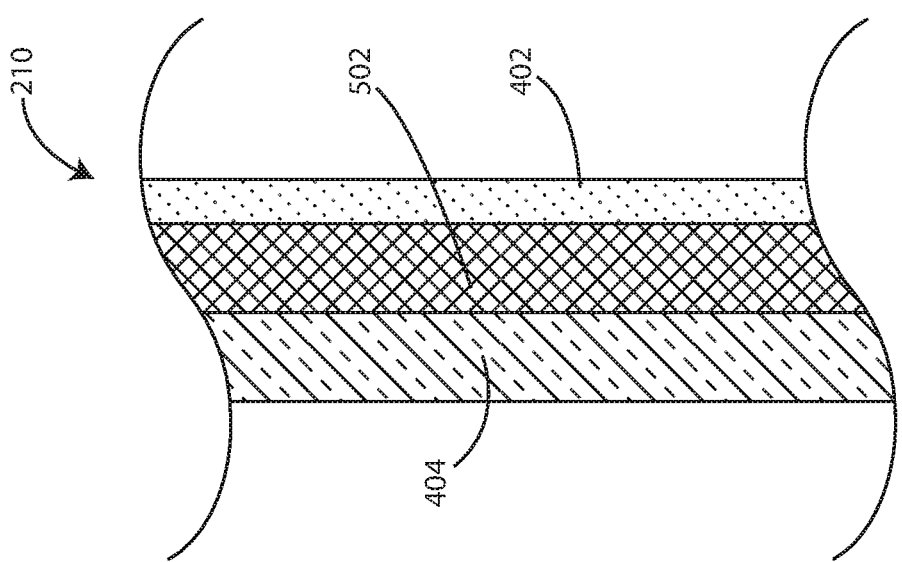
FIG. 6 is a cross-sectional view of a portion of a retention member in accordance with various embodiments herein.

In various embodiments herein, the retention member 210 can include three of more layers. Referring now to FIG. 6, a cross-sectional view of a portion of a retention member 210 is shown in accordance with various embodiments herein. In this embodiment, the retention member 210 includes a reinforcing material 404, a fibrous reinforcing material 502, and a polymeric layer 402. As before, in some embodiments the polymeric layer 402 can be an adhesive layer. However, in other embodiments, the polymeric layer 402 can include a non-adhesive polymer layer. Referring now to FIG. 7, a cross-sectional view of a portion of another example of a retention member 210 is shown in accordance with various embodiments herein. In this embodiment, the retention member 210 includes a reinforcing material 404, a fibrous reinforcing material 502, and a second reinforcing material 704 (or layer). Thus, in this example, the fibrous reinforcing material 502 is sandwiched between other materials, such as between a first polymeric layer and a second polymeric layer (and in some cases at least one of the polymeric layers can be an adhesive layer).

Figure 8:
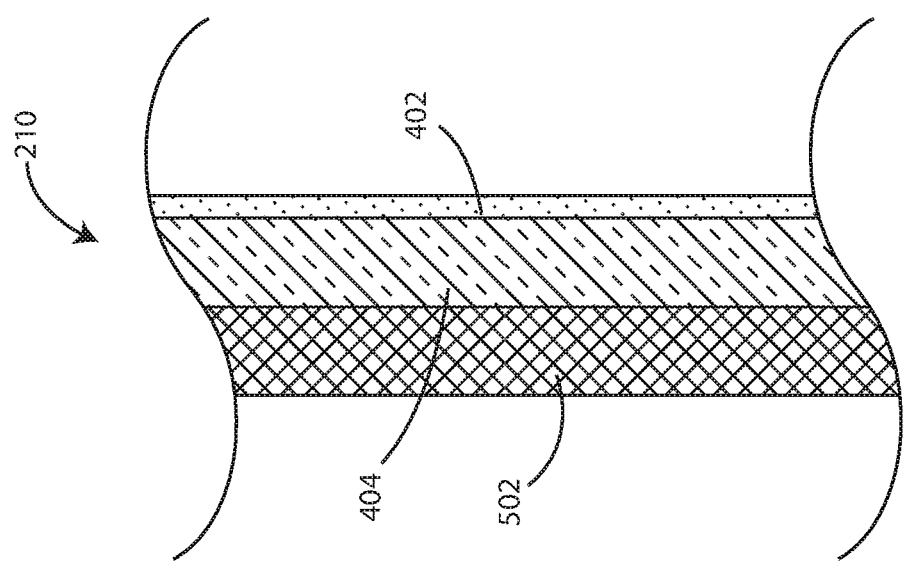
FIG. 8 is a cross-sectional view of a portion of a retention member in accordance with various embodiments herein.

Many different configurations are contemplated herein. Referring now to FIG. 8, a cross-sectional view of a portion of a retention member 210 is shown in accordance with various embodiments herein. In this example, the retention member 210 includes a reinforcing material 404, a fibrous reinforcing material 502, and a polymeric layer 402 (such as an adhesive layer).

Figure 9:
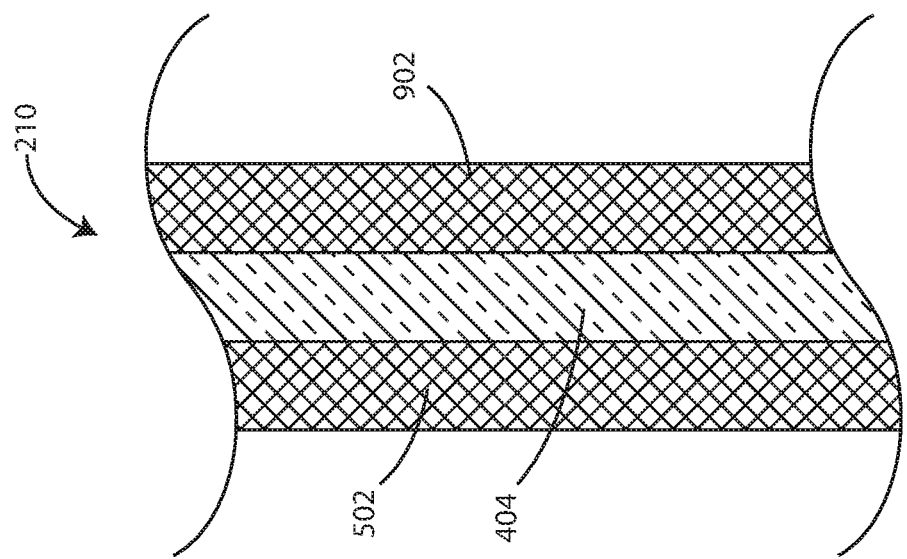
FIG. 9 is a cross-sectional view of a portion of a retention member in accordance with various embodiments herein.

In various embodiments, the retention member 210 can include at least two layers of a fibrous material. In various embodiments, the at least two layers can be separated by a non-fibrous material layer. Referring now to FIG. 9, a cross-sectional view of a portion of a retention member 210 is shown in accordance with various embodiments herein. In this embodiment, the retention member 210 includes a reinforcing material 404, a first fibrous reinforcing material 502, and a second fibrous reinforcing material layer 902.

Figure 10:
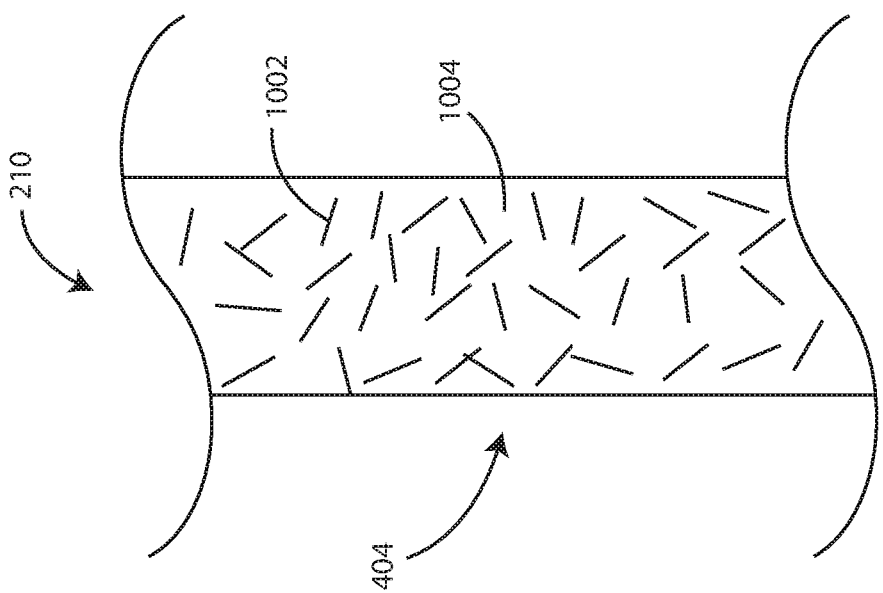
FIG. 10 is a cross-sectional view of a portion of a retention member in accordance with various embodiments herein.

In various embodiments, polymeric materials herein (including, but not limited to polymeric materials of the retention member, the various glazings, the frame, the glass stop, adhesives, sealants, and the like) can be filled with other components or materials. Referring now to FIG. 10, a cross-sectional view of a portion of a retention member 210 is shown in accordance with various embodiments herein. The retention member 210 includes a reinforcing material 404. The reinforcing material 404 can include a polymeric composition 1004 and a a filler material 1002. In various embodiments, the filler material 1002 can be entrained within the polymeric composition 1004. The filler material can be of various types and can have many different functions. In some embodiments, the filler material 1002 can include a modulus modifying material.

In various embodiments, the filler material 1002 can include particulates. In various embodiments, the filler material 1002 can include organic or inorganic materials. In some embodiments, the filler material 1002 can include at least one of talc and calcium carbonate.

In various embodiments, the filler material 1002 can include fibers. The fibers can be of various sizes. In some embodiments, the fiber length can be greater than or equal to 0.1 mm, 0.5 mm, 1 mm, 2 mm, 3 mm, 6 mm, 9 mm, 12 mm, or 15 mm. In some embodiments, the length can be less than or equal to 30 mm, 27 mm, 24 mm, 21 mm, 18 mm, or 15 mm. In some embodiments, the length can fall within a range of 0.1 mm to 30.0 mm, or 3 mm to 27 mm, or 6 mm to 24 mm, or 9 mm to 21 mm, or 12 mm to 18mm. In various embodiments, the fibers having an average length of greater than 0.5 mm and less than 10 mm.

The fibers can include many different materials. In some embodiments, the fibers comprising at least one of wood fibers, glass fibers, hybrid fibers, metal fibers, polyamide fibers (NYLON), para-aramid fibers (KEVLAR), and carbon fibers.

Figure 11:
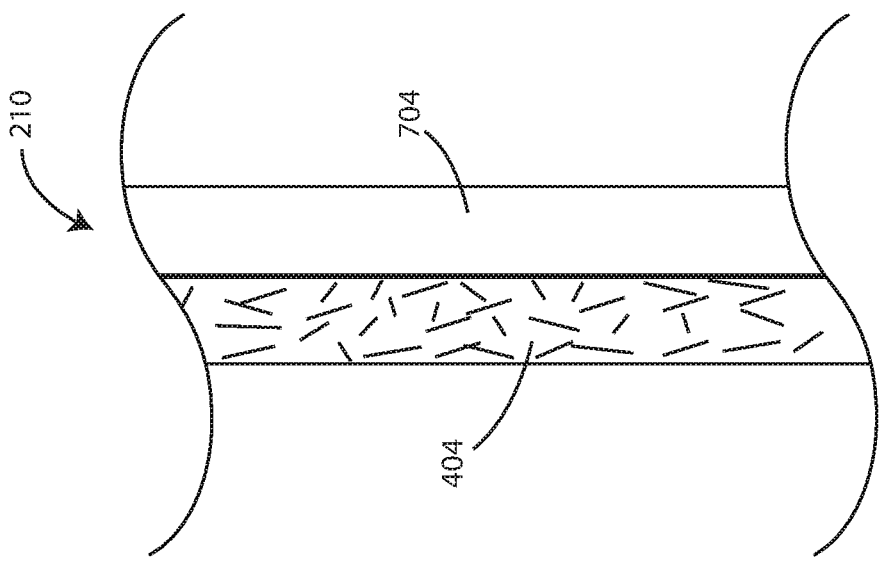
FIG. 11 is a cross-sectional view of a portion of a retention member in accordance with various embodiments herein.

In various embodiments herein, filled materials can be included along with non-filled materials. Referring now to FIG. 11, a cross-sectional view of a portion of a retention member 210 is shown in accordance with various embodiments herein. The retention member 210 includes first reinforcing material 404 (or layer) and second reinforcing material 704 (or layer). In this example, first reinforcing material 404 is filled with a filler material and second reinforcing material 704 is now.

Figure 12:
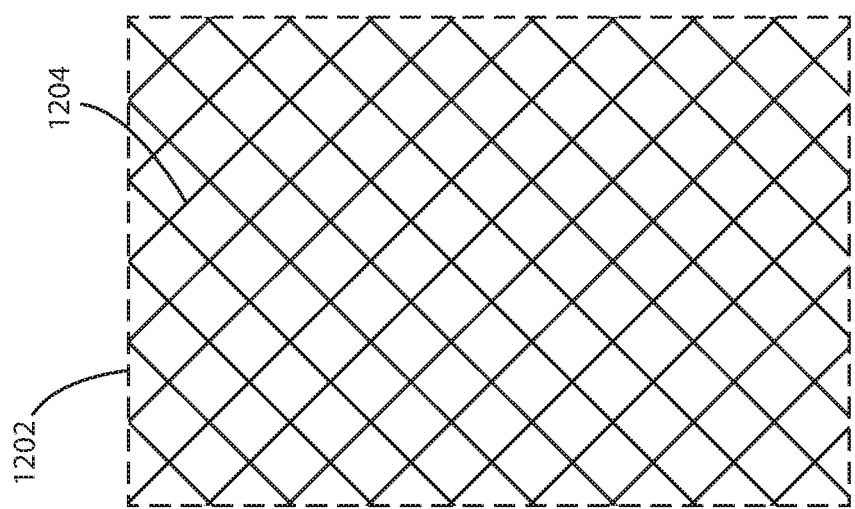
FIG. 12 is a schematic view of a mesh in accordance with various embodiments herein.

In some embodiments, a reinforcing material herein can specifically include a mesh or like materials such as a scrim. Referring now to FIG. 12, a schematic view of a mesh 1202 is shown in accordance with various embodiments herein. The mesh 1202 can include mesh strands 1204. In this example, at least some of the mesh stands are oriented at an angle. In various embodiments, the mesh 1202 specifically includes mesh strands 1204 extending at an angle to a surface normal (e.g., a geometric normal—a line normal to a plane) of the inside facing surface 284 on the interior laminate pane 212.

The angle of orientation is not particularly limited. However, in some embodiments, the strand angles can be greater than or equal to 0, 5, 10, 15, 20, 25, 30, 35, 40, or 45 degrees. In some embodiments, the strand angle can be less than or equal to 90, 85, 80, 75, 70, 65, 60, 55, 50, or 45 degrees. In some embodiments, the strand angle can fall within a range of 0 to 90 degrees, or 5 to 85 degrees, or 10 to 80 degrees, or 15 to 75 degrees, or 20 to 70 degrees, or 25 to 65 degrees, or 30 to 60 degrees, or 35 to 55 degrees, or 40 to 50 degrees, or can be about 45 degrees.

Figure 13:
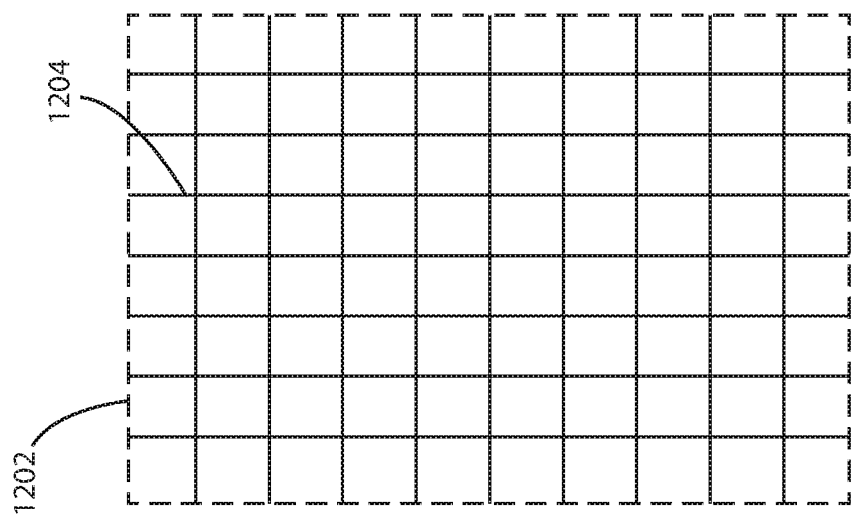
FIG. 13 is a schematic view of a mesh in accordance with various embodiments herein.

Referring now to FIG. 13, a schematic view of a mesh 1202 is shown in accordance with various embodiments herein. The mesh 1202 includes mesh strands 1204 extending substantially parallel to a surface normal of the glass subassembly along with mesh strands that are directly perpendicular thereto.

In some embodiments, multiple layers of a mesh can be used, while in other embodiments only a single layer of mesh is used. In some embodiments, the reinforcing material 404 can include at least two layers of a mesh.

Figure 14:
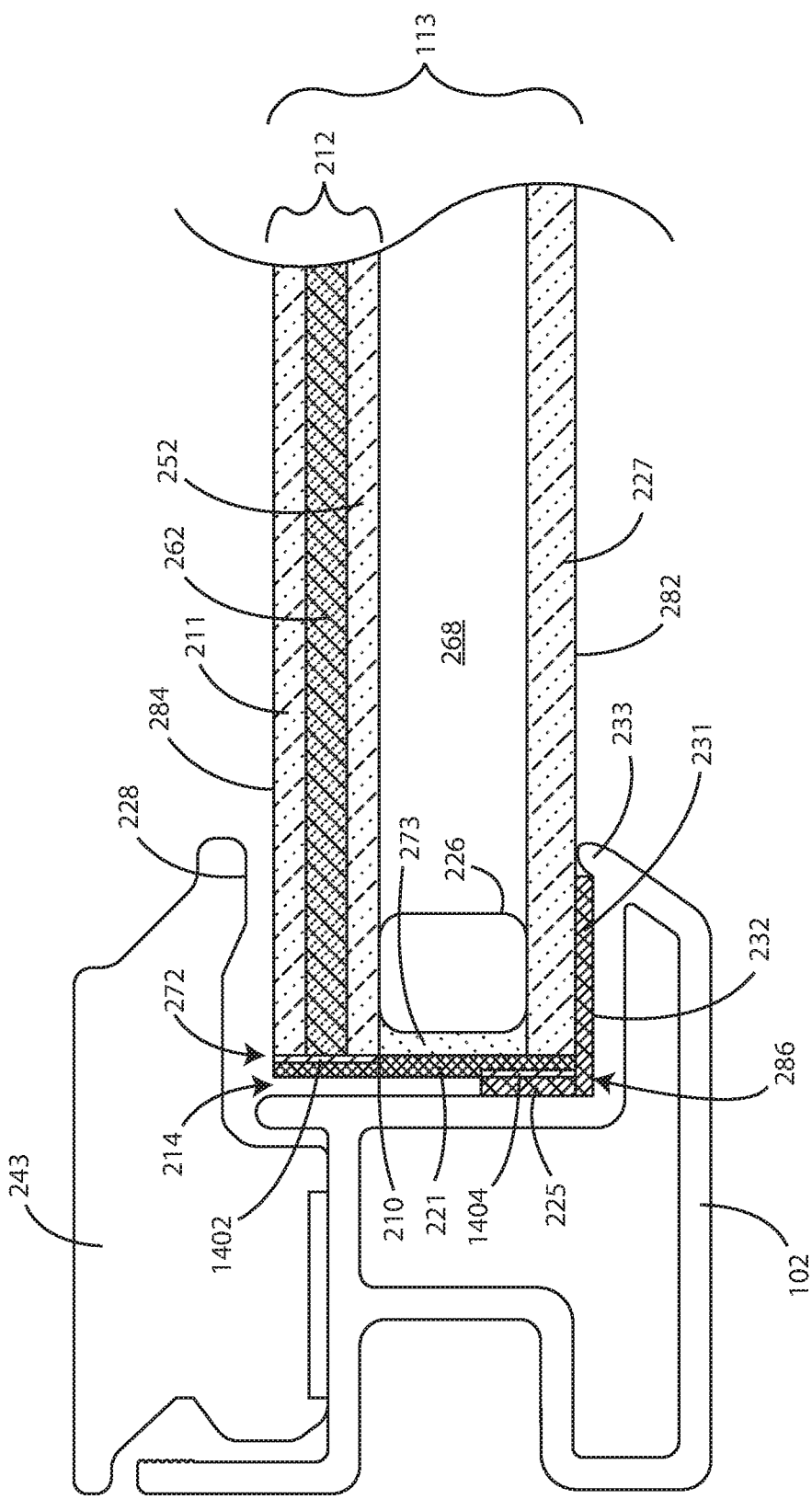
FIG. 14 is a cross-sectional view of a portion of an insulated glass fenestration unit in accordance with various embodiments herein.

Referring now to FIG. 14, a cross-sectional view of a portion of an insulated glass fenestration unit is shown in accordance with various embodiments herein. This view shows the frame member 102 with the attachment surface 232 and the edge 233. This view also shows the glass stop 243 including lower surface 228. This view also shows the channel 214 and the lower end 286. This view also shows the glass subassembly 113 including an interior laminate pane 212, an exterior pane 227, the glass subassembly 113 including a proximal end 272. The glass subassembly 113 also includes an inside facing surface 284, outside facing surface 282, and sealing spacer 226 and encloses space 268. The glass subassembly 113 also includes secondary sealant 273. A glazing material includes a bed glazing 231 and, in some embodiments, the bed glazing 231 includes a heel bead 225. The interior laminate pane 212 includes a first glass layer 211, second glass layer 252, and polymeric material 262 disposed there between.

The retention member 210 includes a base portion 221. The retention member 210 also includes a first surface portion 1402. The retention member 210 also includes a second surface portion 1404. First surface portion 1402 and the second surface portion 1404 can be optimized for adherence to materials with different properties, such as different surface energy. In various embodiments, the first surface portion 1402 can have a first surface energy and a second surface portion 1404 can have a second surface energy. In various embodiments, wherein the first surface portion 1402 and the second surface portion 1404 are disposed on opposite sides of the retention member. However, in some embodiments, the first surface portion 1402 and the second surface portion 1404 are disposed on the same side of the retention member but spaced from one another. In various embodiments, at least one of the first surface portion 1402 and the second surface portion 1404 comprises a priming material or other surface coating or treatment to alter properties thereof.

In some embodiments, the size of the inside facing surface 284 of the interior laminate pane 212 can be less than the size of an outside facing surface 1584 of the interior laminate pane 212. As such, in various embodiments, a width and/or height of the inside facing surface 284 less than a width and/or height of the outside facing surface. As one example, the first glass layer 211 can be smaller than the second glass layer 252. As another example, the interior laminate pane 212 can be tapered inward around its periphery. In some embodiments, the retention member can follow the taper of the interior laminate pane 212.

Figure 15:
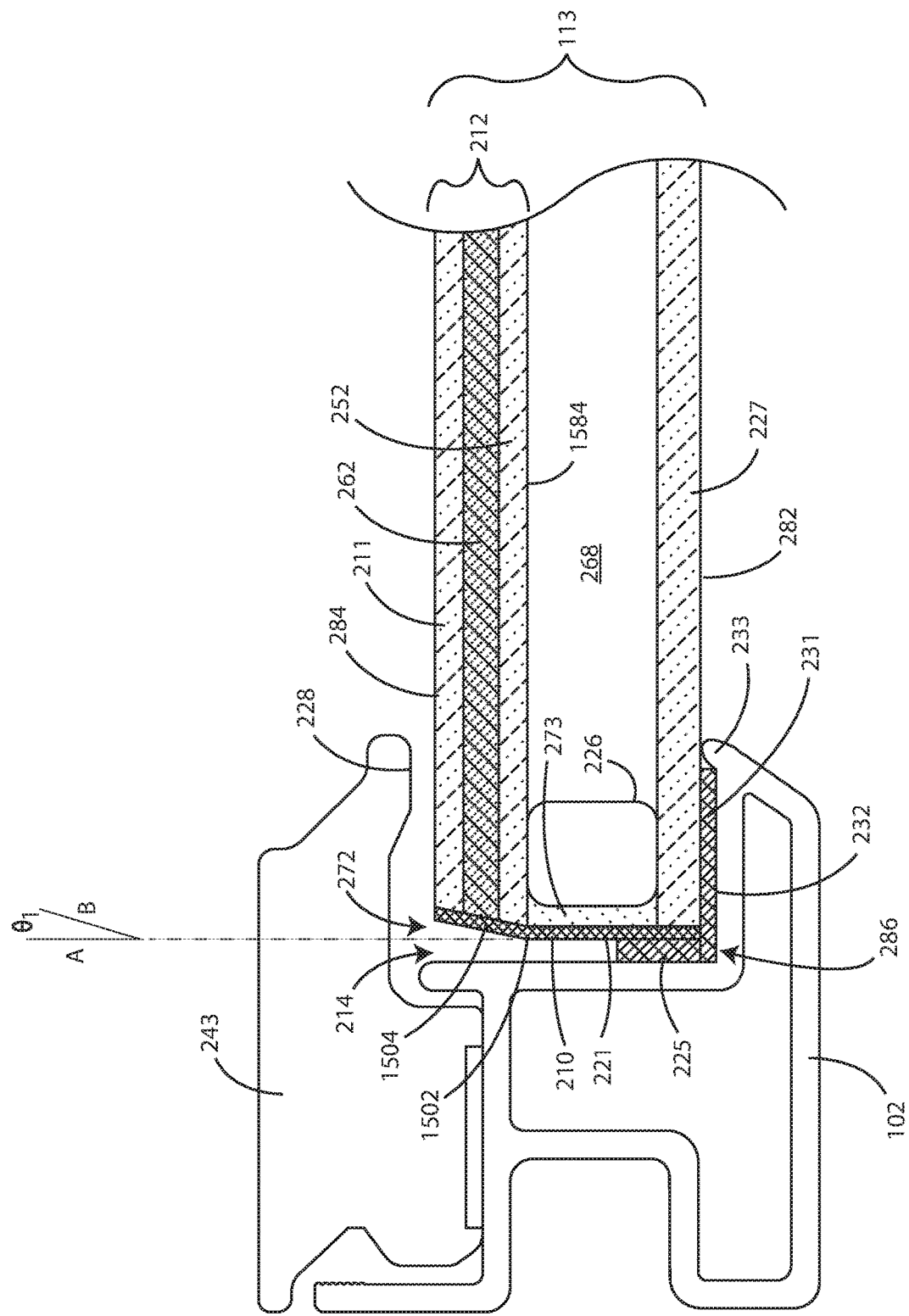
FIG. 15 is a cross-sectional view of a portion of an insulated glass fenestration unit in accordance with various embodiments herein.

Referring now to FIG. 15, a cross-sectional view of a portion of an insulated glass fenestration unit is shown in accordance with various embodiments herein. This view shows the frame member 102 with the attachment surface 232 and the edge 233. This view also shows the glass stop 243 including lower surface 228. This view also shows the channel 214 and the lower end 286. This view also shows the glass subassembly 113 including an interior laminate pane 212, an exterior pane 227, the glass subassembly 113 including a proximal end 272. The glass subassembly 113 also includes an inside facing surface 284, outside facing surface 282, and sealing spacer 226 and encloses space 268. The glass subassembly 113 also includes secondary sealant 273. A glazing material includes a bed glazing 231 and, in some embodiments, the bed glazing 231 includes a heel bead 225. The interior laminate pane 212 includes a first glass layer 211, second glass layer 252, and polymeric material 262 disposed there between.

The window or door assembly also includes a retention member 210 to help secure the interior laminate pane 212. The retention member 210 includes a base portion 221. The retention member 210 also includes a fold 1502. The retention member 210 also includes an angled base portion 1504. The angled base portion 1504 follows an angled portion of the edge of the interior laminate pane 212.

In this example, a contact distance between the polymeric material 262 disposed between the first glass layer 211 and the second glass layer 252 and the retention member 210 is different than a thickness of the polymeric material 262 disposed between the first glass layer 211 and the second glass layer 252. In specific, the contact distance between the polymeric material 262 disposed between the first glass layer 211 and the second glass layer 252 and the retention member 210 is different than a thickness of the polymeric material 262 disposed between the first glass layer 211 and the second glass layer 252. While not intending to be bound by theory, the interface between (directly or indirectly) the polymeric material 262 and other components, such as the retention member 210 is believed to impact the structural integrity of the window or door assembly, and, specifically the structural integrity of the interior laminate pane 212 within the frame. By angling the interior laminate pane 212 inward, the contact distance can be increased without increasing the thickness of the polymeric material 262 within the interior laminate pane 212.

The contact area (B) for this configuration can be approximated as $B=(A/\cos \theta_1)$, where the larger $\theta_1$ is up to 90 degrees, the larger the contact area is. In various embodiments $\theta_1$ can be greater than or equal to 0, 5, 10, 15, 20, 25, 30, 35, 40, or 45 degrees. In some embodiments, the strand angle can be less than or equal to 90, 85, 80, 75, 70, 65, 60, 55, 50, or 45 degrees. In some embodiments, the strand angle can fall within a range of 0 to 90 degrees, or 5 to 85 degrees, or 10 to 80 degrees, or 15 to 75 degrees, or 20 to 70 degrees, or 25 to 65 degrees, or 30 to 60 degrees, or 35 to 55 degrees, or 40 to 50 degrees, or can be about 45 degrees.

However, as will be seen regarding further examples described herein, the example of FIG. 15 is not the only way to increase contact area between the polymeric material 262 and other components of the system. Further, in contrast to the embodiment of FIG. 15, in other embodiments a contact distance between the polymeric material 262 disposed between the first glass layer 211 and the second glass layer 252 and the retention member 210 is the same as a thickness of the polymeric material 262 disposed between the first glass layer 211 and the second glass layer.

Figure 16:
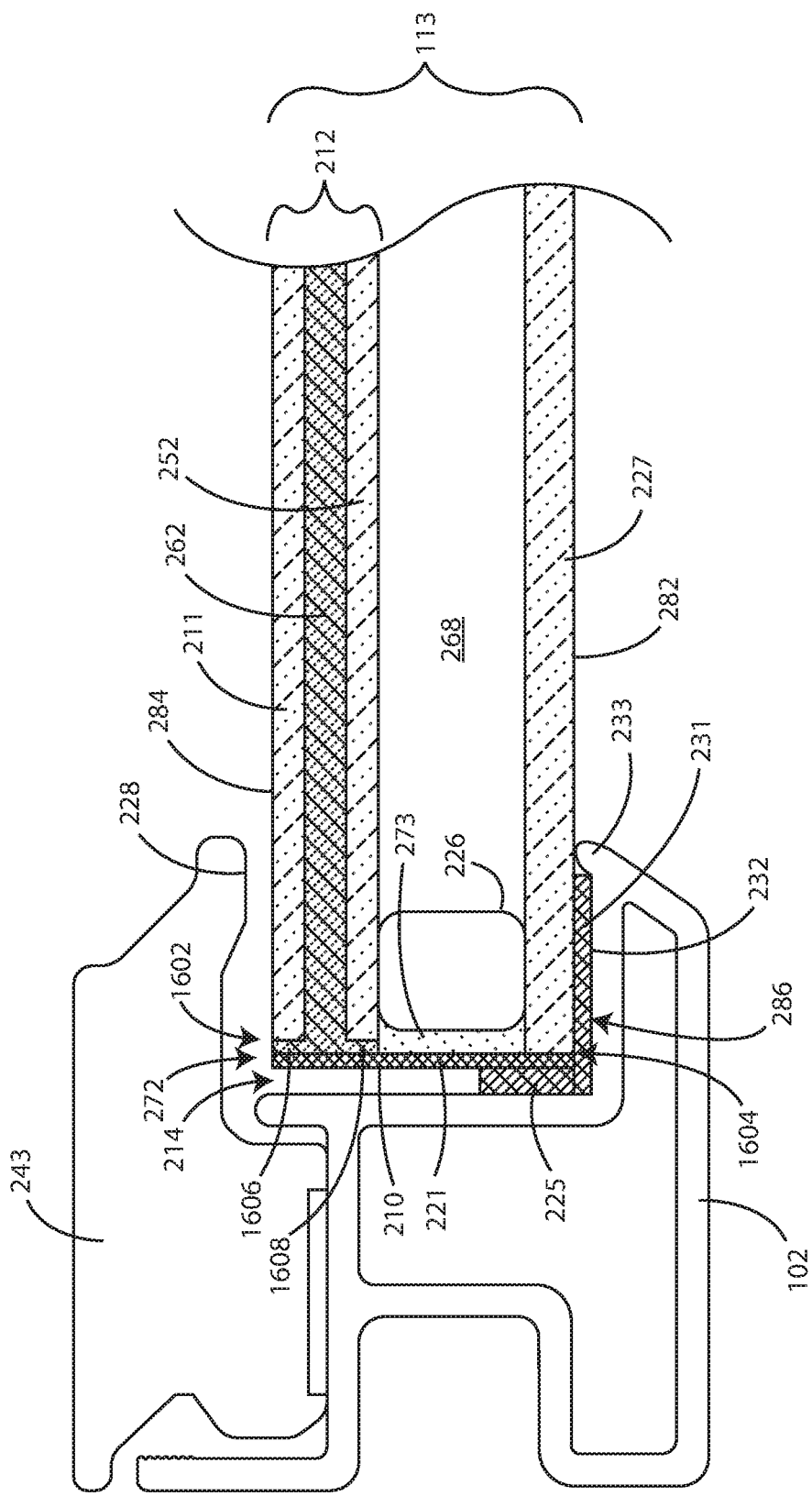
FIG. 16 is a cross-sectional view of a portion of an insulated glass fenestration unit in accordance with various embodiments herein.

Referring now to FIG. 16, a cross-sectional view of a portion of an insulated glass fenestration unit is shown in accordance with various embodiments herein. This view shows the frame member 102 with the attachment surface 232 and the edge 233. This view also shows the glass stop 243 including lower surface 228. This view also shows the channel 214 and the lower end 286. This view also shows the glass subassembly 113 including an interior laminate pane 212, an exterior pane 227, the glass subassembly 113 including a proximal end 272. The glass subassembly 113 also includes an inside facing surface 284, outside facing surface 282, and sealing spacer 226 and encloses space 268. The glass subassembly 113 also includes secondary sealant 273. A glazing material includes a bed glazing 231 and, in some embodiments, the bed glazing 231 includes a heel bead 225. The interior laminate pane 212 includes a first glass layer 211, second glass layer 252, and polymeric material 262 disposed there between. The window or door assembly also includes a retention member 210 to help secure the interior laminate pane 212. The retention member 210 includes a base portion 221.

The interior laminate pane 212 also includes a proximal end 1602 of interior laminate pane 212. The exterior pane 227 includes a proximal end 1604 of exterior pane 227. In this embodiment, the proximal end 1602 of interior laminate pane 212 and the proximal end 1604 of exterior pane 227 are not coterminous. Rather, the proximal end 1604 of exterior pane 227 extends outward a greater distance than proximal end 1602 of interior laminate pane 212.

The specific amount of this distance is not particular limited, but, in various embodiments can be greater than or equal to 1 mm, 2 mm, 3 mm, 3 mm, 4 mm, or 5 mm. In some embodiments, the distance can be less than or equal to 20 mm, 17 mm, 14 mm, 11 mm, 8 mm, or 5 mm. In some embodiments, the distance can fall within a range of 1 mm to 20 mm, or 2 mm to 17 mm, or 3 mm to 14 mm, or 3 mm to 11 mm, or 4 mm to 8 mm, or can be about 5 mm.

In various embodiments, a polymeric material is disposed over at least a portion of the proximal end 272 of the interior laminate pane. While not intending to be bound by theory, this is believed to enhance adhesion and structural integrity. This can be achieved in various ways. By way of example, in some embodiments, excessive polymeric material resulting from the assembly process can be left behind instead of removed. In other embodiments, the coverage of the polymeric material can be intentionally extended.

In this embodiment, the interior laminate pane 212 includes an inner overlapping polymeric composition 1606. The inner overlapping polymeric composition 1606 overlaps a portion of the proximal end 1602 of interior laminate pane 212. The interior laminate pane 212 also includes an outer overlapping polymeric composition 1608. The outer overlapping polymeric composition 1608 also overlaps a portion of the proximal end 1602 of interior laminate pane 212. In some embodiments, the inner overlapping polymeric composition 1606 and the outer overlapping polymeric composition 1608 can be the same as the polymeric material 262 disposed between the first glass layer 211 and the second glass layer 252. However, in other embodiments, these components can be formed of different polymer compositions.

In various embodiments, the polymeric material 262 disposed over at least a portion of the proximal end 272 of the interior laminate pane 212 is integral with the polymeric material 262 disposed between the first glass layer 211 and the second glass layer 252. In various embodiments, the polymeric material 262 disposed over at least a portion of the proximal end 272 of the interior laminate pane 212 is joined to the polymeric material 262 disposed between the first glass layer 211 and the second glass layer 252 via a thermal, mechanical, or chemical bond.

Figure 17:
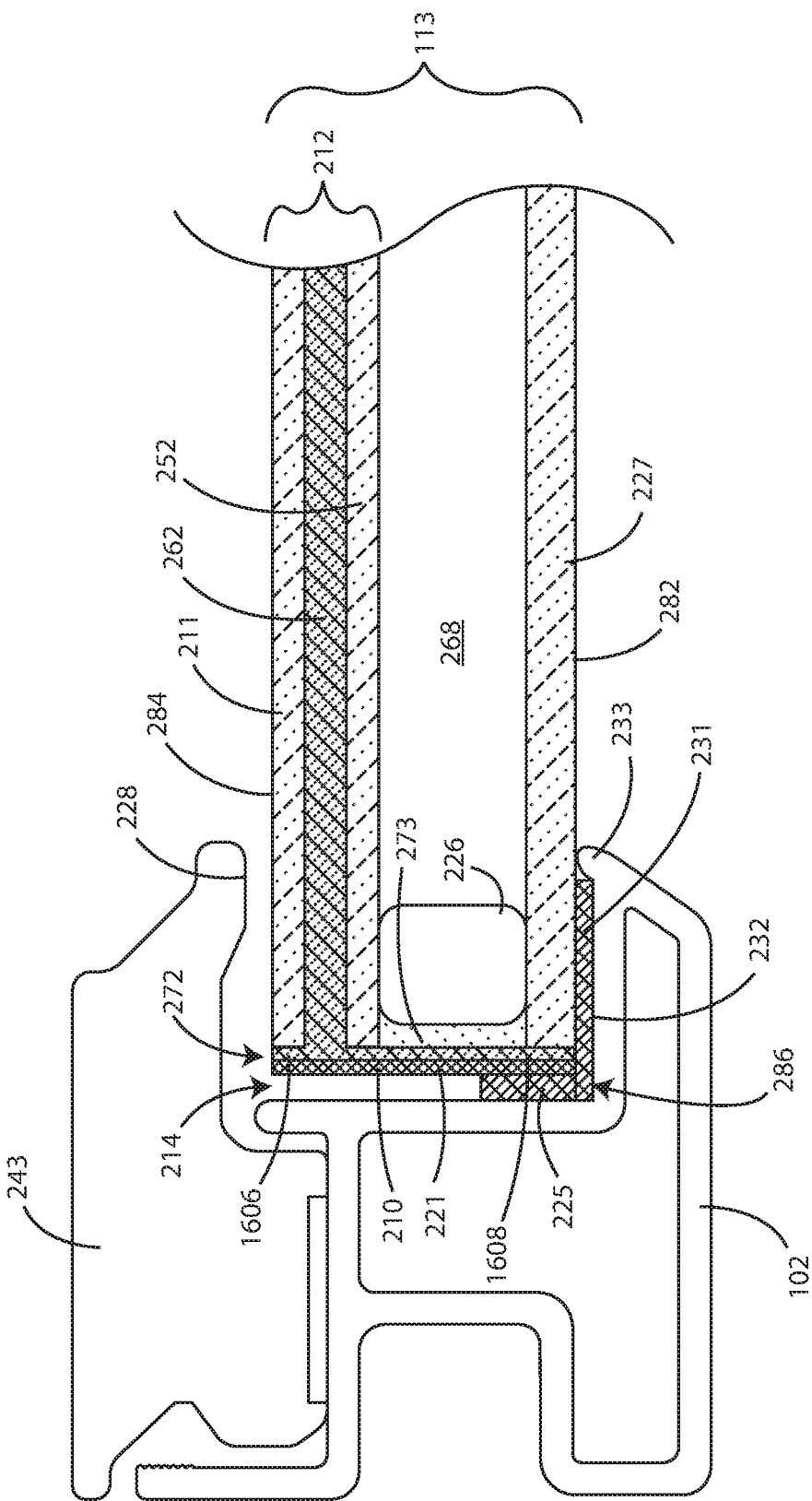
FIG. 17 is a cross-sectional view of a portion of an insulated glass fenestration unit in accordance with various embodiments herein.

Referring now to FIG. 17, a cross-sectional view of a portion of an insulated glass fenestration unit is shown in accordance with various embodiments herein. FIG. 17 is generally like FIG. 16. However, in this embodiment, the outer overlapping polymeric composition 1608 overlaps the secondary sealant 273 and the exterior pane 227. In some embodiments, the outer overlapping polymeric composition 1608 is flush with outside facing surface 282.

Figure 18:
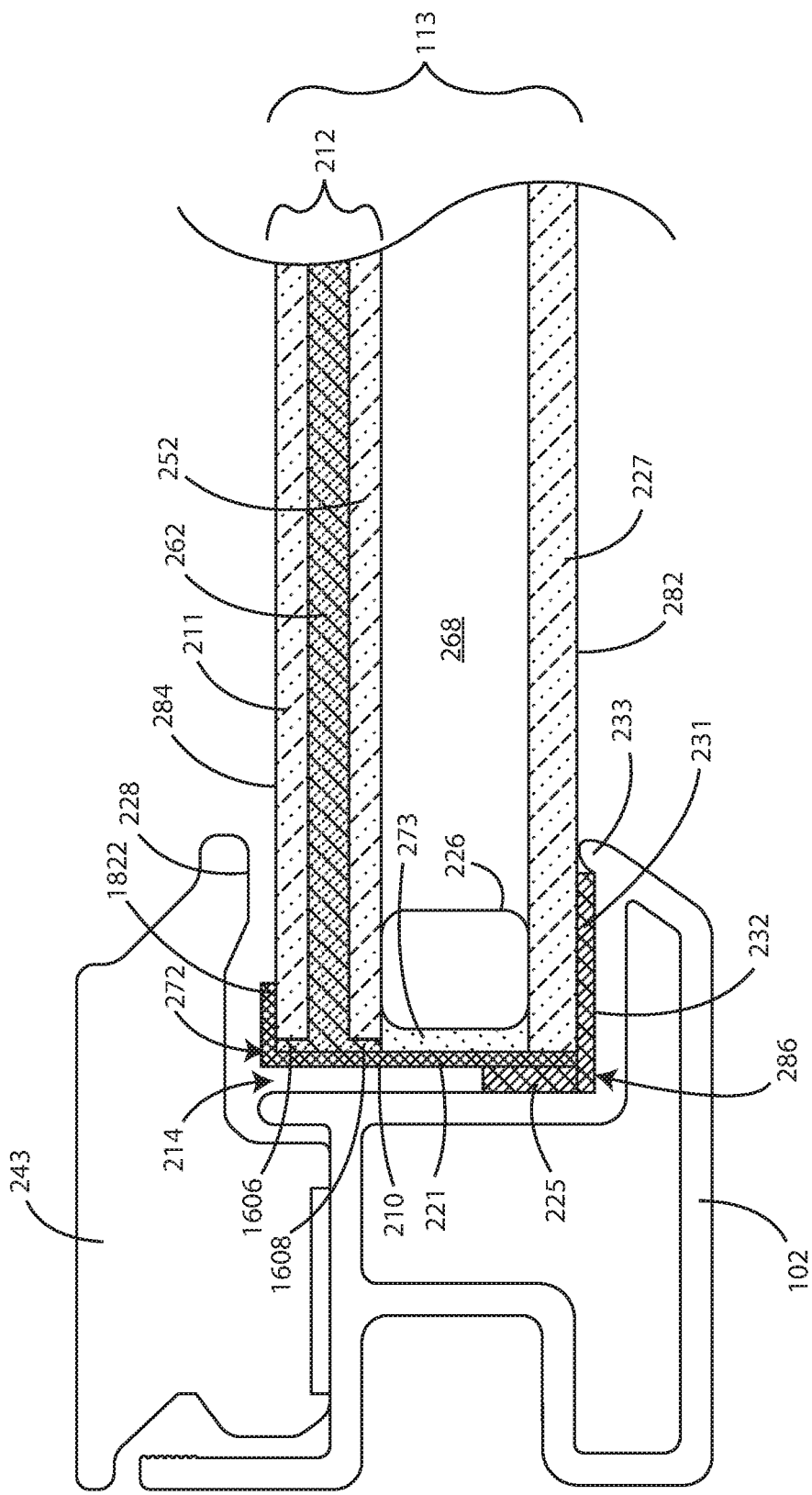
FIG. 18 is a cross-sectional view of a portion of an insulated glass fenestration unit in accordance with various embodiments herein.

Referring now to FIG. 18, a cross-sectional view of a portion of an insulated glass fenestration unit is shown in accordance with various embodiments herein. This view shows the frame member 102 with the attachment surface 232 and the edge 233. This view also shows the glass stop 243 including lower surface 228. This view also shows the channel 214 and the lower end 286. This view also shows the glass subassembly 113 including an interior laminate pane 212, an exterior pane 227, the glass subassembly 113 including a proximal end 272. The glass subassembly 113 also includes an inside facing surface 284, outside facing surface 282, and sealing spacer 226 and encloses space 268. The glass subassembly 113 also includes secondary sealant 273. A glazing material includes a bed glazing 231 and, in some embodiments, the bed glazing 231 includes a heel bead 225. The interior laminate pane 212 includes a first glass layer 211, second glass layer 252, and polymeric material 262 disposed there between. The window or door assembly also includes a retention member 210 to help secure the interior laminate pane 212. The retention member 210 includes a base portion 221.

In this embodiment, the retention member 210 also includes a leg portion 1822. In various embodiments, the leg portion 1822 can project at an angle with respect to the elongated base portion 221 and attached to the inside facing surface 284 of the glass subassembly. In various embodiments, the leg portion 1822 can overlap a portion of the inside facing surface 284 on the interior laminate pane 212.

Figure 19:
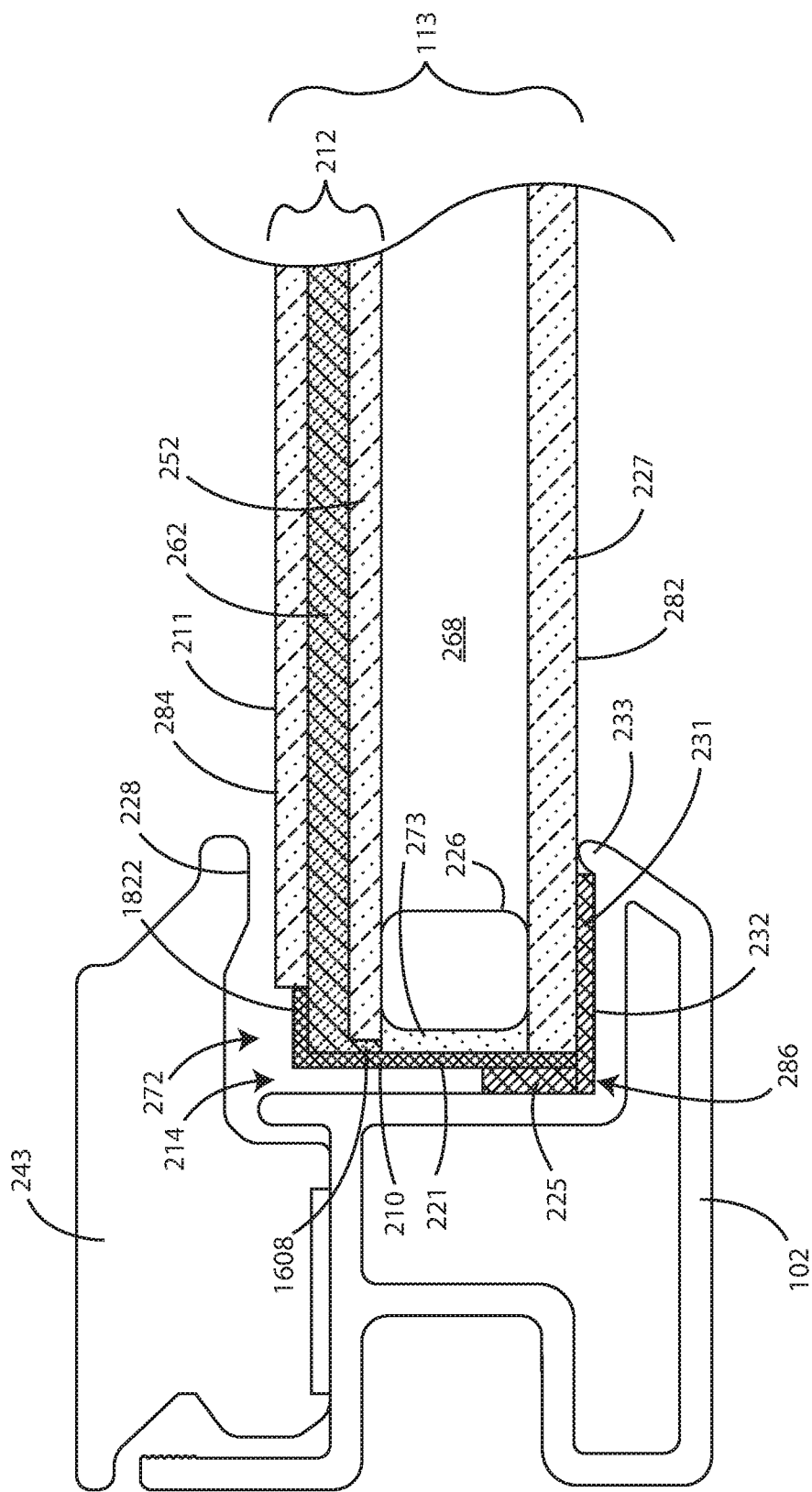
FIG. 19 is a cross-sectional view of a portion of an insulated glass fenestration unit in accordance with various embodiments herein.

Referring now to FIG. 19, a cross-sectional view of a portion of an insulated glass fenestration unit is shown in accordance with various embodiments herein. This view shows the frame member 102 with the attachment surface 232 and the edge 233. This view also shows the glass stop 243 including lower surface 228. This view also shows the channel 214 and the lower end 286. This view also shows the glass subassembly 113 including an interior laminate pane 212, an exterior pane 227, the glass subassembly 113 including a proximal end 272. The glass subassembly 113 also includes an inside facing surface 284, outside facing surface 282, and sealing spacer 226 and encloses space 268. The glass subassembly 113 also includes secondary sealant 273. A glazing material includes a bed glazing 231 and, in some embodiments, the bed glazing 231 includes a heel bead 225. The interior laminate pane 212 includes a first glass layer 211, second glass layer 252, and polymeric material 262 disposed there between.

The window or door assembly also includes a retention member 210 to help secure the interior laminate pane 212. The retention member 210 includes a base portion 221. The retention member 210 also includes a leg portion 1822. In this embodiment, the leg portion 1822 can overlap a surface of polymeric material 262 that is exposed by virtue of the first glass layer 211 being smaller and having a peripheral edge inward from the second glass layer 252. This configuration can substantially increase the contact area between the polymeric material 262 and the retention member 210.

In various embodiments, a polymeric material of the retention member is the same as the polymeric material 262 disposed between the first glass layer 211 and the second glass layer 252. In various embodiments, a polymeric material of the retention member is integral with the polymeric material 262 disposed between the first glass layer 211 and the second glass layer 252. In various embodiments, the polymeric material of the retention member is attached to the polymeric material 262 disposed between the first glass layer 211 and the second glass layer 252 through a thermal, mechanical, or chemical bond, or through other means.

Figure 20:
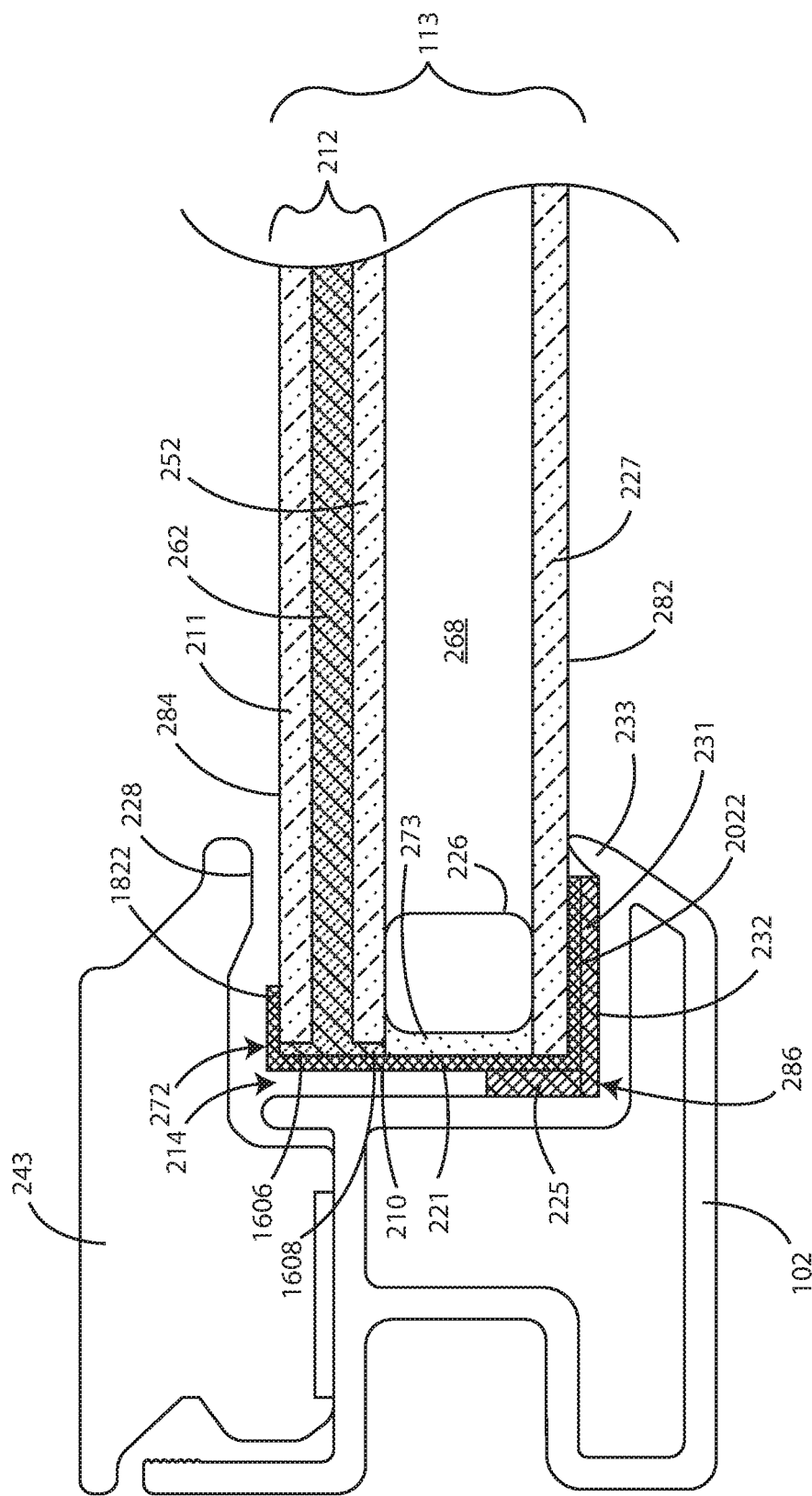
FIG. 20 is a cross-sectional view of a portion of an insulated glass fenestration unit in accordance with various embodiments herein.

Referring now to FIG. 20, a cross-sectional view of a portion of an insulated glass fenestration unit is shown in accordance with various embodiments herein. FIG. 20 is like FIG. 18. However, in this embodiment, the retention member 210 includes a base portion 221, a leg portion 1822, and a bed 2022 portion that is adjacent the bed glazing and that overlaps a portion of the outside facing surface 282.

Figure 21:
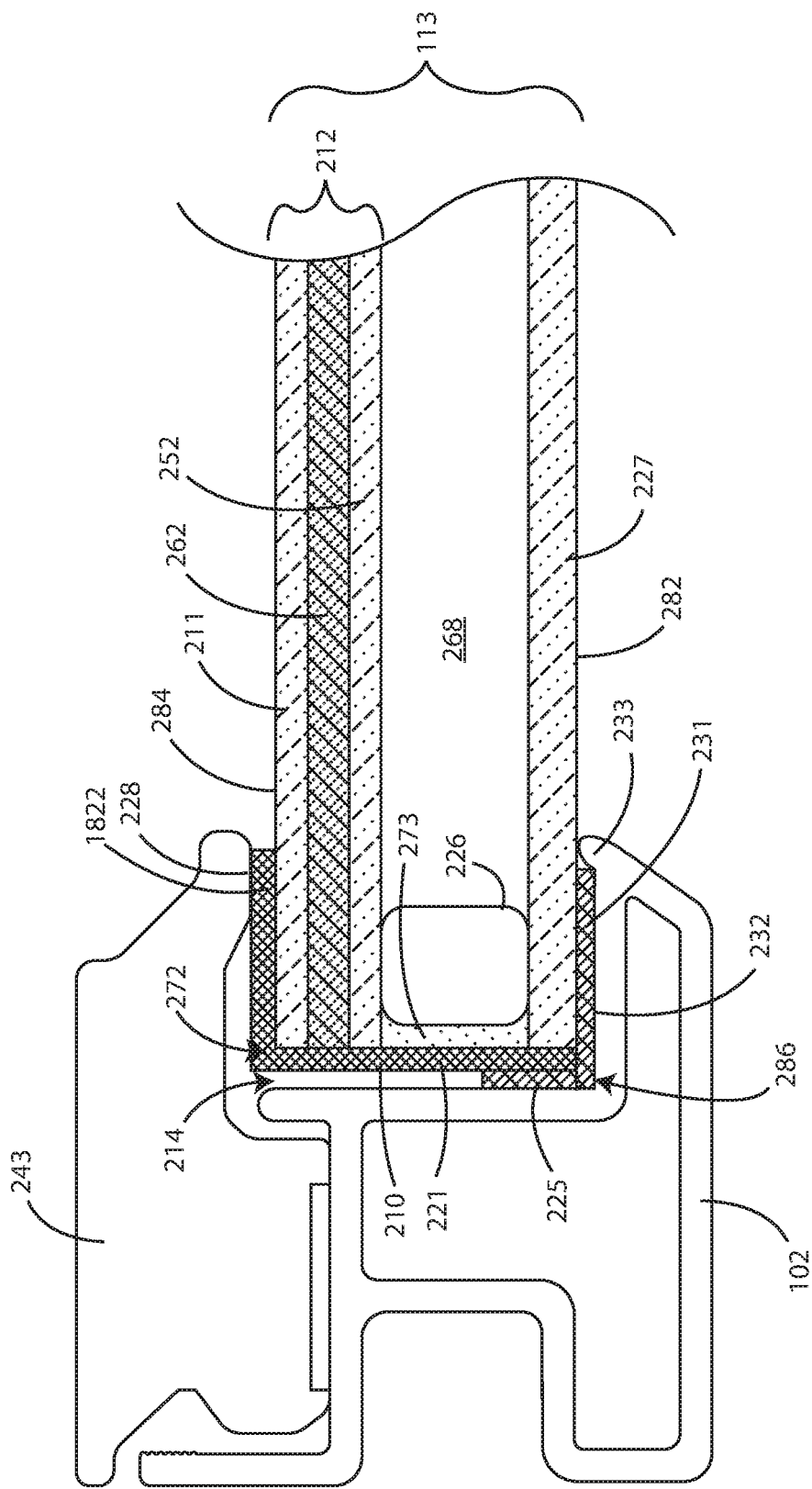
FIG. 21 is a cross-sectional view of a portion of an insulated glass fenestration unit in accordance with various embodiments herein.

In some embodiments, various configurations are included herein that result in the glass stop contributing more substantially to the overall strength of the structure. Referring now to FIG. 21, a cross-sectional view of a portion of an insulated glass fenestration unit is shown in accordance with various embodiments herein. This view shows the frame member 102 with the attachment surface 232 and the edge 233. This view also shows the channel 214 and the lower end 286. This view also shows the glass subassembly 113 including an interior laminate pane 212, an exterior pane 227, the glass subassembly 113 including a proximal end 272. The glass subassembly 113 also includes an inside facing surface 284, outside facing surface 282, and sealing spacer 226 and encloses space 268. The glass subassembly 113 also includes secondary sealant 273. A glazing material includes a bed glazing 231 and, in some embodiments, the bed glazing 231 includes a heel bead 225. The interior laminate pane 212 includes a first glass layer 211, second glass layer 252, and polymeric material 262 disposed there between.

This view also shows the glass stop 243 including lower surface 228. The retention member 210 includes a base portion 221 and a leg portion 1822. The leg portion 1822 can pass between the lower surface 228 of the glass stop 243 and the inside facing surface 284 of the interior laminate pane 212.

In various embodiments, further components can be included to increase the structural integrity of the door or window assembly. For example, in some embodiments, a material or structure can be disposed between the proximal end 272 and/or the retention member 210 and the frame member 102.

Figure 22:
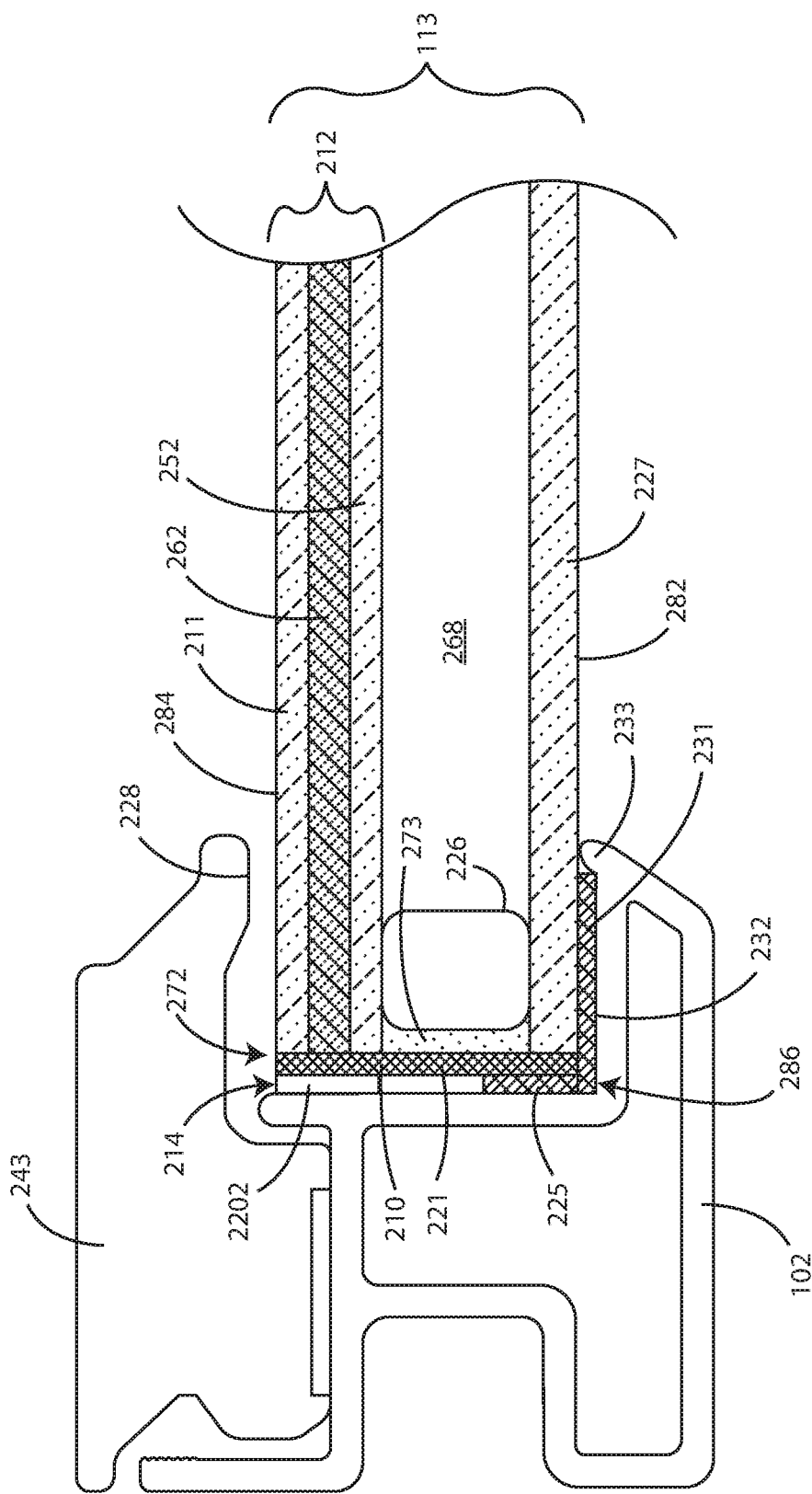
FIG. 22 is a cross-sectional view of a portion of an insulated glass fenestration unit in accordance with various embodiments herein.

Referring now to FIG. 22, a cross-sectional view of a portion of an insulated glass fenestration unit is shown in accordance with various embodiments herein. This view shows the frame member 102 with the attachment surface 232 and the edge 233. This view also shows the glass stop 243 including lower surface 228. This view also shows the channel 214 and the lower end 286. This view also shows the glass subassembly 113 including an interior laminate pane 212, an exterior pane 227, the glass subassembly 113 including a proximal end 272. The glass subassembly 113 also includes an inside facing surface 284, outside facing surface 282, and sealing spacer 226 and encloses space 268. The glass subassembly 113 also includes secondary sealant 273. A glazing material includes a bed glazing 231 and, in some embodiments, the bed glazing 231 includes a heel bead 225. The interior laminate pane 212 includes a first glass layer 211, second glass layer 252, and polymeric material 262 disposed there between. The window or door assembly also includes a retention member 210 to help secure the interior laminate pane 212. The retention member 210 includes a base portion 221.

In various embodiments, a back glazing material 2202 is further included and is positioned between the proximal end 272 of the glass subassembly 113 and the frame member. In some embodiments, there is a gap between the heel bead 225 and/or bed glazing 231 and the back glazing material 2202. In various embodiments, the back glazing material 2202 can be the same as the material used for the bed glazing 231 and/or the heel bead 225. However, in other embodiments, different materials can be used.

In various embodiments, a shim can used in place of or in addition to the back glazing material 2202. The shim can serve to limit lateral motion between the proximal end 272 of the glass subassembly 113 and the frame member 102.

In some embodiments, the glass stop 243 can include structures to allow it to contribute more greatly to overall structural integrity of the window or door assembly.

Figure 23:
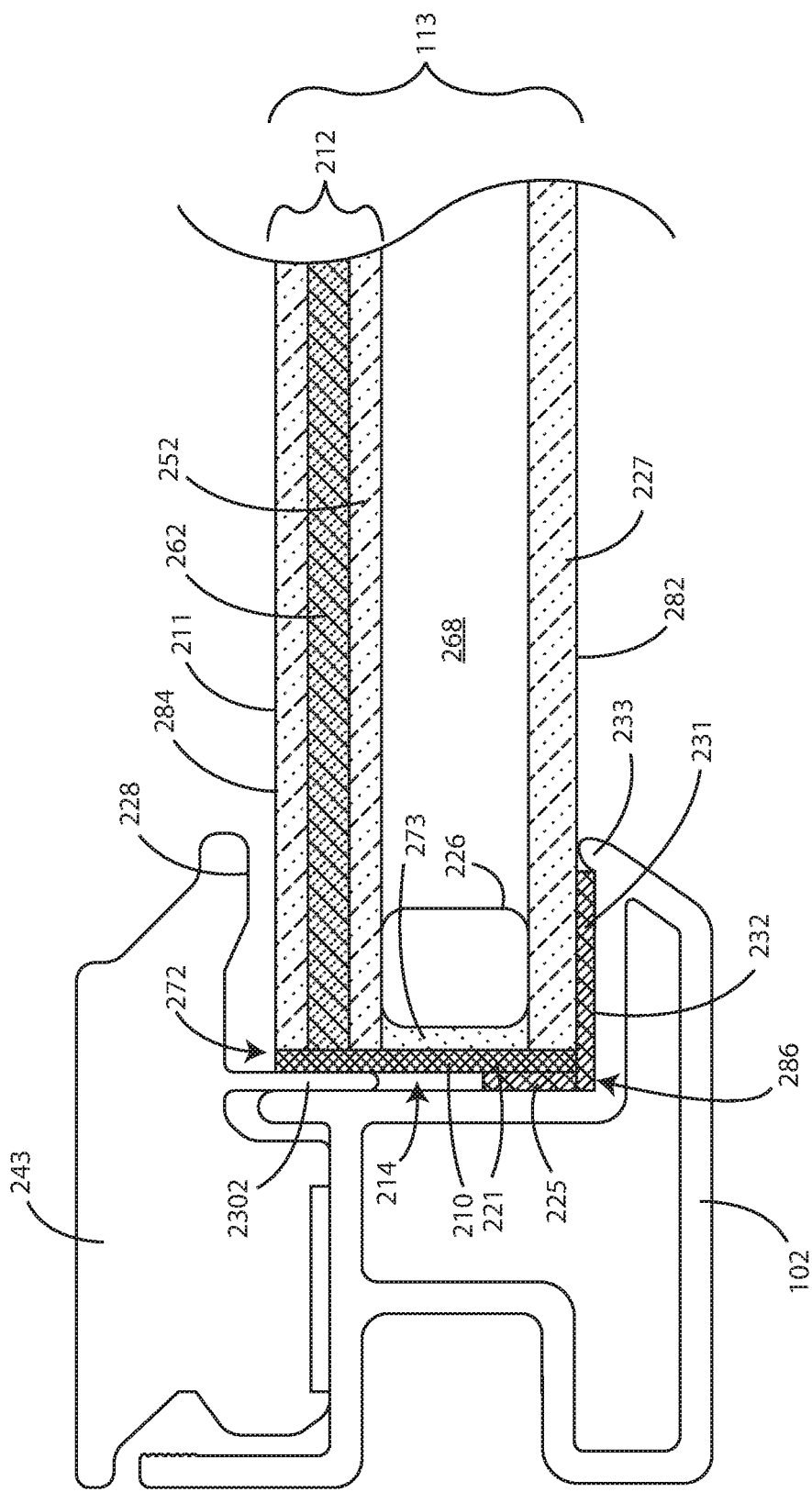
FIG. 23 is a cross-sectional view of a portion of an insulated glass fenestration unit in accordance with various embodiments herein.

Referring now to FIG. 23, a cross-sectional view of a portion of an insulated glass fenestration unit is shown in accordance with various embodiments herein. This view shows the frame member 102 with the attachment surface 232 and the edge 233. This view also shows the glass stop 243 including lower surface 228. This view also shows the channel 214 and the lower end 286. This view also shows the glass subassembly 113 including an interior laminate pane 212, an exterior pane 227, the glass subassembly 113 including a proximal end 272. The glass subassembly 113 also includes an inside facing surface 284, outside facing surface 282, and sealing spacer 226 and encloses space 268. The glass subassembly 113 also includes secondary sealant 273. A glazing material includes a bed glazing 231 and, in some embodiments, the bed glazing 231 includes a heel bead 225. The interior laminate pane 212 includes a first glass layer 211, second glass layer 252, and polymeric material 262 disposed there between. The window or door assembly also includes a retention member 210 to help secure the interior laminate pane 212. The retention member 210 includes a base portion 221.

The window or door assembly includes a glass stop 243. The glass stop 243 includes a lower surface 228. The glass stop 243 also includes a leg 2302. The leg 2302 can extend downwardly into the space between the proximal end 272 of the glass subassembly 113 and the frame member 102.

In some embodiments, portions of the proximal end 272 of the glass subassembly 113 (and components thereof such as the interior laminate pane 212) can be shaped or otherwise formed to include surface features/contours in order to increase the surface area thereof and/or provide for better bonding opportunities between components.

Figure 24:
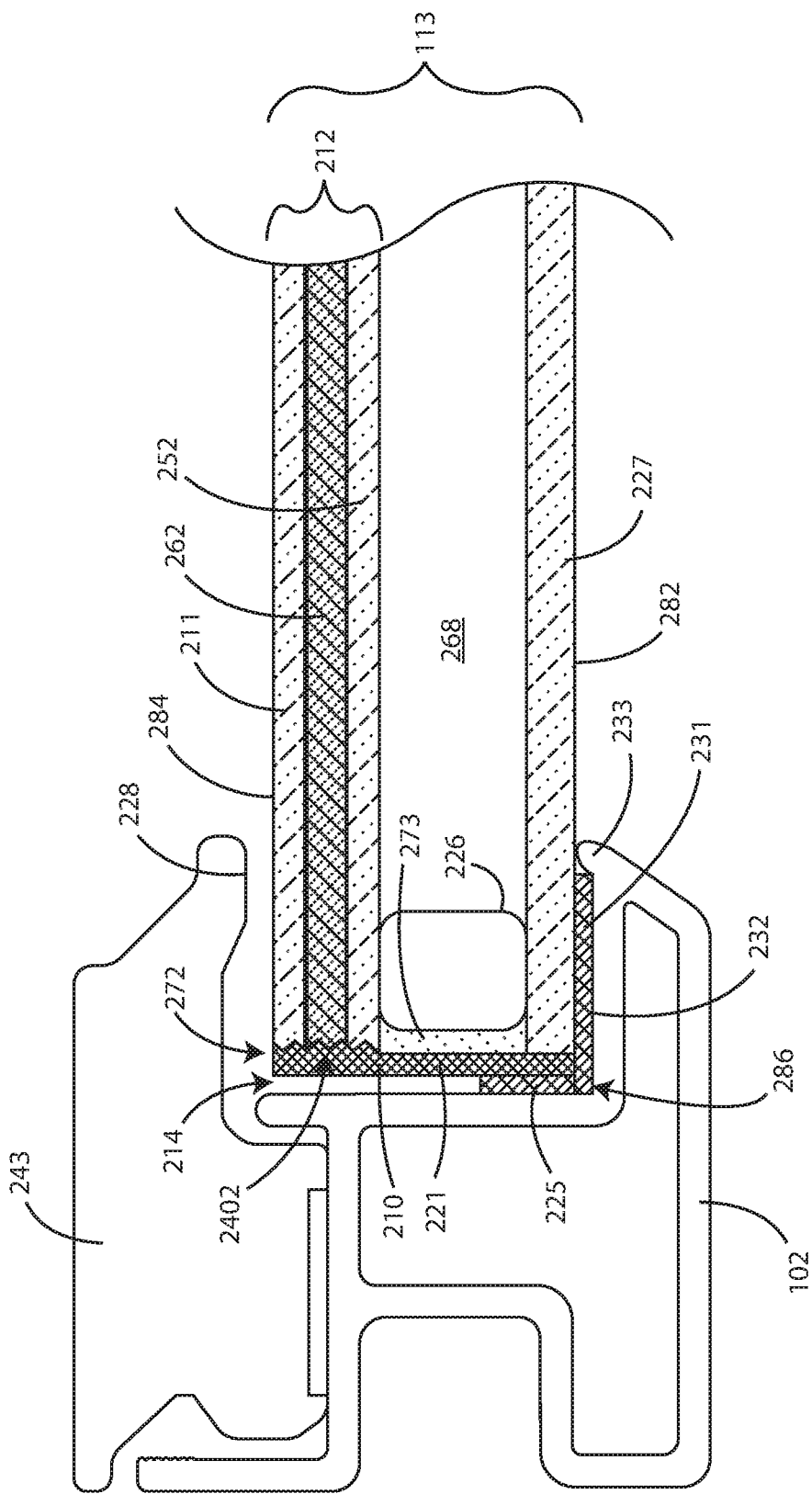
FIG. 24 is a cross-sectional view of a portion of an insulated glass fenestration unit in accordance with various embodiments herein.

Referring now to FIG. 24, a cross-sectional view of a portion of an insulated glass fenestration unit is shown in accordance with various embodiments herein. This view shows the frame member 102 with the attachment surface 232 and the edge 233. This view also shows the glass stop 243 including lower surface 228. This view also shows the channel 214 and the lower end 286. This view also shows the glass subassembly 113 including an interior laminate pane 212, an exterior pane 227, the glass subassembly 113 including a proximal end 272. The glass subassembly 113 also includes an inside facing surface 284, outside facing surface 282, and sealing spacer 226 and encloses space 268. The glass subassembly 113 also includes secondary sealant 273. A glazing material includes a bed glazing 231 and, in some embodiments, the bed glazing 231 includes a heel bead 225 (to provide additional bonding area and to place a portion of the bond in shear loading rather than tensile loading). The interior laminate pane 212 includes a first glass layer 211, second glass layer 252, and polymeric material 262 disposed there between. The window or door assembly also includes a retention member 210 to help secure the interior laminate pane 212. The retention member 210 includes a base portion 221. The window or door assembly includes a glass stop 243. The glass stop 243 includes a lower surface 228.

A proximal end of interior laminate pane (not shown in this view) includes surface features/contours 2402. The retention member 210 can interface with the surface features/contours 2402. In some embodiments, the proximal end 272 of the interior laminate pane 212 is ground forming surface contours 2402. In some embodiments, the surface contours 2402 include channels oriented within a plane of the interior laminate pane 212.

Figure 25:
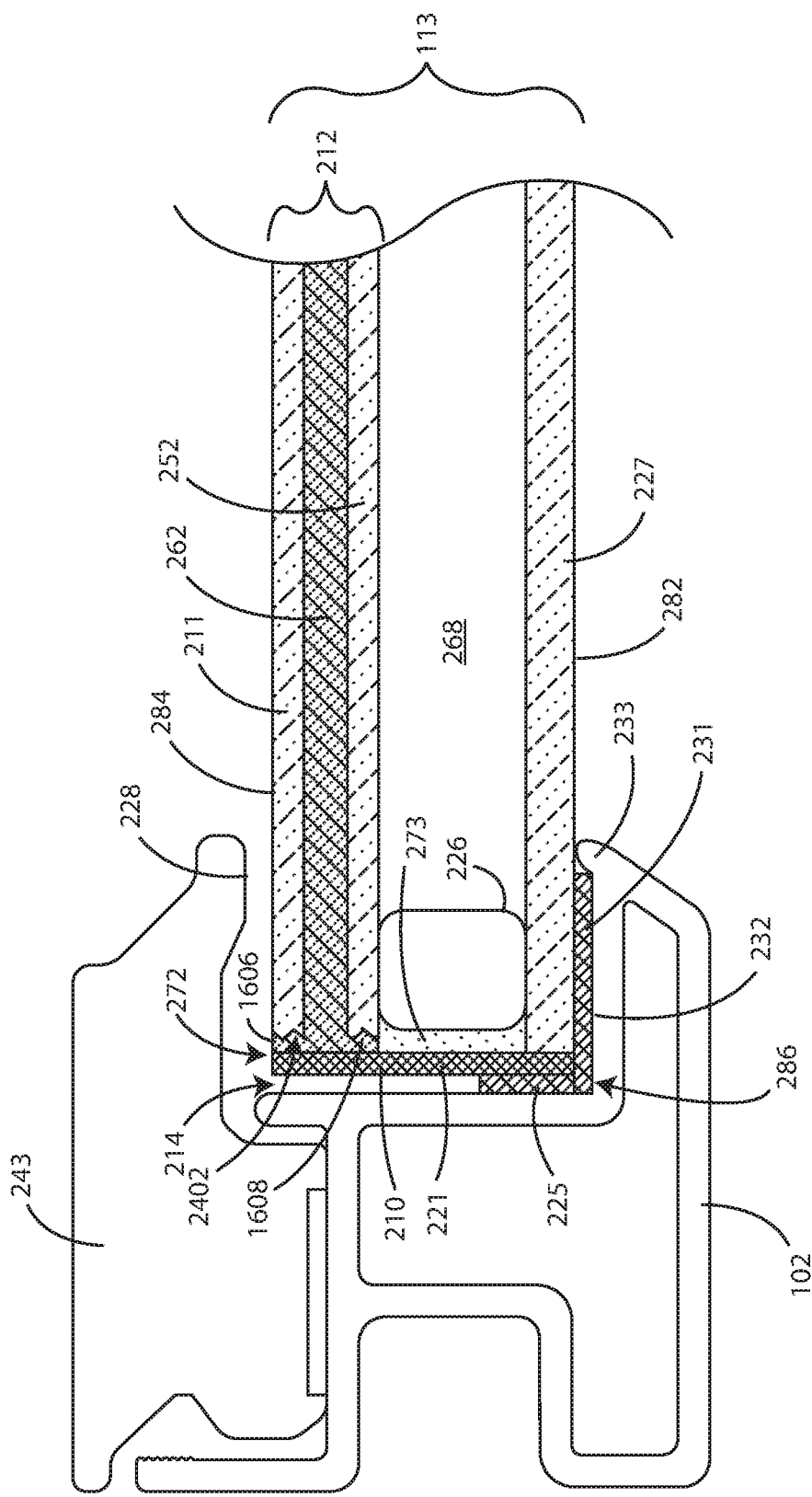
FIG. 25 is a cross-sectional view of a portion of an insulated glass fenestration unit in accordance with various embodiments herein.

Referring now to FIG. 25, a cross-sectional view of a portion of an insulated glass fenestration unit is shown in accordance with various embodiments herein. FIG. 25 is generally similar to FIG. 24. Like FIG. 24, FIG. 25 shows that the proximal end 272 of the interior laminate pane 212 has surface features/contours 2402. However, in this embodiment, the overlapping polymeric composition 1606 and the overlapping polymeric composition 1608 interface with the surface features/contours 2402.

In some embodiments, the base portion of the retention member 210 is substantially straight. However, in other embodiments, the base portion of the retention member 210 can be curved. Further, in some embodiments, a portion of the retention member 210 can be directly between the first glass layer 211 and the second glass layer 252 of the interior laminate pane 212.

Figure 26:
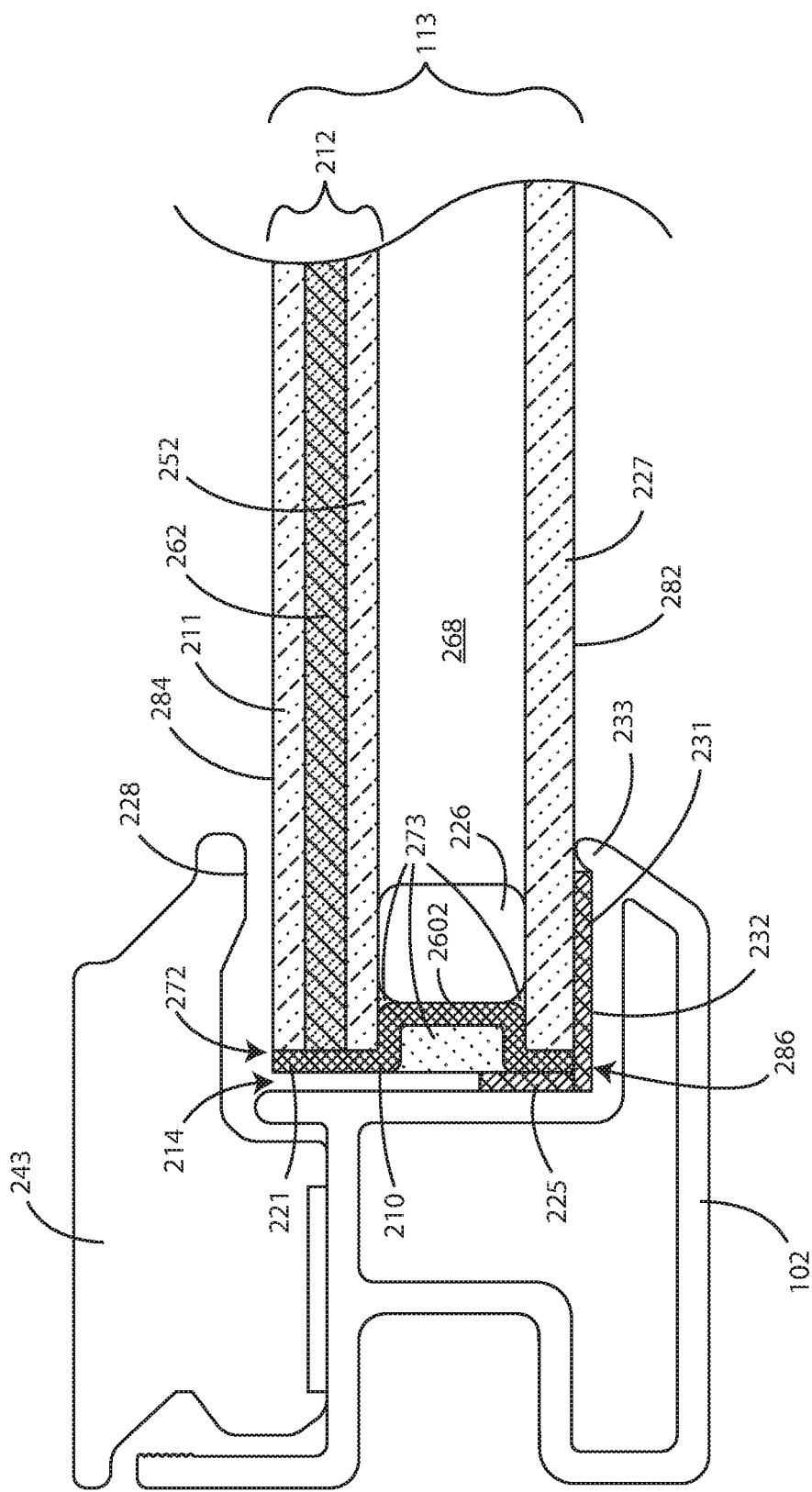
FIG. 26 is a cross-sectional view of a portion of an insulated glass fenestration unit in accordance with various embodiments herein.

Referring now to FIG. 26, a cross-sectional view of a portion of an insulated glass fenestration unit is shown in accordance with various embodiments herein. This view shows the frame member 102 with the attachment surface 232 and the edge 233. This view also shows the glass stop 243 including lower surface 228. This view also shows the channel 214 and the lower end 286. This view also shows the glass subassembly 113 including an interior laminate pane 212, an exterior pane 227, the glass subassembly 113 including a proximal end 272. The glass subassembly 113 also includes an inside facing surface 284, outside facing surface 282, and sealing spacer 226 and encloses space 268. The glass subassembly 113 also includes secondary sealant 273. A glazing material includes a bed glazing 231 and, in some embodiments, the bed glazing 231 includes a heel bead 225.

The choice of adhesive compositions useful for the bed glazing and the heel bead is not particularly limited, provided the adhesive materials exhibit adequate adhesion and sealing for the life of the window or door. Adhesives herein (for the bed glazing/heel bead and other adhesives) can include silicone materials such as silicone RTV (room temperature vulcanizing) sealants are useful for attaching and sealing glass members to frames or sashes. Hot melt silicone materials have also been found useful. Both types of silicone materials are available in various grades from Dow Corning Corporation, Midland, Mich. Adhesives and sealants based on polyurethane, polyamide, polyvinyl acetate, other known polymers, and copolymers and other combinations thereof, may also be useful. It will be appreciated that the material used for the heel bead in a particular window or door application need not be the same as the material used for the bed glazing in that window or door. For example, since the heel bead adhesive material and the bed glazing adhesive material typically bond to surfaces having different surface adhesion properties, it can be beneficial to choose different adhesive materials for the heel bead and the bed glazing to optimize bond strength. Additionally, it can be beneficial to choose heel bead materials that optimize mechanical integrity, while choosing bed glazing materials that optimize sealing between a glass surface and the sash.

The interior laminate pane 212 includes a first glass layer 211, second glass layer 252, and polymeric material 262 disposed there between. The window or door assembly also includes a retention member 210 to help secure the interior laminate pane 212. The retention member 210 includes a base portion 221. The window or door assembly includes a glass stop 243. The glass stop 243 includes a lower surface 228.

Figure 27:
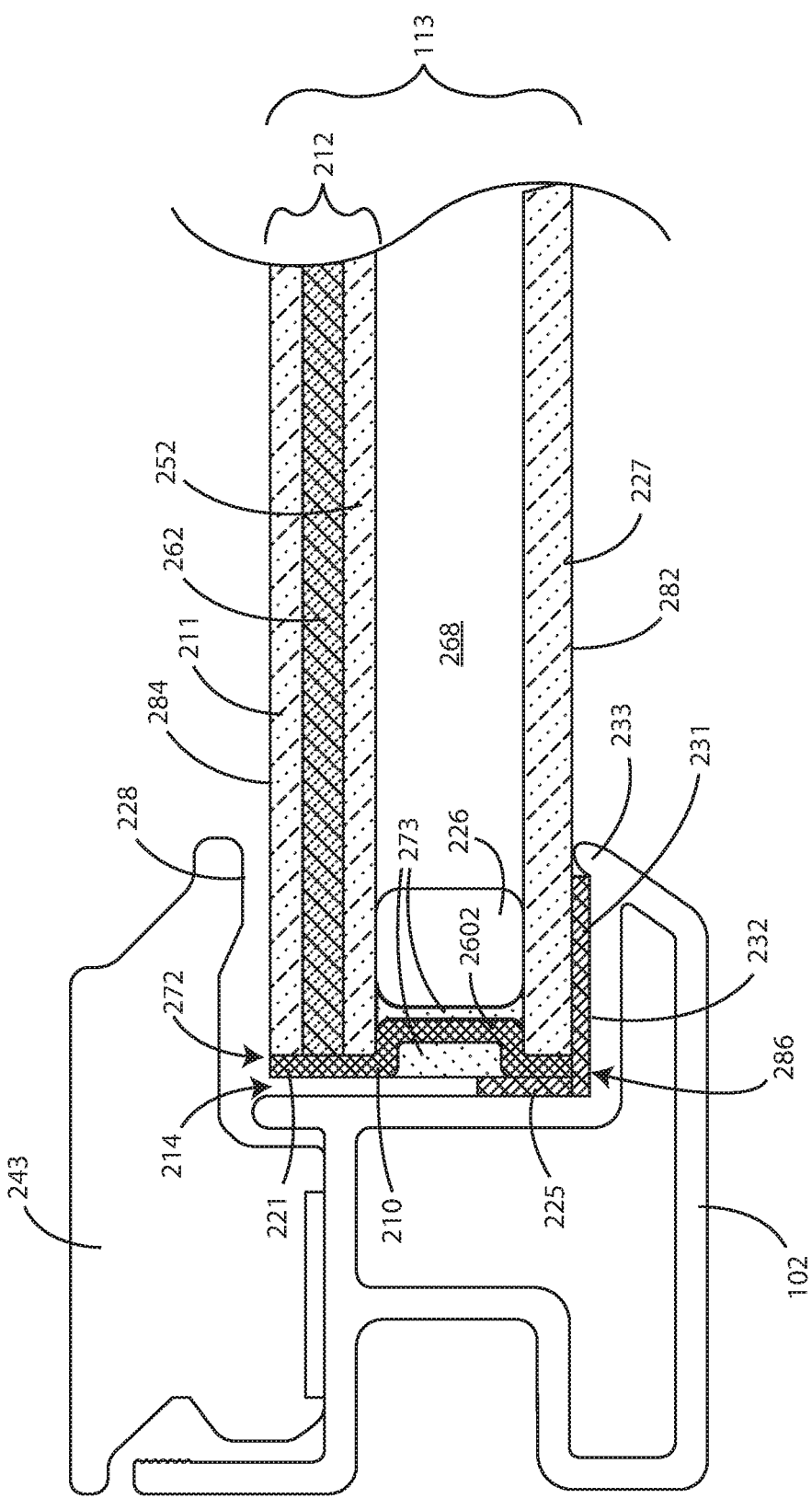
FIG. 27 is a cross-sectional view of a portion of an insulated glass fenestration unit in accordance with various embodiments herein.

The window or door assembly includes a retention member 210. The retention member 210 includes a base portion 221. The retention member 210 also includes a portion directly between interior laminate pane and exterior pane 2602. In various embodiments, at least a portion of the retention member 210 contacts the sealing spacer 226. In various embodiments, at least a portion of the retention member 210 is positioned between the sealing spacer 226 and at least a portion of the secondary sealant 273. In various embodiments, wherein at least a portion of the retention member 210 is positioned to be directly between the interior laminate pane 212 and the exterior pane 227. Referring now to FIG. 27, a cross-sectional view of a portion of an insulated glass fenestration unit is shown in accordance with various embodiments herein. In this embodiment, at least a portion of the retention member 210 is positioned to be directly between the interior laminate pane 212 and the exterior pane 227, but the retention member 210 does not directly contact the sealing spacer 226.

Figure 28:
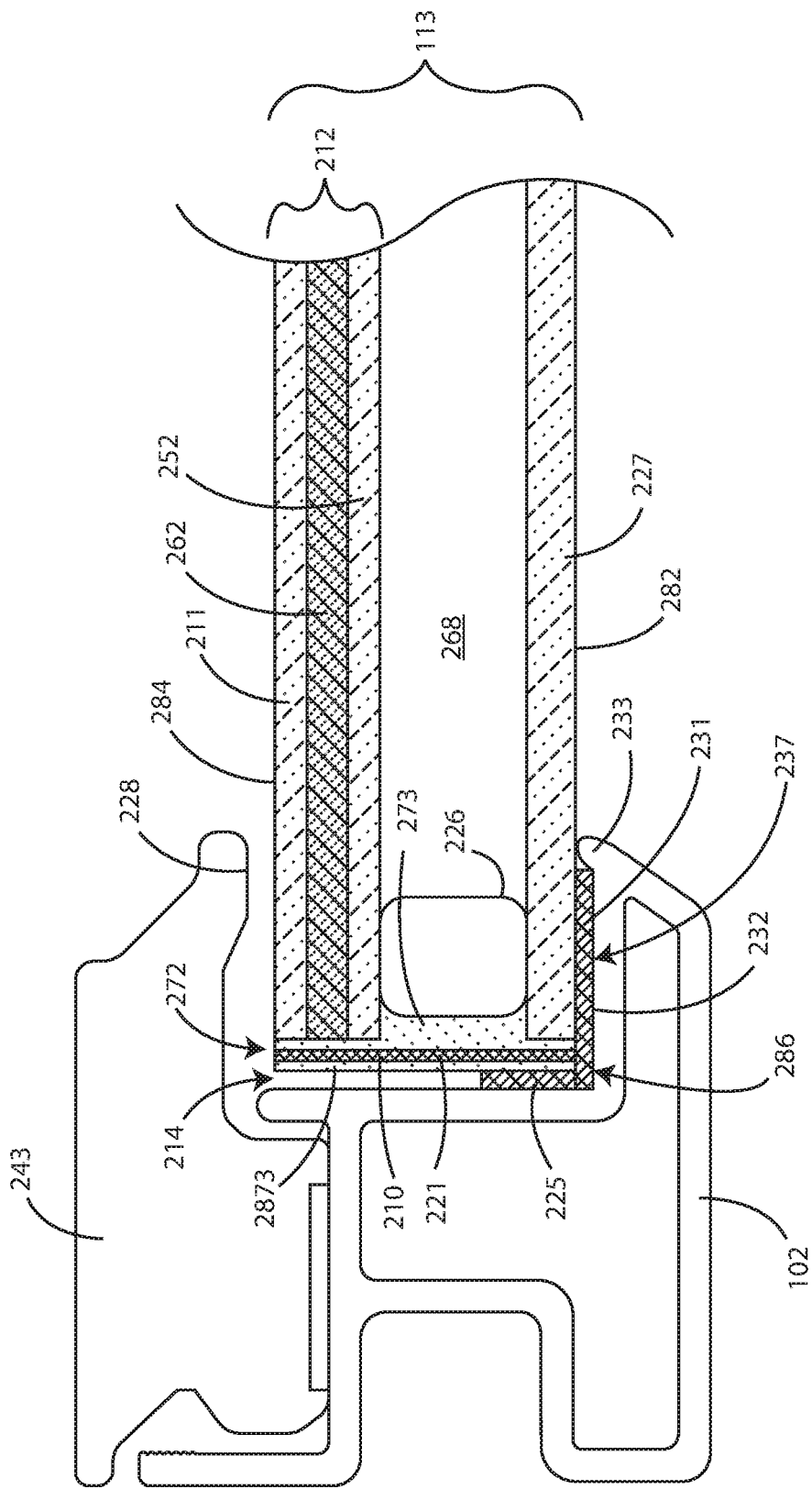
FIG. 28 is a cross-sectional view of a portion of an insulated glass fenestration unit in accordance with various embodiments herein.

In some embodiments, a retention member 210 can be embedded within the secondary sealant 273. Referring now to FIG. 28, a cross-sectional view of a portion of an insulated glass fenestration unit is shown in accordance with various embodiments herein. FIG. 28 is generally similar to FIG. 2, however in this embodiment the retention member is embedded within the secondary sealant 273 and, specifically, within a portion 2873 of the secondary sealant 273 that is to the outer periphery of the proximal end of the glass subassembly 113. It will be appreciated that this can be formed in various ways. For example, in some embodiments, application of the secondary sealant 273 can include a portion that is disposed over the outer periphery of the proximal end of the glass subassembly 113 and then a retention member (in various forms, but in some cases specifically in the form of a mesh) can pushed into the secondary sealant portion 2873. In some embodiments, a first portion of the secondary sealant 273 can be applied, then the retention member 210 can be applied, then a second portion of the secondary sealant 273 can be applied over the retention member 210.

Figure 29:
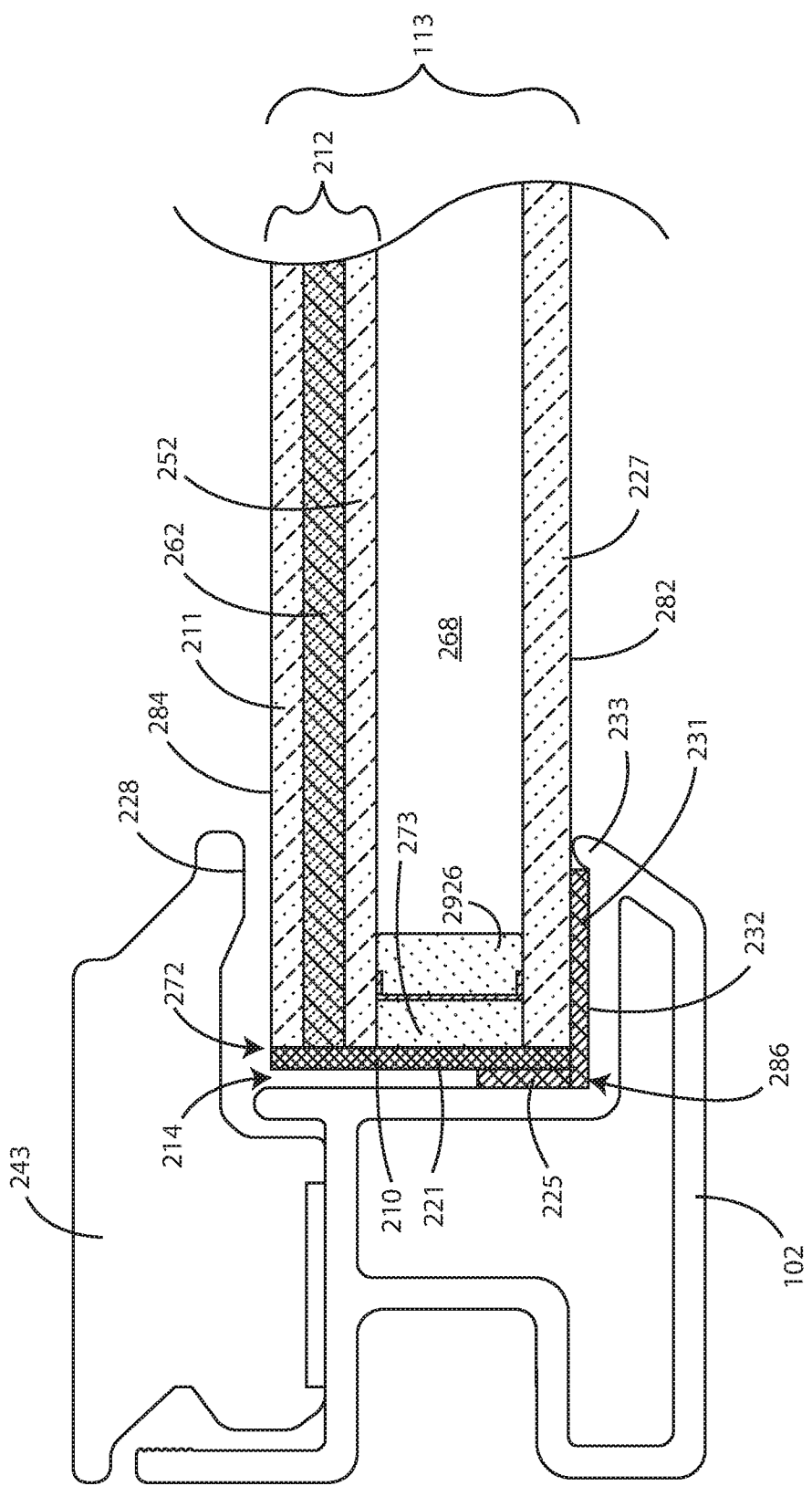
FIG. 29 is a cross-sectional view of a portion of an insulated glass fenestration unit in accordance with various embodiments herein.

Many different sealing spacers can be used with embodiments herein. Referring now to FIG. 29, a cross-sectional view of a portion of an insulated glass fenestration unit is shown in accordance with various embodiments herein. This view shows the frame member 102 with the attachment surface 232 and the edge 233. This view also shows the glass stop 243 including lower surface 228. This view also shows the channel 214 and the lower end 286. This view also shows the glass subassembly 113 including an interior laminate pane 212, an exterior pane 227, the glass subassembly 113 including a proximal end 272. The glass subassembly 113 also includes an inside facing surface 284, outside facing surface 282, and sealing spacer 226 and encloses space 268. The glass subassembly 113 also includes secondary sealant 273. A glazing material includes a bed glazing 231 and, in some embodiments, the bed glazing 231 includes a heel bead 225. The interior laminate pane 212 includes a first glass layer 211, second glass layer 252, and polymeric material 262 disposed there between. The window or door assembly also includes a retention member 210 to help secure the interior laminate pane 212. The retention member 210 includes a base portion 221. The window or door assembly includes a glass stop 243. The glass stop 243 includes a lower surface 228.

In this embodiment, the sealing spacer includes a polymeric sealing spacer 2926. The polymeric sealing spacer 2926 is disposed between the interior laminate pane 212 and the exterior pane 227.

Figure 30:
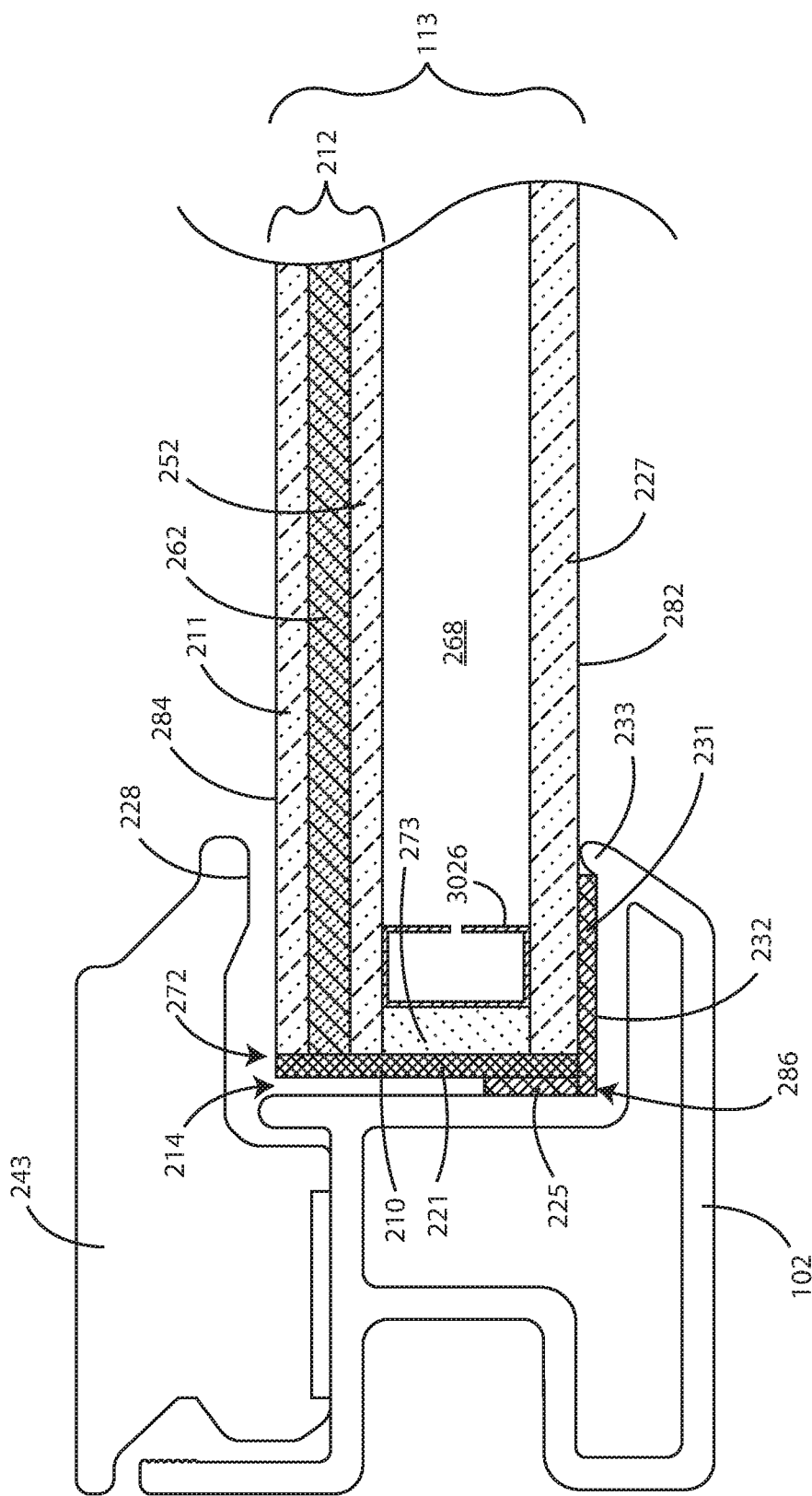
FIG. 30 is a cross-sectional view of a portion of an insulated glass fenestration unit in accordance with various embodiments herein.

Referring now to FIG. 30, a cross-sectional view of a portion of an insulated glass fenestration unit is shown in accordance with various embodiments herein. FIG. 30 is generally similar to FIG. 29. However, in this embodiment, the sealing spacer takes the form of a metal box type sealing spacer 3026.

Figure 31:
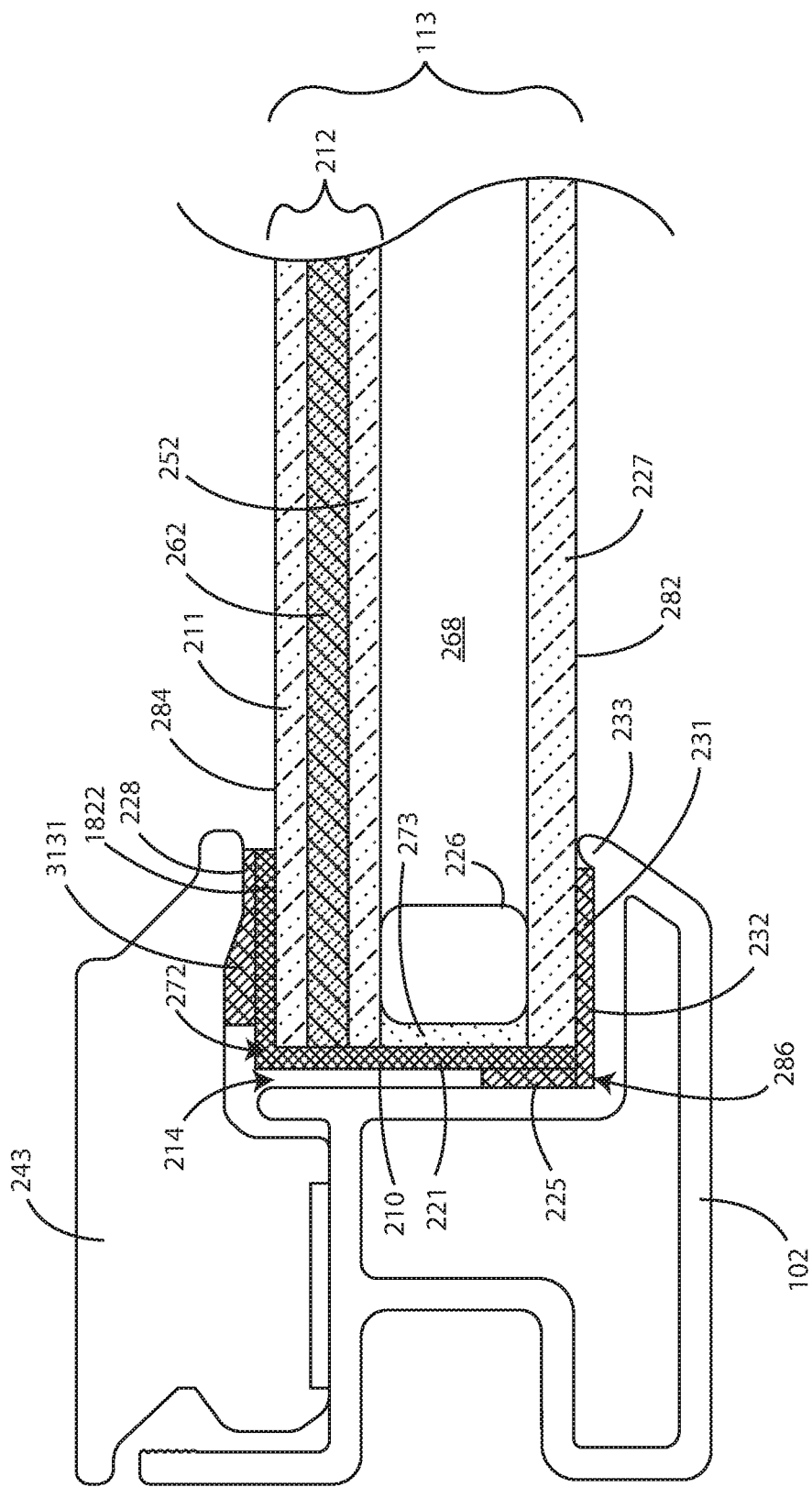
FIG. 31 is a cross-sectional view of a portion of an insulated glass fenestration unit in accordance with various embodiments herein.

Referring now to FIG. 31, a cross-sectional view of a portion of an insulated glass fenestration unit is shown in accordance with various embodiments herein. FIG. 31 is generally similar to FIG. 21. However, in this embodiment, a top glazing material 3131 is disposed contacting the glass stop 243 and the leg portion 1822. The top glazing material 3131 can be formed of the same material used to make the heel bead 225 and/or the bed glazing 231. However, in some embodiments, the top glazing material 3131 can be formed of a different material than the heel bead 225 and/or the bed glazing 231. In some embodiments, the top glazing material 3131 can directly contact the inside facing surface 284, such as if the leg portion 1822 of the retention member 210 is omitted.

Retention Member

The retention member of embodiments herein can take on many different forms and configurations and can be made of many different materials.

In various embodiments, the retention member includes a planar material. In various embodiments, the retention member includes a folded planar material. In some embodiments, the retention member includes an extrudate.

Functionally, the retention member can have an elongation and tensile strength sufficient to provide the glass subassembly 113 with shock absorption and force dissipation protection that meets or exceeds one or more of ASTM E1886 and ASTM E1996 large and small missile impact and pressure cycling standards, and TAS 201, 202 and 203 (High-Velocity Hurricane Zones—Impact Tests for Wind-Borne Debris) building requirements, and AAMA 506 standards.

In some embodiments, the retention member includes a single layer of material. However, in various other embodiments, the retention member includes a plurality of layers. In various embodiments, the retention member includes from 2 to 6 layers of materials.

In various embodiments, the retention member includes at least one of a polyvinyl chloride, glass composite, nylon, polyethylene, rubber, elastomeric materials, polymeric tape, fiberglass cloth, fiberglass tape, woven cloth, non-woven cloth and/or combinations thereof.

In various embodiments, the retention member includes a reinforcing material. In various embodiments, the reinforcing material comprising at least one layer of a fibrous material. The fibrous material can include fibers such as at least one of glass fibers, hybrid fibers, polyamide fibers (NYLON), para-aramid fibers (KEVLAR), polyethylene fibers, and carbon fibers.

In various embodiments, the fibrous material comprising a woven or non-woven material. In various embodiments, the fibrous material comprising directionally oriented or non-directionally oriented fibers.

In various embodiments, the retention member includes a metal layer as a reinforcing material.

In various embodiments, the retention member includes at least one polymeric layer including a first polymer and the polymeric material disposed between the first glass layer and the second glass layer of the interior laminate pane including a second polymer, wherein the first polymer and the second polymer adhere to one another. In some embodiments, the first polymer and the second polymer are the same.

In various embodiments, the retention member includes a base portion having dimensions sufficient to project into and engage a heel bead (if present) to couple the interior laminate pane to the frame member. In various embodiments, the retention member includes a base portion having dimensions sufficient to project into and engage a bed glazing to couple the interior laminate pane to the frame member.

It will be appreciated that retention members herein can be formed in various ways. In some embodiments, the retention member can be preformed and then applied onto the glass subassembly. However, in other embodiments, the retention member can be formed in-situ on the glass subassembly. In some embodiments, different components are attached/bonded/connected/welded to one another (chemically, mechanically, thermally, ultrasonically, etc.) in advance of application to the glass subassembly. However, in other embodiments, different components of the retention member can be attached to one another during application to the glass subassembly.

In some embodiments, the retention member can be attached to other components herein using various techniques. By way of example, the retention member can be attached/bonded/connected/welded to any of the other components (such as those shown in the FIGS. described herein) chemically, mechanically, thermally, ultrasonically, or using other techniques. In some embodiments, different portions of the retention member can be attached to other components using different techniques. For example, one portion of the retention member can be attached to a bed glazing using one technique (such as chemically using an adhesive) and a second portion of the retention member can be attached to a laminate pane using a different technique (such as thermally or ultrasonically welded).

In some embodiments, some or all polymeric components of the retention member can be precured. However, in other embodiments, some or all polymeric components of the retention member can be applied in an uncured state (or "wet") and then later cured, such as in later steps of the glass subassembly manufacturing process or during manufacturing the fenestration unit.

Various steps can be taken to result in the retention member having a desired thickness. By way of example, in some embodiments, the retention member can be molded to a specific thickness, can be extruded to have a specific thickness, can be cut-down to specific thickness, can be expanded to a specific thickness (such as using a blowing agent or the like), can be blade-coated to a specific thickness, can be spray-coated to a specific thickness, or the like. In some embodiments, such as where a component is applied in an uncured state, a roller or similar device (such as a squeegee) can be passed over the retention member to force out any air pockets or gaps.

In various embodiments herein, the retention member can exhibit a degree of expansion that can be suitable to absorb a portion of energy as well as transfer a portion of energy. In some embodiments, the retention member can exhibit a degree of elongation of about 50, 60, 70, 80, 90, 100, 110, 120, 130, 140, 150, 160, 170, 180, 190, 200, 220, 240, 260, 280, or 300 percent, or an amount falling within a range between any of the foregoing.

It will be appreciated that the retention member can have various thicknesses. In some embodiments, the retention member can have a thickness of about 0.5, 1, 1.5, 2, 2.5, 3, 3.5, 4, 4.5, 5 mm, or more, or a thickness falling within a range between any of the foregoing.

In some embodiments, the retention member can have a uniform thickness. However, in other embodiments, the retention member can vary in thickness with either the portion adjacent the interior laminate pane being thicker or thinner than the portion adjacent the exterior pane.

Methods

Many different methods are contemplated herein, including, but not limited to, methods of making, methods of using, and the like. In an embodiment, a method of making a glass subassembly for a window or door assembly is included. The method can include positioning a sealing spacer between an interior laminate pane of glass and an exterior pane of glass forming an insulating glazing unit. The method can further include applying a retention member to span perimeter edges of the interior laminate pane of glass and the exterior pane of glass. The method can further include depositing a bed glazing into a channel defined within a frame. The method can further include seating the insulating glazing unit into the channel and into contact with the bed glazing.

In an embodiment, the method can further include positioning a glass stop on an opposite side of the insulating glazing unit from the bed glazing. In an embodiment, the retention member can include a curable polymeric composition, wherein the curable polymeric composition is cured before applying the retention member. In an embodiment, the retention member can include a curable polymeric composition, wherein the curable polymeric composition is cured after applying the retention member.

In an embodiment of the method, applying a retention member is performed as part of an in-line window or door manufacturing process. In an embodiment of the method, applying a retention member is performed as part of an insulating glazing unit (IGU) manufacturing process. In an embodiment of the method, applying a retention member is performed as part of a laminate glass manufacturing process.

In an embodiment, the method can further include transporting the insulating glazing unit to another manufacturing facility after applying a retention member and before depositing a bed glazing.

Further aspects of fenestration units and related methods are described in U.S. Pat. No. 9,163,449, the content of which is herein incorporated by reference.

In an embodiment of the method, the retention member is preformed and then applied over the perimeter edges of the interior laminate pane of glass and the exterior pane of glass. In an embodiment of the method, the retention member is formed in situ over the perimeter edges of the interior laminate pane of glass and the exterior pane of glass.

In an embodiment of the method, at least one component of the retention member is precured prior to application over the perimeter edges of the interior laminate pane of glass and the exterior pane of glass. In an embodiment of the method, at least one component of the retention member is not precured prior to application over the perimeter edges of the interior laminate pane of glass and the exterior pane of glass. Curing can include various operations including, but not limited to, drying, heating, baking, irradiating, reacting, or the like.

In an embodiment of the method, applying a retention member to span perimeter edges of the interior laminate pane of glass and the exterior pane of glass includes embedding a retention member component within a portion of a secondary sealant. In an embodiment, the retention member component can include a mesh, however, many other materials suitable for inclusion in a retention member are also described herein.

Figure 32:
FIG. 32 is a schematic view of a component of a sealing spacer during an assembly process in accordance with various embodiments herein.
Figure 33:
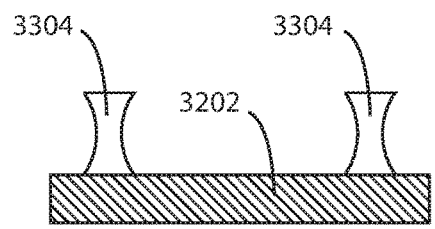
FIG. 33 is a schematic view of components of a sealing spacer during an assembly process in accordance with various embodiments herein.

Referring now to FIG. 32, a schematic view is shown of a component of a sealing spacer during an assembly process in accordance with various embodiments herein. In this view a first spacer member 3202, such as a piece of a metal (aluminum, stainless steel, various alloys, ferrous metals, etc.) or ceramic or plastic is obtained and placed. Then, other components are added thereto. Referring now to FIG. 33, a schematic view is shown of components of a sealing spacer during an assembly process in accordance with various embodiments herein. In this view supports 3304 are placed onto the first spacer member 3202 and/or bonded thereto (chemically, mechanically, or thermally). In some embodiments, the supports 3304 can include a polymer, such as a polyamide (NYLON), but not limited to just polyamides. In some embodiments, the supports 3304 can be extruded. In some embodiments, the supports 3304 can be extruded onto the first spacer member.

Figure 34:
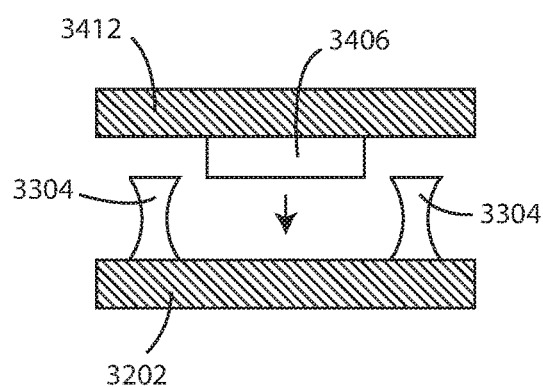
FIG. 34 is a schematic view of components of a sealing spacer during an assembly process in accordance with various embodiments herein.

Referring now to FIG. 34, a schematic view of components of a sealing spacer during an assembly process in accordance with various embodiments herein. In this view, a second spacer member 3412 is applied. Optionally, a dessicant 3406 is also included as part of the assembly. In some embodiments, a "roll-trusion" process can be followed in order to assemble these components together into a sealing spacer. Further aspects of spacer assemblies and methods of assembling the same are described in U.S. Pat. No. 8,967,219, the content of which is herein incorporated by reference.

Figure 35:
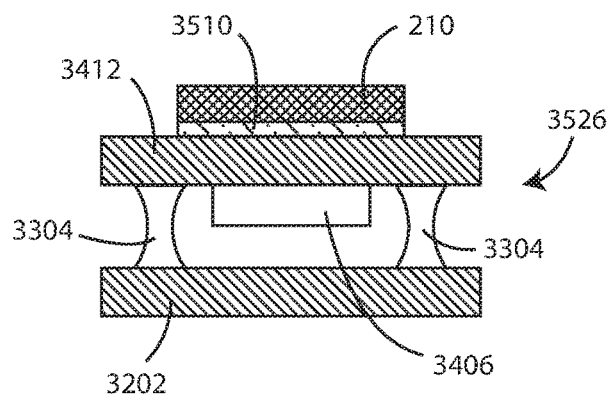
FIG. 35 is a schematic view of components of a sealing spacer during an assembly process in accordance with various embodiments herein.

In various embodiments, a retention member or a portion thereof can be applied to the sealing spacer. Referring now to FIG. 35, a schematic view of components of a sealing spacer 3526 during an assembly process in accordance with various embodiments herein. In this view, a retention member portion 210 and, optionally, a layer of adhesive material 3510 (which can be any of the adhesive described herein), is deposited onto the sealing spacer 3526.

A sealing spacer 3526 so formed can then be positioned between panes of a glass subassembly 113. Referring now to FIG. 36 is a cross-sectional view of a portion of a glass subassembly 113 with a retention member 210 in accordance with various embodiments herein. In this view, the sealing spacer 3526 is placed with a primary sealant 3602 (which can be polyisobutylene (PIB) or another polymer) along with a secondary sealant 273. In this view, the retention member 210 can include two portions, with one portion between the panes of glass and the other outside on the edge. In some embodiments, these two portions can be attached/bonded/welded/adhered together using chemical, mechanical, or thermal techniques.

Referring now to FIG. 37 is a cross-sectional view of a portion of a glass subassembly 113 with a retention member 210 in accordance with various embodiments herein. FIG. 37 is generally similar to FIG. 36. However, FIG. 37 shows the secondary sealant 273 outside of just the area directly between the panes of the glass subassembly 113 and covering the edge of the glass subassembly 113, overlapping the edges of the interior and exterior panes.

In some cases, a spacer assembly can include a MYLAR vapor barrier. In such cases, a retention member 210 herein can, in some cases, be connected to the MYLAR vapor barrier either directly or indirectly using, for example, chemical, mechanical, or thermal techniques.

Figure 38:
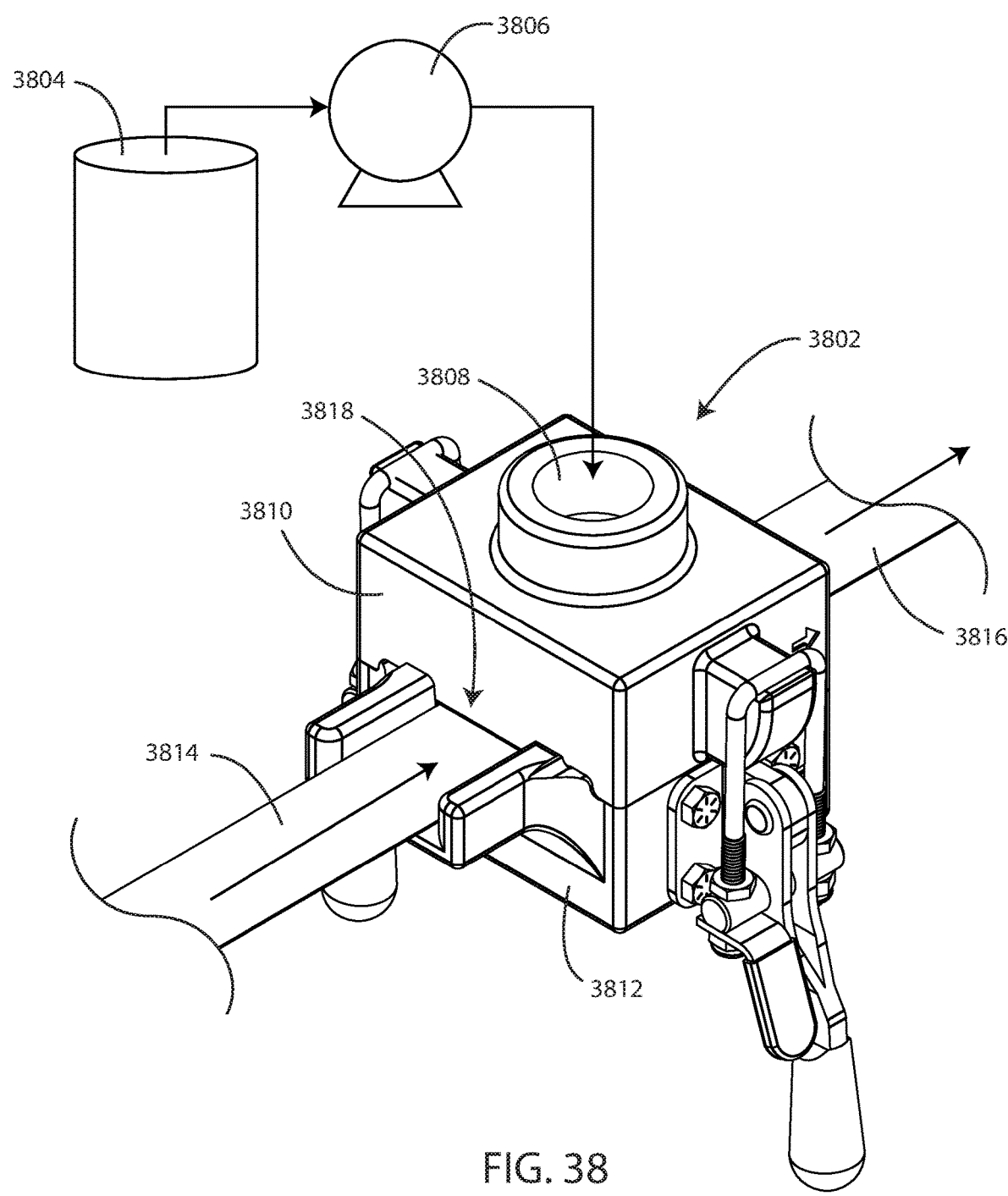
FIG. 38 is a perspective view of a coating chamber in accordance with various embodiments herein.

It will be appreciated that many different techniques and devices can be used to manufacture retention members. Referring now to FIG. 38, a perspective view of a coating chamber 3802 in accordance with various embodiments herein. A flowable polymeric composition can be drawn from a supply tank 3804 using a pump 3806 (or another apparatus) and pass to an orifice 3808 of the coating chamber 3802. While only one orifice 3808 is shown in this view, it will be appreciated that various embodiments herein can include an orifice on the top and an orifice on the bottom. Further, in various embodiments, orifices can be located on the sides of the coating chamber 3802. In some embodiments, multiple orifices can be located on a particular side such as 2, 3, 4, or 5 orifices on the top.

In this embodiment, the coating chamber 3802 can include a top half 3810 and a bottom half 3812, though it will be appreciated that many different coating chamber designs are included herein including one-piece designs. The top half 3810 and the bottom half 3812 can be held together using a clamp or a similar apparatus. A fibrous substrate 3814 can be fed into the coating chamber 3802 through a substrate ingress port 3818. The fibrous substrate 3814 can exit the coating chamber 3802 through a substrate egress port (not shown in this view). Inside the coating chamber 3802, the flowable polymeric composition can pass into gaps defined by adjacent fibers in the fibrous substrate 3814. In some embodiments, the flowable polymeric composition can be under pressure as it enters the coating chamber 3802 and can be pushed into the fibrous substrate 3814 under pressure. The coating chamber 3802 can also be referred to as an application chamber. As the now-coated fibrous substrate exits the coating chamber 3802 it forms a retention member 3816 (or coated fibrous substrate).

In various embodiments, pump speed dispensing the flowable polymeric composition is matched with the speed of the fibrous substrate being passed through the coating chamber to get appropriate coverage.

It will be appreciated that various additional steps can be performed after the retention member leaves the coating chamber. By way of example, it can pass through a texturing roll block to increase the surface area thereof for better adhesion (for example, a surface of the coated fibrous substrate can have a surface area at least 20% greater than an otherwise identical flat surface), it can pass through a nip roller to further promote passage of the flowable polymeric composition into a fibrous matrix of the fibrous substrate, it can pass through a curing station, it can have a release liner adhered to one or more sides thereof, it can pass through a sizing blade or blades, and the like.

Figure 39:
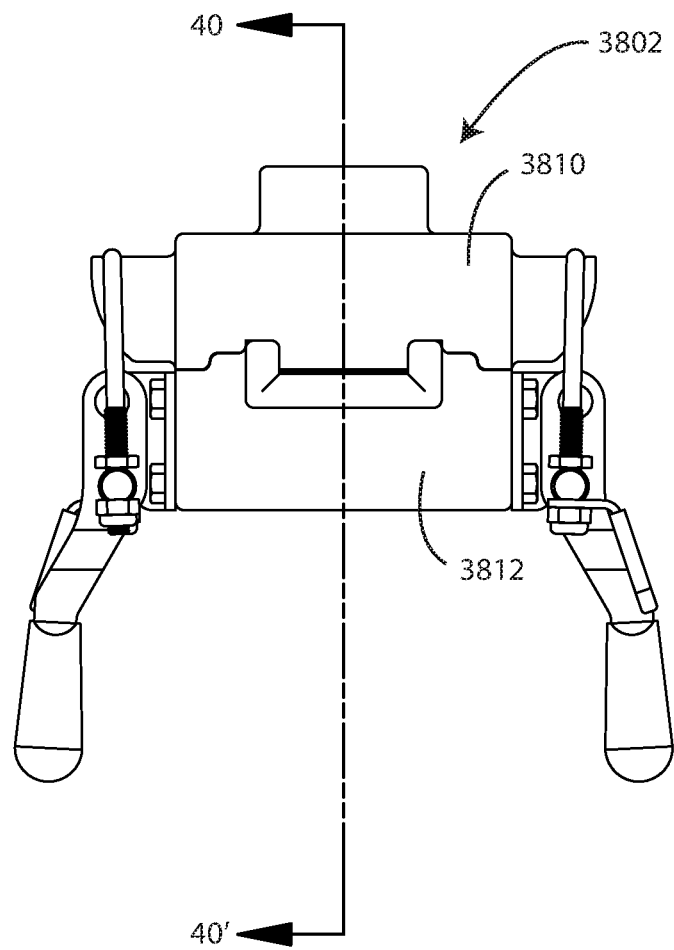
FIG. 39 is a front elevational view of a coating chamber in accordance with various embodiments herein.

Referring now to FIG. 39, a front elevational view of the coating chamber 3802 in accordance with various embodiments herein. This view shows the top half 3810 and the bottom half 3812 of the coating chamber 3802.

Figure 40:
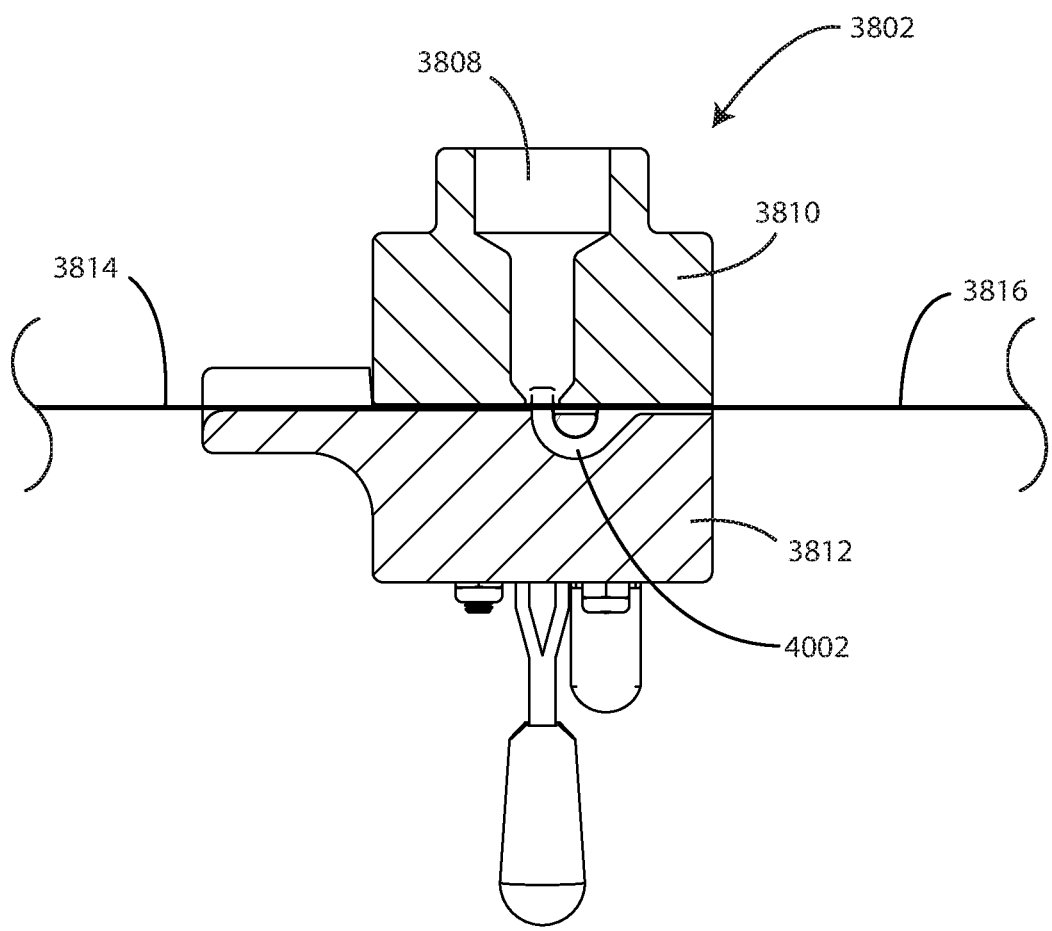
FIG. 40 is a cross-sectional view of the coating chamber as taken along line 40-40' of FIG. 39 in accordance with various embodiments herein.

Referring now to FIG. 40, a cross-sectional view of the coating chamber 3802 is shown as taken along line 40-40' of FIG. 39 in accordance with various embodiments herein. This view shows the fibrous substrate 3814 entering the coating chamber 3802 and then passing out as a retention member 3816. The flowable polymeric composition can pass down through the orifice 3808 and contact the fibrous substrate 3814 from the top. The coating chamber 3802 can define an inner volume and a channel 4002 going around the sides and underneath of the fibrous substrate 3814 such that the flowable polymeric composition can also contact the fibrous substrate 3814 from the bottom.

Figure 41:
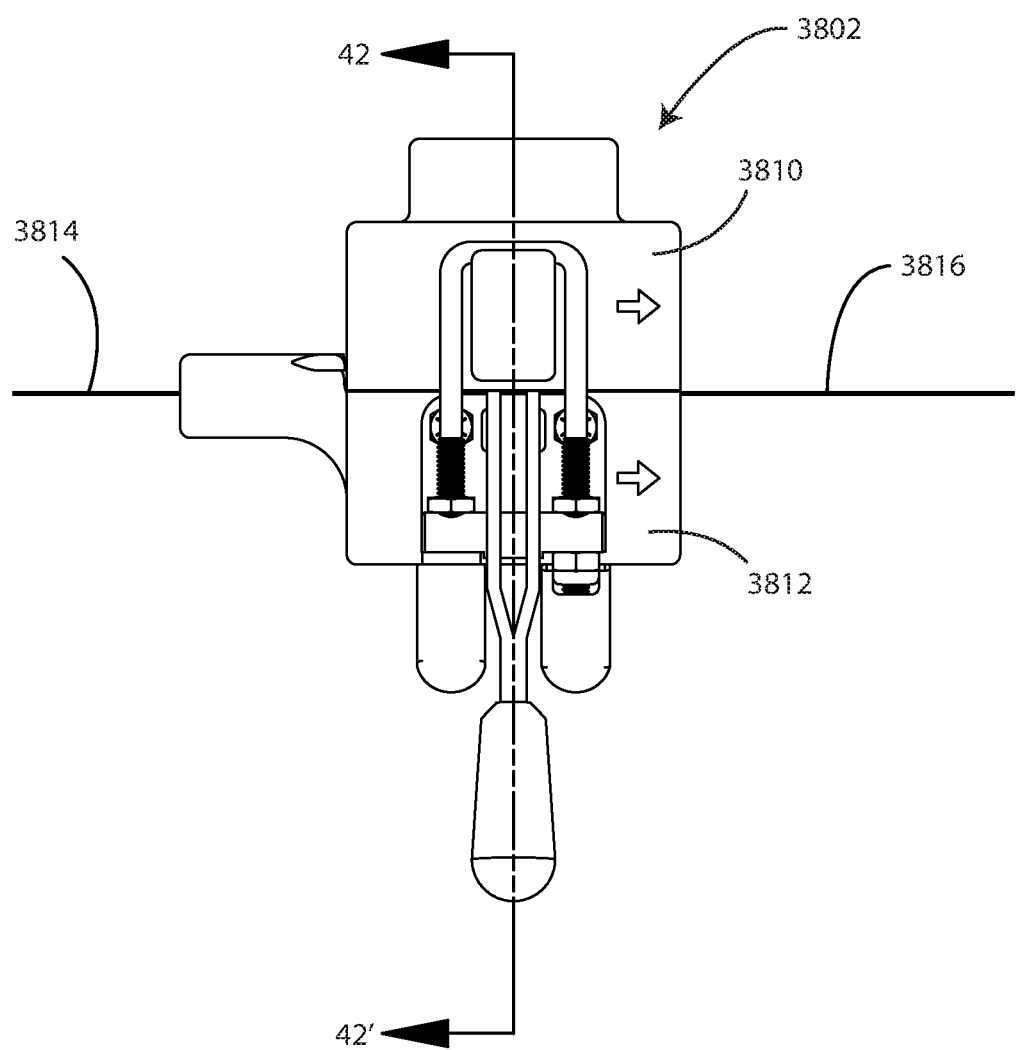
FIG. 41 is a side elevational view of a coating chamber in accordance with various embodiments herein.

Referring now to FIG. 41, a side elevational view of a coating chamber 3802 in accordance with various embodiments herein. This view shows the top half 3810 and the bottom half 3812 of the coating chamber 3802 as well as the fibrous substrate 3814 entering the coating chamber 3802 and the retention member 3816 exiting the coating chamber 3802.

Figure 42:
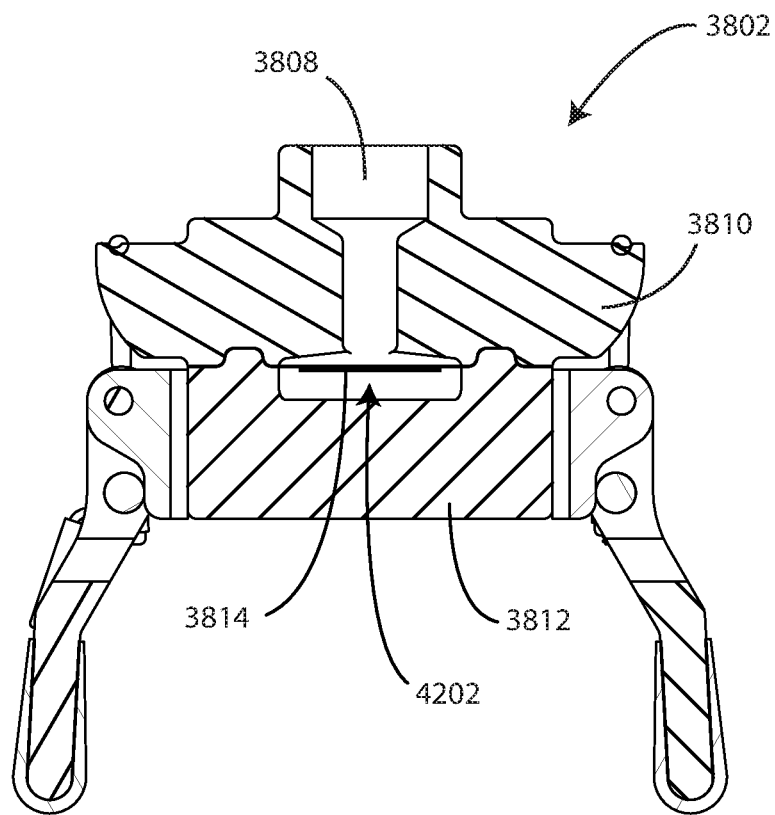
FIG. 42 is a cross-sectional view of the coating chamber as taken along line 42-42' of FIG. 39 in accordance with various embodiments herein.

Referring now to FIG. 42, a cross-sectional view of the coating chamber is shown as taken along line 42-42' of FIG. 39 in accordance with various embodiments herein. This view shows the top half 3810 and the bottom half 3812 of the coating chamber 3802 as well as the fibrous substrate 3814. The flowable polymeric composition can enter the coating chamber 3802 through the orifice 3808. The fibrous substrate 3814 passes through an inner volume 4202 where the flowable composition can contact the fibrous substrate 3814.

Figure 43:
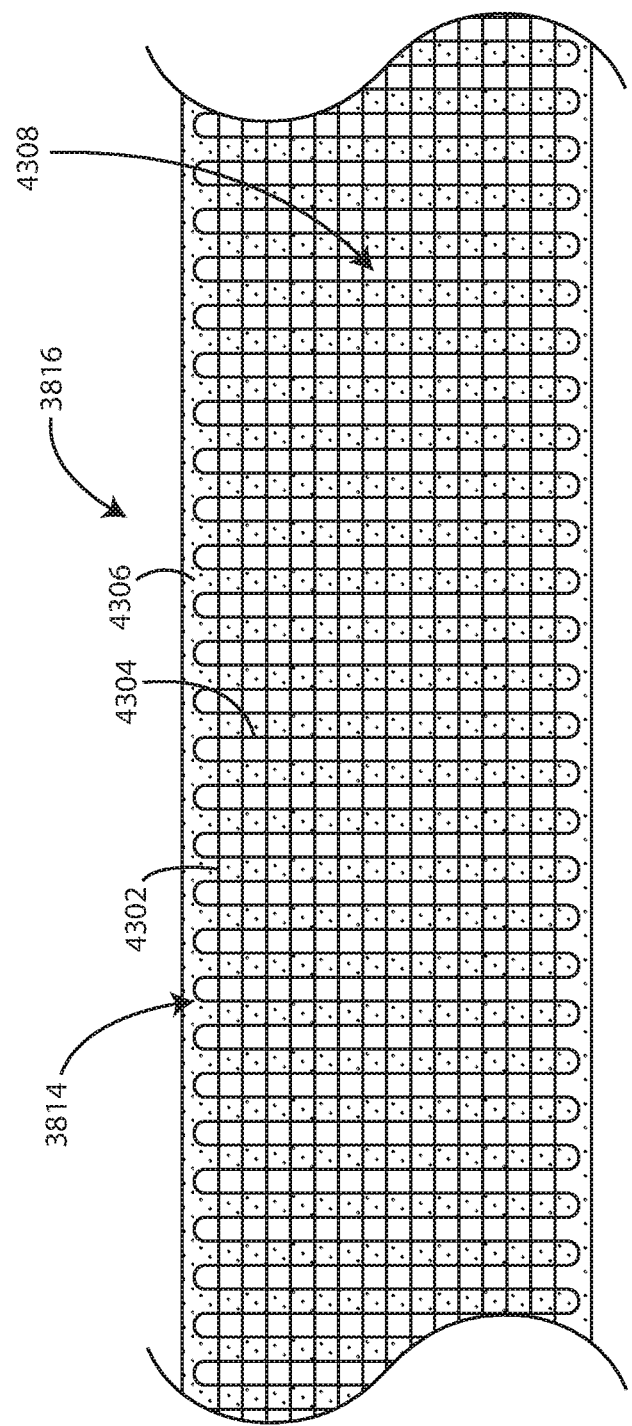
FIG. 43 is a schematic view of a retention member in accordance with various embodiments herein.

It will be appreciated that the fibrous substrate 3814 can take on many different configurations herein. Referring now to FIG. 43, a schematic view of a retention member 3816 in accordance with various embodiments herein. In this example, the fibrous substrate 3814 is within a mass of the flowable polymeric composition 4306. In this example, the fibrous substrate 3814 can include fibers that are aligned 4302 with the direction of the movement of the fibrous substrate 3814 through the coating chamber as while as fibers that are transverse 4304 to the direction of movement of the fibrous substrate 3814. However, it will be appreciated that fibers can be oriented in many different ways. In some embodiments, the fibers can be a non-oriented or randomly oriented fibrous mat.

In some embodiments, the amount of the flowable polymeric composition 4306 can be substantially uniform across the fibrous substrate 3814. However, in other embodiments, the amount of the flowable polymeric composition 4306 can vary across the fibrous substrate 3814. By way of example, in some embodiments, the amount within a middle area 4308 of the fibrous substrate 3814 can be different. In some embodiments, the amount in the middle area 4308 can be more or less than the amount at the edges of the fibrous substrate 3814. In some embodiments, there may be substantially no flowable polymeric composition 4306 in the middle and the composition may only be on the edges. Many different configurations are contemplated herein.

In various embodiments, the retention member can be manufactured and then stored and/or shipped before being applied to a glass subassembly and/or a fenestration unit.

Figure 44:
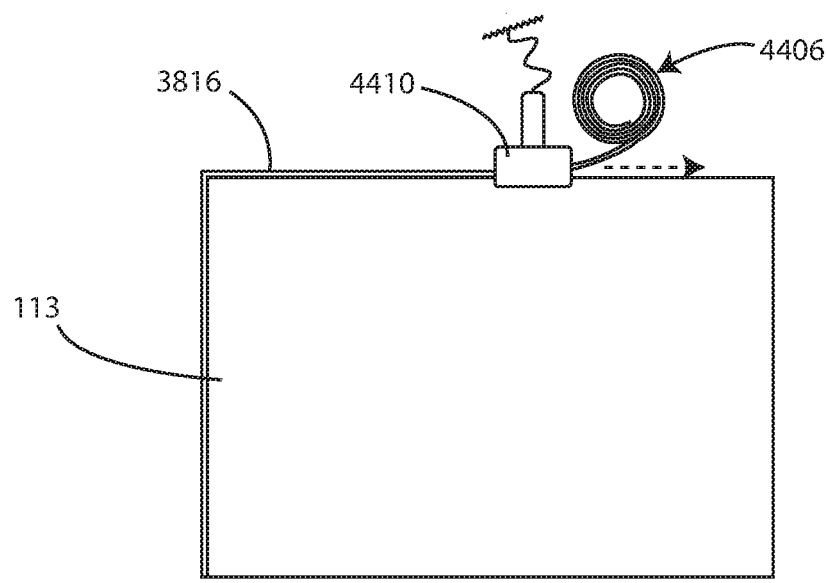
FIG. 44 is a schematic view of a retention member being applied to a glass subassembly in accordance with various embodiments herein.

Referring now to FIG. 44, a schematic view is shown of a retention member 3816 being applied to a glass subassembly 113 in accordance with various embodiments herein. In this example, the retention member 3816 has been previously manufactured and is drawn off of a roll 4406 of retention member 3816 material. A release liner can be disposed on a surface of the retention member 3816 and then taken off during the assembly process. The retention member 3816 is applied to the edges of the glass subassembly 113 using an applicator device 4410.

However, in other embodiments, the retention member 3816 can be manufactured in-line with a fenestration unit assembly process and/or glass subassembly manufacturing process and be applied either before or after the flowable polymeric composition is cured.

Figure 45:
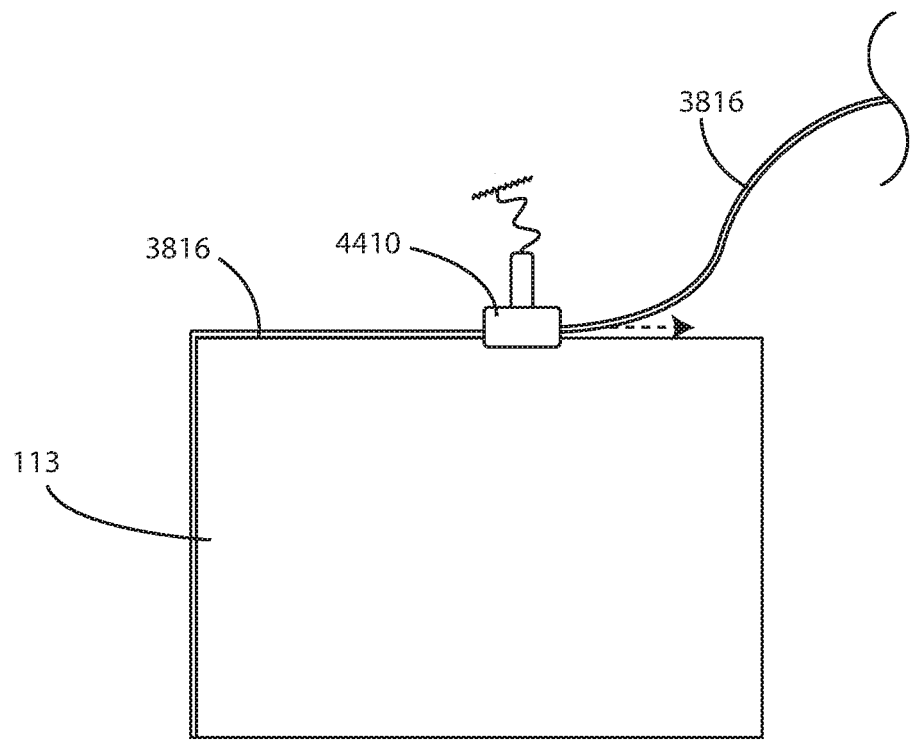
FIG. 45 is a schematic view of a retention member being applied to a glass subassembly in accordance with various embodiments herein.

Referring now to FIG. 45, a schematic view of a retention member 3816 being applied to a glass subassembly 113 in accordance with various embodiments herein. In this example, the retention member 3816 is manufactured in-line and then applied to the edges of the glass subassembly 113 using an applicator device 4410. As referenced before, the flowable polymeric composition can be cured either before or after the retention member 3816 is applied to the edges of the glass subassembly 113. Further, in some examples, the flowable polymeric composition can be cured, and then just before the retention member is applied to the glass subassembly 113 an additional amount of an uncured flowable polymeric composition is applied which can serve as an adhesive.

It will be appreciated that patterns of deposition of the flowable polymeric composition upon the fibrous substrate can be achieved through the shape of the egress port of the coating chamber. For example, in some embodiments, the contours of the egress port can be such that they are very in size to the fibrous substrate itself and thus act almost like a doctor blade in removing excess amounts of the flowable polymeric composition from around the profile of the fibrous substrate itself. However, in some embodiments, one or more channels or other open portions can be disposed within the inner surface of the egress port resulting in the formation of beads or other placements of the flowable polymeric composition on the fibrous substrate (and therefore on the retention member). In some cases, such beads or placements of the flowable polymeric composition can be used for purposes such as to provide an additional amount of the flowable polymeric composition to act as an adhesive to secure the retention member to a portion of the fenestration unit such as the glass subassembly or another portion.

Figure 46:
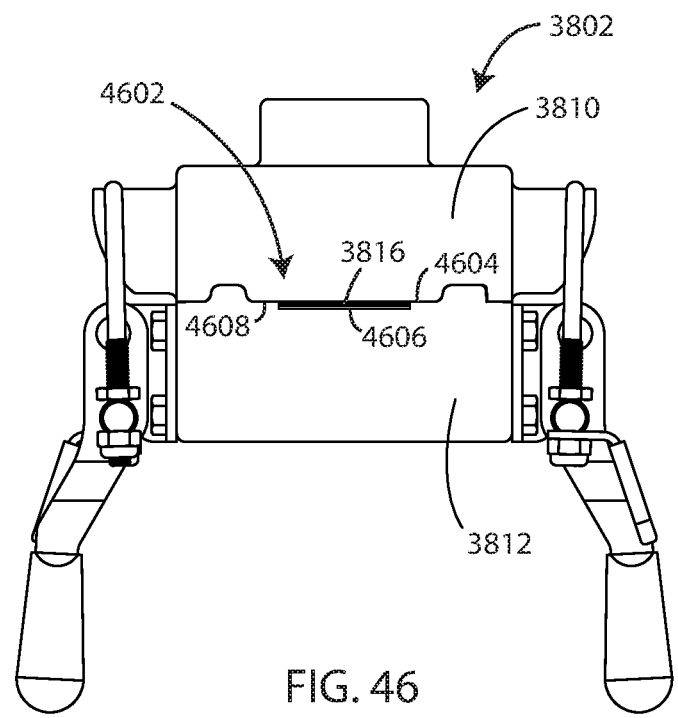
FIG. 46 is a rear elevational view of a coating chamber showing an egress port in accordance with various embodiments herein.

Thus, it will be appreciated that egress ports herein can have various shapes and, in some embodiments, can include one or more channels or openings having various profiles. Referring now to FIG. 46, a rear elevational view of a coating chamber 3802 showing an egress port 4602 in accordance with various embodiments herein. This view shows the top half 3810 and the bottom half 3812 of the coating chamber 3802 as well as the retention member 3816 coming out of the egress port 4602. The top half 3810 forms an upper surface 4604 of the egress port 4602 and the bottom half 3812 forms a lower surface 4608 of the egress port 4602. A passage 4606 or aperture between the upper surface 4604 and the lower surface 4608 allows the retention member 3816 to pass out of the coating chamber 3802 with a desired amount of the flowable polymeric composition disposed therein. If the passage 4606 or aperture closely conforms to the size of the fibrous substrate, then little extra flowable polymeric composition remains to the outside of the fibrous substrate profile. However, the passage 4606 or aperture can include one or more channels or other open portions to allow for beads or selective placements of the flowable polymeric composition.

Figure 47:
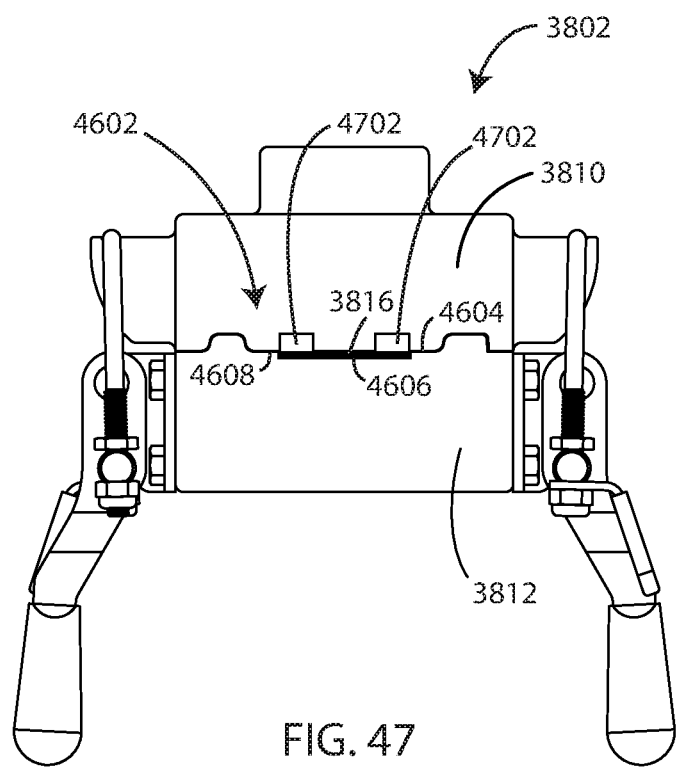
FIG. 47 is a rear elevational view of a coating chamber showing an egress port in accordance with various embodiments herein.

Referring now to FIG. 47, a rear elevational view of a coating chamber 3802 is shown including an egress port 4602 in accordance with various embodiments herein. In this example, the upper surface 4604 includes two channels 4702 that result in beads of the flowable polymeric composition in the same shape being deposited on the retention member 3816. In this case, the channels 4702 are substantially rectangular. However, it will be appreciated that they could have many different shapes and sizes. In some embodiments, the channels 4702 can have a width of about 0.1 to 60 mm, such as 0.1, 1, 2, 3, 4, 5, 7.5, 10, 15, 20, 30, 40, 50, or 60 mm or an amount falling within a range between any of the foregoing. In some embodiments, the channels 4702 can have a height of about 0.1 to 25 mm, such as 0.1, 1, 2, 3, 4, 5, 7.5, 10, 15, 20, or 25 mm, or an amount falling within a range between any of the foregoing. The total number of channels can vary. In some embodiments, there can be 1, 2, 3, 4, 5, 6, 8, 10, 15 or 20 or more channels, or a number of channels falling within a range between any of the foregoing.

Figure 48:
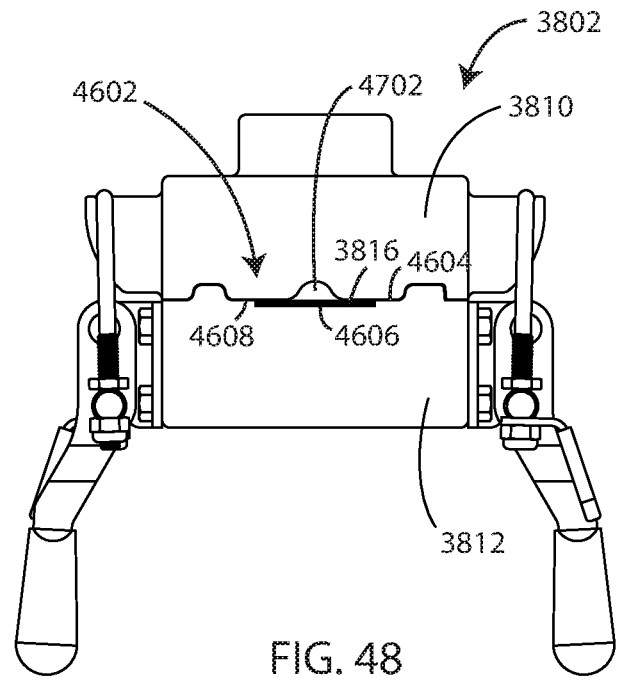
FIG. 48 is a rear elevational view of a coating chamber showing an egress port in accordance with various embodiments herein.
Figure 49:
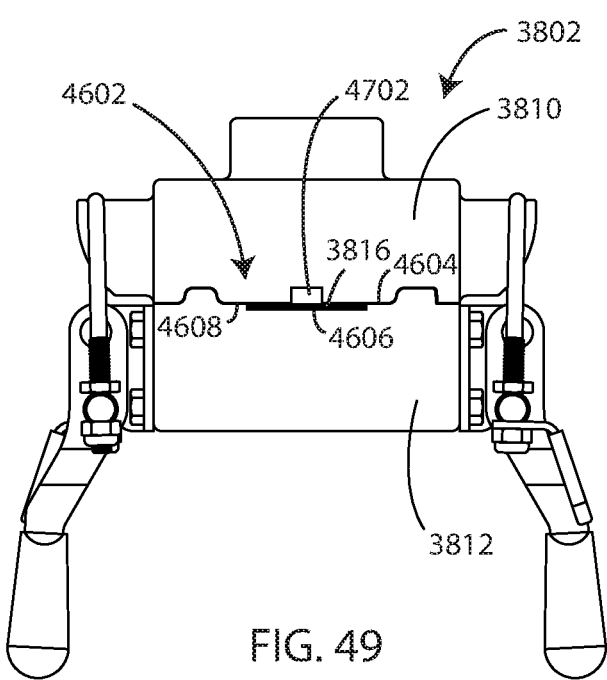
FIG. 49 is a rear elevational view of a coating chamber showing an egress port in accordance with various embodiments herein.
Figure 50:
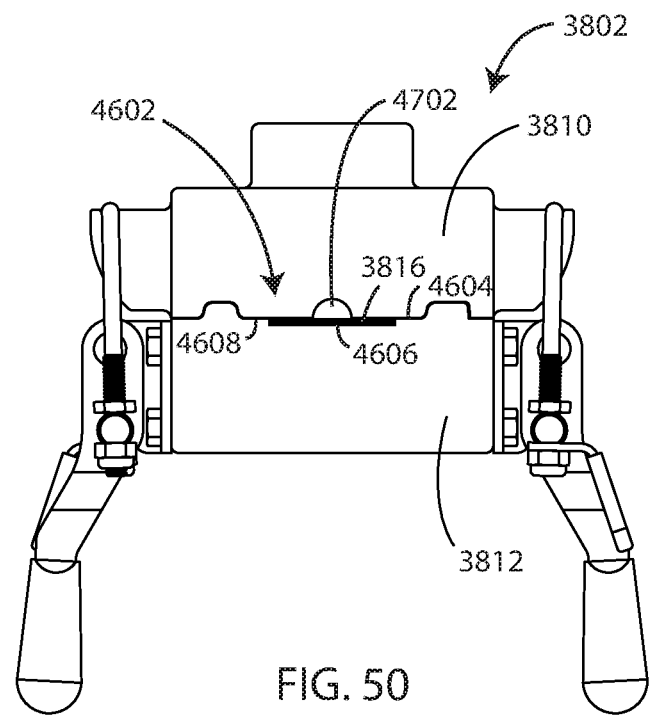
FIG. 50 is a rear elevational view of a coating chamber showing an egress port in accordance with various embodiments herein.
Figure 51:
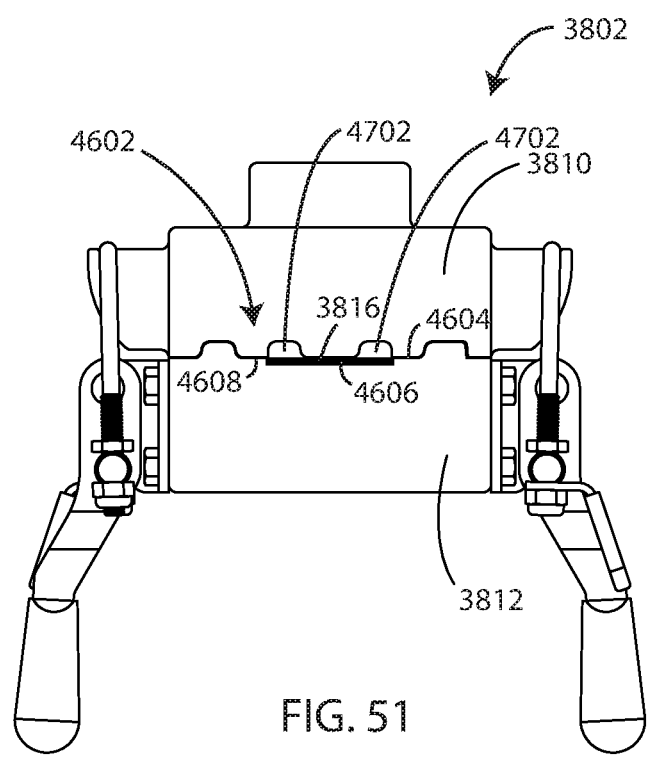
FIG. 51 is a rear elevational view of a coating chamber showing an egress port in accordance with various embodiments herein.
Figure 52:
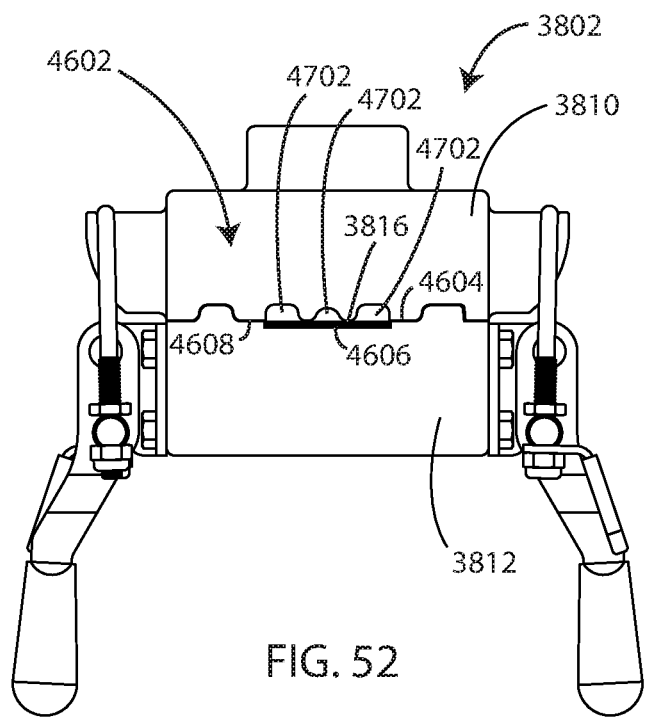
FIG. 52 is a rear elevational view of a coating chamber showing an egress port in accordance with various embodiments herein.
Figure 53:
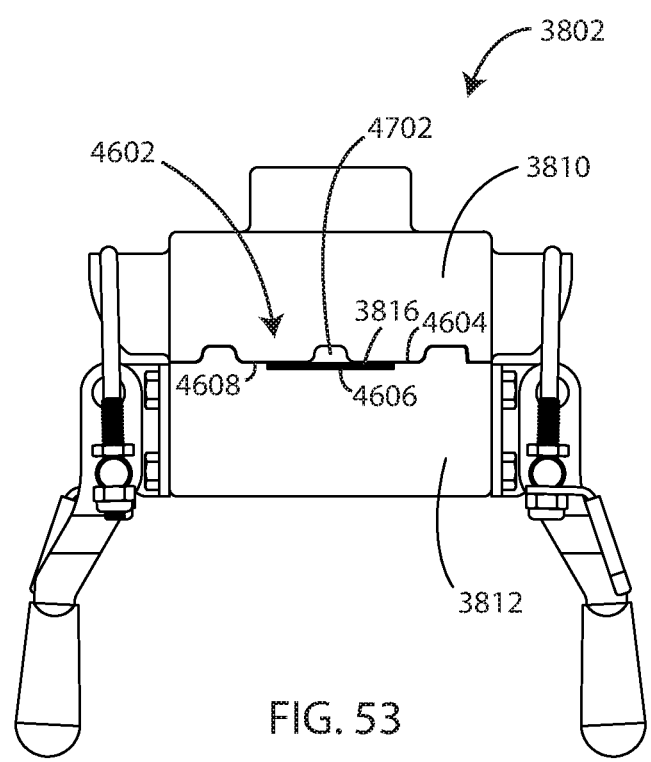
FIG. 53 is a rear elevational view of a coating chamber showing an egress port in accordance with various embodiments herein.

FIG. 48 is a rear elevational view of a coating chamber 3802 showing an egress port 4602 in accordance with various embodiments herein. FIG. 48 is generally similar to FIG. 47. However, in this example, there is a single channel 4702 that is centrally located and curvilinear in shape. FIG. 49 is a rear elevational view of a coating chamber 3802 showing an egress port 4602 in accordance with various embodiments herein. FIG. 49 is generally similar to FIG. 47. However, in this example, there is a single channel 4702 that is centrally located and substantially rectangular in shape. FIG. 50 is a rear elevational view of a coating chamber 3802 showing an egress port 4602 in accordance with various embodiments herein. FIG. 50 is generally similar to FIG. 47. However, in this example, there is a single channel 4702 that is centrally located and substantially hemispherical (forming a half-circle) in shape. FIG. 51 is a rear elevational view of a coating chamber 3802 showing an egress port 4602 in accordance with various embodiments herein. FIG. 51 is generally similar to FIG. 47. However, in this example, there are two channels 4702 located near opposite ends of the retention member 3816. FIG. 52 is a rear elevational view of a coating chamber 3802 showing an egress port 4602 in accordance with various embodiments herein. FIG. 52 is generally similar to FIG. 47. However, in this example, there are three channels 4702, with one being centrally located and curvilinear and the other two being located near opposite ends of the retention member 3816 and having a different shape than the central channel 4702. FIG. 53 is a rear elevational view of a coating chamber 3802 showing an egress port 4602 in accordance with various embodiments herein. FIG. 53 is generally similar to FIG. 47. However, in this example, there is a single channel 4702 that is centrally located and having a different shape than the channels shown in FIG. 47. Many different channels shapes and sizes are contemplated herein. While the channels of FIGS. 47-53 are disposed on the upper surface 4604 of the egress port 4602 it will be appreciated that channels herein can also be formed on the lower surface 4608 of the egress port 4602.

Many different methods are contemplated herein, including, but not limited to, methods of making, methods of using, and the like. Aspects of operations described elsewhere herein can be performed as operations of one or more methods in accordance with various embodiments herein.

In an embodiment, a method of making a retention member is included, the method can include supplying a flowable polymeric composition into a coating chamber, feeding a fibrous substrate through the coating chamber (the coating chamber defining a substrate ingress port and a substrate egress port) and passing the flowable polymeric composition into gaps defined by adjacent fibers in the fibrous substrate.

In an embodiment of the method, the pressure inside the coating chamber is not atmospheric. In an embodiment of the method, the pressure inside the coating chamber is from 50 PSI to 2500 PSI.

In an embodiment, the fibrous substrate can include a substantially planar material with a plurality of fibers extending in a direction transverse to a direction of movement of the fibrous substrate through the coating chamber. In an embodiment, the fibers can include at least one of wood fibers, glass fibers, hybrid fibers, metal fibers, polyamide fibers (NYLON), para-aramid fibers (KEVLAR), and carbon fibers. In an embodiment of the method, the fibers are woven together. In an embodiment of the method, the fibers are nonwoven. In an embodiment, the fibrous substrate further can include a plurality of fibers extending in a direction parallel to a direction of movement of the fibrous substrate through the coating chamber.

In an embodiment, the coating chamber can include a top housing and a bottom housing. In an embodiment of the method, the flowable polymeric composition enters the coating chamber through one of the top housing and the bottom housing and then contacts the other housing. In an embodiment of the method, the flowable polymeric composition is pushed through the fibrous substrate from a first side (such as a top side) to a second side (such as a bottom side). In an embodiment of the method, the flowable polymeric composition flows around the fibrous substrate.

In an embodiment of the method, an amount of the flowable polymeric composition deposited on a top side of the fibrous substrate is different than the amount deposited on a bottom side of the fibrous substrate. In an embodiment of the method, an amount of the flowable polymeric composition deposited on a top side of the fibrous substrate includes one or more beads of the flowable polymeric composition.

In an embodiment, the flowable composition can include an elastomeric polymer composition. In an embodiment, the flowable composition can include an uncured polysiloxane composition, an uncured polyurethane composition, an uncured modified polysiloxane, and an uncured acrylic polymer.

In an embodiment, the method can further include curing the flowable composition after the fibrous substrate exits the coating chamber using one or more of heat, ambient moisture, ultraviolet light, and a catalyst.

In an embodiment of the method, the fibrous substrate exits the egress port with a coating of the flowable polymeric composition on both a top side and a bottom side of the fibrous substrate. In an embodiment of the method, the fibrous substrate exits the egress port with a coating of the flowable polymeric composition that is discontinuous across at least one of a top side and a bottom side of the fibrous substrate. In an embodiment of the method, the fibrous substrate exits the egress port with the flowable polymeric composition impregnated therein.

In an embodiment, the method can further include applying the coated fibrous substrate to an edge portion of an insulating glazing unit (IGU). In an embodiment, the method can further include applying the coated fibrous substrate to an edge portion of the insulating glazing unit (IGU) with the flowable polymeric composition in an uncured state. In an embodiment, the method can further include applying the coated fibrous substrate to an edge portion of the insulating glazing unit (IGU) with the flowable polymeric composition in a cured state. In an embodiment, the method can further include applying the coated fibrous substrate to an edge portion of the insulating glazing unit (IGU) with a portion of the flowable polymeric composition in a cured state and a portion in an uncured state. In an embodiment, can include applying a portion of the flowable polymeric composition is applied, curing the applied portion, then applying a second portion of the flowable polymeric composition.

In an embodiment, the method can further include applying the coated fibrous substrate to an insulating glazing unit (IGU) to interconnect an exterior pane and an interior pane. In an embodiment, the method can further include applying the coated fibrous substrate to an insulating glazing unit (IGU) to interconnect at least one of an interior pane and an exterior pane to a frame member and/or a sash. In an embodiment of the method, the coated fibrous substrate is connected directly or indirectly to a secondary sealant of an insulating glazing unit (IGU). In an embodiment, the interior pane can include a laminate glass pane.

In an embodiment, the substrate egress port can include an upper surface and a lower surface, wherein the upper surface includes one or more channels. In an embodiment of the method, the channels are substantially polygonal in cross-section. In an embodiment of the method, the channels are substantially curvilinear in cross-section.

In an embodiment of the method, a surface of the coated fibrous substrate is textured. In an embodiment of the method, a surface of the coated fibrous substrate has a surface area at least 20% greater than an otherwise identical flat surface.

In an embodiment, a method of making a fenestration unit is included, the method including obtaining a retention member, applying the retention member to an insulating glazing unit (IGU), wherein the retention member is formed by supplying a flowable polymeric composition into a coating chamber, feeding a fibrous substrate through the coating chamber, the coating chamber defining a substrate ingress port and a substrate egress port, and passing the flowable polymeric composition into gaps defined by adjacent fibers in the fibrous substrate.

In an embodiment, the method can further include applying the coated fibrous substrate to an edge portion of the insulating glazing unit (IGU). In an embodiment, the method can further include applying the coated fibrous substrate to an edge portion of the insulating glazing unit (IGU) with the flowable polymeric composition in an uncured state. In an embodiment, the method can further include applying the coated fibrous substrate to an edge portion of the insulating glazing unit (IGU) with the flowable polymeric composition in a cured state. In an embodiment, the method can further include applying the coated fibrous substrate to an edge portion of the insulating glazing unit (IGU) with a portion of the flowable polymeric composition in a cured state and a portion in an uncured state. In an embodiment, can include applying a portion of the flowable polymeric composition is applied, curing the applied portion, then applying a second portion of the flowable polymeric composition.

In an embodiment, the method can further include interconnecting an exterior pane and an interior pane with the retention member. In an embodiment, the method can further include interconnecting at least one of an interior pane and an exterior pane to a frame member and/or a sash with the retention member.

It should be noted that, as used in this specification and the appended claims, the singular forms "a," "an," and "the" include plural referents unless the content clearly dictates otherwise. Thus, for example, reference to a composition containing "a polymer" includes a mixture of two or more polymers. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A window or door assembly, comprising
a frame member defining a channel, the frame member defining a lower end of the channel and an attachment surface thereon;
a glass subassembly, the glass subassembly comprising
an interior laminate pane, wherein the interior laminate pane comprises a polymeric material disposed between a first glass layer and a second glass layer,
an exterior pane,
a proximal end received and seated within the channel,
an inside facing surface on the interior laminate pane,
an outside facing surface on the exterior pane, the outside facing surface proximate the lower end of the channel,
a sealing spacer disposed between the interior laminate pane and the exterior pane, and
a secondary sealant disposed between the interior laminate pane and the exterior pane, the secondary sealant contacts the interior laminate pane and the exterior pane;
a retention member engaging a proximal end of the interior laminate pane and a proximal end of the exterior pane, wherein the retention member further engages the polymeric material of the interior laminate pane, wherein the retention member is completely disposed between a first plane defined by the inside facing surface on the interior laminate pane and a second plane defined by the outside facing surface on the exterior pane;
a glazing material disposed on the attachment surface at the lower end of the channel; and
the outside facing surface of the glass subassembly being attached to the channel of the frame member with the glazing material;
wherein the secondary sealant contacts the sealing spacer and the retention member, wherein a portion of the secondary sealant is beyond an outer periphery of the proximal end of the interior laminate pane and the proximal end of the exterior pane, wherein a channel is defined between the frame member and the secondary sealant, the channel being defined laterally from the proximal end of the glass subassembly.

2. The window or door assembly of claim 1, the retention member having an elongation and tensile strength sufficient to provide the glass subassembly with shock absorption and force dissipation protection that meets or exceeds one or more of ASTM E1886, ASTM E1996, TAS 201, TAS 202, TAS 203, and AAM (Original) A 506 standards.

3. The window or door assembly of claim 1, the retention member comprising at least one of a polyvinyl chloride, glass composite, nylon, polyethylene, rubber, elastomeric material, plastic tape, fiberglass cloth, fiberglass tape, woven cloth, non-woven cloth and/or combinations thereof.

4. The window or door assembly of claim 1, the retention member comprising a reinforcing material.

5. The window or door assembly of claim 4, the reinforcing material comprising a mesh.

6. The window or door assembly of claim 5, the mesh comprising mesh strands extending substantially parallel to a surface normal of the inside facing surface on the interior laminate pane.

7. The window or door assembly of claim 4, the retention member further comprising a polymeric layer.

8. The window or door assembly of claim 7, wherein the reinforcing material is embedded within the polymeric layer.

9. The window or door assembly of claim 7, wherein the reinforcing material is sandwiched between the polymeric layer and a second polymeric layer.

10. The window or door assembly of claim 1, the retention member comprising at least one polymeric layer;
wherein the interior laminate pane comprises
a first glass layer,
a second glass layer, and
a polymeric material disposed between the first glass layer and the second glass layer;
wherein the polymeric layer comprises a first polymer and the polymeric material disposed between the first glass layer and the second glass layer comprises a second polymer, wherein the first polymer and the second polymer adhere to one another.

11. The window or door assembly of claim 1, wherein the retention member comprises a base portion extending along and engaging at least a portion of the proximal end of the glass subassembly, wherein the base portion is of a length sufficient to project into and engage a heel bead of an adhesive material within the channel to couple the retention member to the frame member.

12. The window or door assembly of claim 1, wherein the interior laminate pane comprises a first glass layer, a second glass layer, and a polymeric material disposed between the first glass layer and the second glass layer.

13. The window or door assembly of claim 12, the polymeric material disposed between the first glass layer and the second glass layer comprising at least one of polyvinyl butyral (PVB), SGP (SENTRYGLAS PLUS), polyethylene terephthalate (PET), polyurethane (PUR), ethylene-co-vinyl acetate (EVA).

14. The window or door assembly of claim 12, wherein a contact distance between the polymeric material disposed between the first glass layer and the second glass layer and the retention member is greater than a thickness of the polymeric material disposed between the first glass layer and the second glass layer.

15. The window or door assembly of claim 12, further comprising a polymeric material disposed over at least a portion of the proximal end of the interior laminate pane.

16. The window or door assembly of claim 15, wherein the polymeric material disposed over at least a portion of the proximal end of the interior laminate pane is integral with the polymeric material disposed between the first glass layer and the second glass layer.

17. The window or door assembly of claim 15, wherein the polymeric material disposed over at least a portion of the proximal end of the interior laminate pane is joined to the polymeric material disposed between the first glass layer and the second glass layer via a thermal, mechanical, or chemical bond.

18. The window or door assembly of claim 1, wherein the retention member is embedded within the portion of the secondary sealant that is beyond the outer periphery of the proximal end of glass subassembly.

19. The window or door assembly of claim 18, wherein a first portion of the secondary sealant is disposed between retention member and the proximal end of the glass subassembly and a second portion of the secondary sealant is located on the opposite side of the retention member from the first portion of the secondary sealant.

20. The window or door assembly of claim 18, wherein the secondary sealant contacts a proximal end of the interior laminate pane and a proximal end of the exterior pane.

21. A window or door assembly, comprising
a frame member defining a channel, the frame member defining a lower end of the channel and an attachment surface thereon;
a glass subassembly, the glass subassembly comprising
an interior laminate pane, wherein the interior laminate pane comprises a polymeric material disposed between a first glass layer and a second glass layer,
an exterior pane,
a proximal end received and seated within the channel,
an inside facing surface on the interior laminate pane,
an outside facing surface on the exterior pane, the outside facing surface proximate the lower end of the channel,
a sealing spacer disposed between the interior laminate pane and the exterior pane, and
a secondary sealant disposed between the interior laminate pane and the exterior pane, the secondary sealant contacts the interior laminate pane and the exterior pane;
a retention member engaging a proximal end of the interior laminate pane and a proximal end of the exterior pane, wherein the retention member further engages the polymeric material of the interior laminate pane, wherein the retention member is completely disposed between a first plane defined by the inside facing surface on the interior laminate pane and a second plane defined by the outside facing surface on the exterior pane;
a glazing material disposed on the attachment surface at the lower end of the channel; and
the outside facing surface of the glass subassembly being attached to the channel of the frame member with the glazing material;
wherein the secondary sealant contacts the sealing spacer and the retention member, wherein a portion of the secondary sealant is beyond an outer periphery of a proximal end of the interior laminate pane and a proximal end of the exterior pane, wherein a channel is defined between the frame member and the secondary sealant, the channel being defined laterally from the proximal end of the glass subassembly;
wherein the retention member is embedded within the secondary sealant.

22. A window or door assembly, comprising
a frame member defining a channel, the frame member defining a lower end of the channel and an attachment surface thereon;
a glass subassembly, the glass subassembly comprising
an interior laminate pane, wherein the interior laminate pane comprises a polymeric material disposed between a first glass layer and a second glass layer,
an exterior pane,
a proximal end received and seated within the channel,
an inside facing surface on the interior laminate pane,
an outside facing surface on the exterior pane, the outside facing surface proximate the lower end of the channel,
a sealing spacer disposed between the interior laminate pane and the exterior pane, and
a secondary sealant disposed between the interior laminate pane and the exterior pane, the secondary sealant contacts the interior laminate pane and the exterior pane;
a retention member engaging at least a portion of the interior laminate pane;
a glazing material disposed on the attachment surface at the lower end of the channel; and
the outside facing surface of the glass subassembly being attached to the channel of the frame member with the glazing material;
wherein the secondary sealant contacts the sealing spacer and the retention member, wherein a portion of the secondary sealant is beyond an outer periphery of a proximal end of the interior laminate pane and a proximal end of the exterior pane, wherein a channel is defined between the frame member and the secondary sealant, the channel being defined laterally from the proximal end of the glass subassembly, wherein the secondary sealant contacts the polymeric material of the interior laminate pane.

\* \* \* \* \*